United States Patent
Srivastava

(10) Patent No.: US 11,657,039 B2
(45) Date of Patent: *May 23, 2023

(54) RELATIONAL DATA MANAGEMENT AND ORGANIZATION USING DLT

(71) Applicant: DLT Global Inc., Toronto (CA)

(72) Inventor: Neeraj Srivastava, Toronto (CA)

(73) Assignee: DLT GLOBAL INC., Toronto (CA)

( * ) Notice: Subject to any disclaimer, the term of this patent is extended or adjusted under 35 U.S.C. 154(b) by 82 days.

This patent is subject to a terminal disclaimer.

(21) Appl. No.: 16/899,400

(22) Filed: Jun. 11, 2020

(65) Prior Publication Data

US 2021/0056095 A1 Feb. 25, 2021

Related U.S. Application Data

(63) Continuation of application No. 16/544,538, filed on Aug. 19, 2019, now Pat. No. 10,726,002.

(51) Int. Cl.
*G06F 16/00* (2019.01)
*G06F 16/23* (2019.01)
*G06F 16/2455* (2019.01)
*G06F 16/27* (2019.01)

(52) U.S. Cl.
CPC ...... *G06F 16/2379* (2019.01); *G06F 16/2455* (2019.01); *G06F 16/27* (2019.01)

(58) Field of Classification Search
CPC .............. G06F 16/2379; G06F 16/27; G06F 16/2455
See application file for complete search history.

(56) References Cited

U.S. PATENT DOCUMENTS

| | | |
|---|---|---|
| 2016/0371319 A1 | 12/2016 | Park et al. |
| 2019/0158594 A1 | 5/2019 | Shadmon et al. |
| 2019/0179939 A1 | 6/2019 | Govindarajan et al. |
| 2019/0238525 A1 | 8/2019 | Padmanabhan et al. |

OTHER PUBLICATIONS

Corda, "Corda Documentation master—Hyperledger," Apr. 17, 2018, XP055663417, Retrieved from the Internet: URL:https://buildmedia.readthedocs.org/media/pdf/corda/latest/corda.pdf, last accessed on Jan. 30, 2020, 318 pages.
European Patent Application No. EP 20855133.3, "Extended European Search Report," dated Dec. 17, 2021, 9 pages.
U.S. Appl. No. 16/544,538, Examiner Interview Summary dated Jan. 21, 2020, 3 pgs.

(Continued)

*Primary Examiner* — Hung Q Pham
(74) *Attorney, Agent, or Firm* — Culhane Meadows, PLLC

(57) ABSTRACT

A set of both smart contract and off-chain tools is described that enable the management and organization of data so as to enable storage of that data in a distributed ledger according to relational database principles. A cross-distributed-ledger-platform specification plus reusable core components together create a system that may be implemented on distributed ledger platforms to enable storage and retrieval of data to/from the distributed ledger governed by relational principles. A realization of this system enables addition of system chaincode to Hyperledger® Fabric and uses schemas and data represented as JSON. In use, the user may create, update, and query data from code, a console, or a smart contract where every update is a distributed ledger transaction.

37 Claims, 22 Drawing Sheets

(56) References Cited

OTHER PUBLICATIONS

U.S. Appl. No. 16/544,538, Non Final Office Action dated Oct. 29, 2019, 15 pgs.
U.S. Appl. No. 16/544,538, Notice of Allowance dated Mar. 11, 2020, 8 pgs.
U.S. Appl. No. 16/544,538, Response to Non Final Office Action dated Oct. 29, 2019 filed Jan. 29, 2020, 23 pgs.

RELATIONAL DATA MANAGEMENT AND ORGANIZATION USING DLT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application is a continuation of and claims the benefit of priority under 35 U.S.C. § 120 to U.S. patent application Ser. No. 16/544,538, filed on Aug. 19, 2019, now U.S. Pat. No. 10,726,002, which is hereby incorporated by reference herein in its entirety.

TECHNICAL FIELD

The application is directed to the management and organization of data to enable storage and retrieval of that data to/from a distributed ledger in accordance with relational database principles.

BACKGROUND

The original relational database systems came in response to a major new development in computing in the late 1960s. As systems got larger and more complex, it became clear that new and updated programs needed to work with data created by older ones. Existing systems made this difficult because programs often stored data each in their own way. The relational model standardized important aspects of storage and retrieval and those who adopted it enjoyed a range of benefits, including cheaper upgrades and reduced vendor lock-in.

Conversely, those who were still led by computer vendors into program-specific storage approaches endured higher maintenance costs and a larger effort later, particularly when what was sometimes a long-delayed decision to move to a Relational Database Management System (RDBMS) platform was finally made. The years-long Australian Department of Defense project in the 1970s to finally move off the non-relational Honeywell FACT language is a testament to these costs.

From time to time since then, advancements in other areas of computing have made existing relational database tools incompatible or inconvenient. For example, the file-oriented nature of the early world wide web led many projects back to the inefficient times before the relational database until connecting of web pages to an RDBMS back-end was achieved and practiced. Similarly, the rise of object-oriented programming temporarily made it less natural for programmers to represent data using the relational data model. Data encapsulated in objects was difficult to break out into RDBMS tables. However, the advantages of relational representation were significant enough that now Object-Relational Mapping (ORM) is a common approach where object-oriented programming is still used.

On the other hand, distributed ledger technology (DLT) has the potential to ignite and enable what is tantamount to the information technology revolution of this century. Distributed ledger technology is tackling and solving one of the largest and most perplexing challenges of the Internet—the lack of trust. Distributed ledger technology is a nascent but powerful distributed computing paradigm and the only technology to date that has the potential to bring trust to the Internet by making data immutable for practical purposes. Unfortunately, existing RDBMS platforms and tools are not compatible with distributed ledger technology's constraints. As a result, program/data lock-in, wherein the data is inextricably linked to the program, is even greater for smart contracts on distributed ledgers than it was for programs in the pre-relational database days in the 1960s. Systems and methods are desired whereby data in distributed ledgers will only be locked into the particulars of a deployed smart contract if that was the specific intent of the developer.

SUMMARY

The systems and methods described herein address the needs in the art by providing a set of both smart contract and off-chain tools that enable relational data management and organization prior to storage on a distributed ledger, making it possible to leverage previously existing developer knowledge about relational databases without trading away the benefits of the distributed ledger. In sample embodiments, data is managed and organized according to relational principles, stored on a distributed ledger platform of choice and accessed using programming languages, such as Structured Query Language (SQL), that are already familiar to the developer. The result is a highly secure and auditable relational database on a distributed ledger. Also, the systems and methods described herein may be used with smart contracts to make the data storage aspect of those smart contracts more tractable.

In sample embodiments, a cross-distributed-ledger-platform specification plus reusable core components together create a relational data management and organization system that may be implemented on common distributed ledger technology platforms such as Hyperledger® Fabric and accessed from popular programming platforms such as Node.js®. The relational data management and organization system enables the ability to add system chaincode for use with Hyperledger® Fabric and uses schemas and data represented as JavaScript Object Notation (JSON). Also, Fabric's world state database is used for data storage and Fabric's identity provider is used for data access control over, for example, five levels including create database, authorize users for database access, add table and modify schema, write data, and query only. In use, the user may create, update, and query tables from code, a console, or a smart contract where every update is a distributed ledger transaction.

In sample embodiments, systems and methods are provided for querying a distributed ledger platform that implements a distributed ledger including transaction data on the distributed ledger with a relational database management query. The method includes creating a database and recording information about the database on the distributed ledger and converting a received relational database management query into a query operation that may be processed by the distributed ledger platform. The query operation is executed on the distributed ledger platform to generate a query result, and the query result is logged to the distributed ledger platform in a form that may be processed by the distributed ledger platform for inclusion on the distributed ledger. In sample embodiments, the relational database management query is generated by (1) receiving a structured query language (SQL) query from a user via a user interface; (2)

receiving an SQL query from a user application via an application program interface; or (3) a smart contract that executes an SQL query.

In sample embodiments, a relational data management and organization system is adapted to parse the SQL query into an SQL operation that may be one of either a data manipulation language (DML) write operation, a DML read operation, or a data definition language (DDL) operation. A JavaScript Object Notation (JSON) representation of the SQL operation and any relational data included in the SQL operation is created for processing by the distributed ledger platform.

In other sample embodiments, whether a transaction resulting from execution of the SQL operation has progressed toward acceptance into a distributed ledger to a platform-relevant extent is determined by, for example, adding an operation broadcast status (OPSTAT) instruction at the end of a DML Write operation to fetch a more definitive status of a corresponding transaction. Executing the query operation on the distributed ledger platform may further include confirming that an entity invoking the SQL query has authority to perform the requested SQL operation. Executing the query operation on the distributed ledger platform also may include creating a query operation that may be processed and stored by the distributed ledger platform as a JSON representation of the query operation and its result.

In the case where the SQL operation is an SQL DML write operation, the methods may include retrieving data from the distributed ledger platform as required to execute the SQL DML write operation, executing the SQL DML write operation including the retrieved data, preparing JSON representations of any new or updated records in the query result, and committing the SQL DML write operation and any updated records to the distributed ledger platform in the form that may be processed by the distributed ledger platform for inclusion on the distributed ledger. The methods may also include monitoring the distributed ledger for acceptance of the SQL DML write operation into the distributed ledger and informing an entity invoking the SQL query whether the SQL DML write operation was successful.

On the other hand, in the case where the SQL operation is an SQL DML read operation, the methods may include retrieving data from the distributed ledger platform as required to execute the SQL DML read operation, executing the SQL DML read operation including the retrieved data, preparing a JSON representation of the query result, and logging the JSON representation of the query result to the distributed ledger platform in the form that may be processed by the distributed ledger platform for inclusion on the distributed ledger. The method may also include returning the JSON representation of the query result to an entity invoking the SQL query.

In sample embodiments, the distributed ledger platform is a Hyperledger® Fabric platform. In such embodiments, the database may be created within the distributed ledger by executing a configuration transaction that creates a channel and defines which peer computers will maintain a copy of the database and a regular transaction that writes metadata about the database. Also, code may be created that defines transaction data in the distributed ledger and transaction instructions for modifying the transaction data. In the sample embodiments, the code may define attributes of the database in a JavaScript Object Notation (JSON) as the transaction data. At the conclusion of an operation, the database is updated with the database attributes. Also, the method may include creating a parsed and translated structured query language (SQL) query that accounts for the form that may be processed by the distributed ledger platform for inclusion on the distributed ledger. For example, the SQL query may account for JSON elements of the relational management and organization system specification on the Hyperledger® Fabric platform.

In other sample embodiments, a system is provided that includes a distributed ledger platform that implements a distributed ledger including transaction data, and at least one processor that executes instructions to implement a relational data management and organization system that performs operations including creating a database and recording information about the database on the distributed ledger; converting a received relational database management query into a query operation that may be processed by the distributed ledger platform; executing the query operation on the distributed ledger platform to generate a query result; and logging the query result to the distributed ledger platform in a form that may be processed by the distributed ledger platform for inclusion on the distributed ledger. The system may further include means for generating the relational database management query including (1) a user interface to the relational data management and organization system through which a user provides a structured query language (SQL) query, (2) a user application that passes an SQL query to the relational data management and organization system via an application program interface to the relational data management and organization system, or (3) a smart contract that executes an SQL query.

In sample embodiments of the system, the at least one processor further executes instructions to parse the SQL query into an SQL operation including as alternatives a data manipulation language (DML) write operation, a DML read operation, or a data definition language (DDL) operation, and to create a JavaScript Object Notation (JSON) representation of the SQL operation and any relational data included in the SQL operation. The at least one processor may further execute instructions to determine whether a transaction resulting from execution of the SQL operation has progressed toward acceptance into the distributed ledger to a platform-relevant extent. For example, an OPSTAT instruction may be added at the end of a DML Write operation to fetch a more definitive status of a corresponding transaction.

In further sample embodiments, the distributed ledger platform is a Hyperledger® Fabric platform, and the at least one processor executes instructions to create the database within the distributed ledger by executing a configuration transaction that creates a channel and defines which peer computers will maintain a copy of the database and a regular transaction that writes metadata about the database, and to create code defining transaction data in the distributed ledger and transaction instructions for modifying the transaction data. The at least one processor may further execute instructions corresponding to code that defines attributes of the database in a JavaScript Object Notation (JSON) as the transaction data and to update the database with the database attributes. The at least one processor may also execute instructions to create a parsed and translated structured query language (SQL) query that accounts for the form that may be processed by the distributed ledger platform for inclusion on the distributed ledger.

The embodiments described herein also encompass computer systems and computer readable media coded with instructions for implementing the methods described throughout this disclosure. For example, the systems and methods described herein may be implemented on a computing platform in the cloud to provide functionality for accessing and storing data to a database implemented on a distributed ledger platform as described herein.

BRIEF DESCRIPTION OF THE DRAWINGS

The present disclosure is illustrated by way of example and not limitation in the figures of the accompanying drawings, in which like references indicate similar elements and in which.

DESCRIPTION

Figure 1:
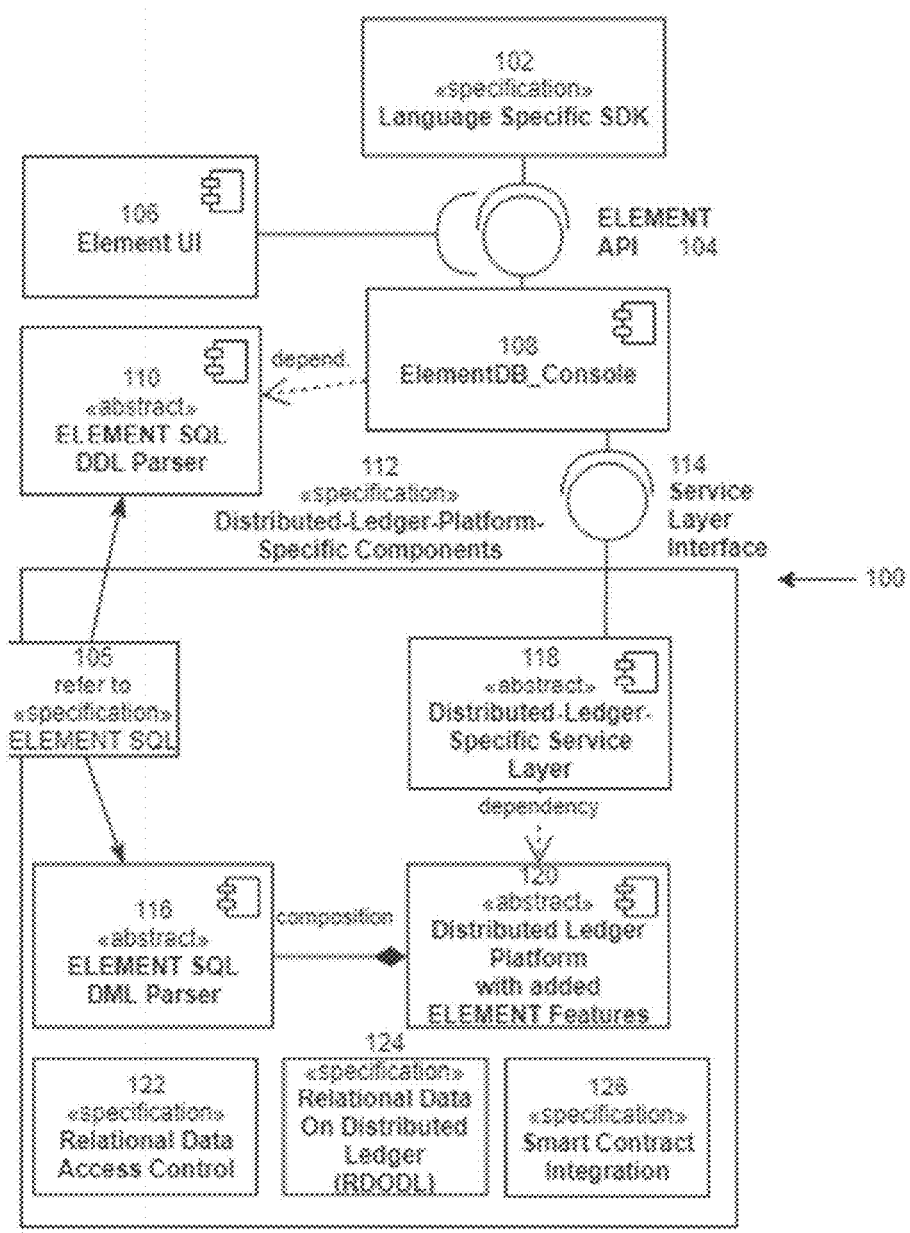
FIG. 1 is a block diagram of the relational data management and organization system in sample embodiments.

The following description with respect to FIGS. 1-32 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

Terminology

Distributed Ledger Technology (DLT): Any of a number of technologies enabling replicated, shared, and synchronized digital data across multiple computers participating in a network. Distributed ledger technology is designed to be inherently resistant to modification of the digital data which, once synchronized, is known collectively as a "distributed ledger". A distributed ledger is typically managed by a peer-to-peer network that collectively adheres to a protocol for validating new information. A system that is capable of producing and maintaining a distributed ledger is known as a Distributed Ledger Platform. "Distributed Ledger Platforms" is inclusive of known platforms such as Aion, ArcBlock, Cardano™, Corda, Enigma, EOS, Ethereum, Hyperledger® Fabric, Hyperledger® Iroha, Hyperledger® Sawtooth, ICON, IOTA, Komodo, Lisk™, MultiChain, Neblio, NEM, NEO, NxT, Qtum, Smilo, Stella, Straitis, Tezos, Wanchain, Waves, and Zilliqa, plus derivations from the foregoing, and others. Many of these platforms are also "blockchain technology" or "blockchain" platforms, a subset of distributed ledger technology platforms.

Smart Contract: A computer protocol that provides the general-purpose computation that takes place on the distributed ledger platform. The smart contract transactions may be simple or may implement sophisticated logic. The resulting transactions are typically transparent to ledger participants, trackable and irreversible.

JSON: JavaScript Object Notation is a lightweight, text-based, human-readable data-interchange format.

SQL: Structure Query Language is the standard language for accessing and manipulating relational database management systems.

Node.js®: A free open source server environment that executes JavaScript code outside of a browser. Node.js® is an asynchronous programming platform built on the Chrome browser's JavaScript runtime. More information about Node.js® may be found at "About Node.js®." Node.js, Node.js Foundation, https://nodejs.org/en/about/.

Hyperledger® Fabric: An enterprise grade permissioned distributed ledger platform that offers modularity and versatility for a broad set of industry use cases. Fabric's architecture includes an identity provider, channels, a world state database, and user and system chaincode. Further details regarding Hyperledger® Fabric are available in Appendix A attached hereto.

Chaincode: In Fabric, software either (a) defines an asset or assets, and the transaction instructions for modifying the asset(s); in other words, the business logic, or (b) extends or modifies the platform including the rules and activities governing the execution of the former. Chaincode enforces the rules for reading or altering key-value pairs or other state database information. Chaincode functions execute against the ledger's current state database and are initiated through a transaction proposal. Chaincode execution results in a set of key-value writes (write set) that may be submitted to the network and applied to the ledger on all peers. Chaincode may be considered equivalent to the platform-independent concept of Smart Contracts.

Apache CouchDB®: An option for a world state database that is incorporated into Hyperledger® Fabric. Apache CouchDB® supports rich queries when chaincode data values are modeled as JSON. CouchDB® indexing and querying are an option for use in sample embodiments of the relational data management and organization system described herein. Further details regarding CouchDB® are available in Appendix A attached hereto.

Overview

The relational model's value comes from establishing independence between the representation of data and the programs that read and write it. In addition to encouraging reusable frameworks for data management, Relational Database Management Systems (RDBMSs) enforce rules on the writing of data that make it impossible for one program's data manipulations to break other programs' ability to locate and access that data. The first of these principles is the outlawing of "ordering dependence." If one program depends on data being physically maintained in a specific order, then another program which is oblivious to this requirement may break the first. The second principle is the prevention of "indexing dependence." Indexing is redundant storage of data to improve the performance of some operations, perhaps at the expense of others. Although it is impossible to cater to the performance preferences of every program, the relational model at least guarantees that no program will break if the indexes for a data set change. The third principle is to prevent "access path dependence." In the relational model, a program only needs to know what data it wants to read and write and no additional information about how the data is organized in storage. Before RDBMSs, it was common for data to be organized in hierarchical structures which might subsequently be rearranged, unnecessarily breaking a program's ability to locate and work with that data.

The relational data management and organization system described herein achieves these three principles. But to understand the challenges that were involved in creating a relational data management and organization system for use with distributed ledgers that achieves these three principles, it is necessary first to understand some considerations particular to distributed ledger platforms.

Distributed ledger technology is closely associated in the public's mind with cryptocurrency, the use for which it was invented in 2009. But the creation of peer-to-peer money was also the invention of an entirely novel approach to distributed computation for other purposes. A wide variety of uses are being explored to take advantage of features like guaranteed data availability, freedom from centralized control, or cryptographic tamper-proofing.

The current energy around distributed ledger adoption is reminiscent of early adoption of the Internet. The potential exists to either re-live or avoid the same missteps with respect to data management that weighed down web sites as they matured. Analogous to early websites, cryptocurrency uses of distributed ledgers featured relatively simple data structures and hard-coded business logic to govern them. However, the subsequent invention of smart contracts opened the door for data and rules of arbitrary complexity.

Enterprise use cases like supply chain logistics are putting information and logic on distributed ledgers in volumes that rival and will soon vastly outpace traditional solutions, but without the benefit of existing standardized data management tools. With every programmer designing her own storage, the result once again is data coupled tightly to the programs (smart contracts) that write it. A relational data management and organization system such as that described herein is needed to reduce this coupling.

Unfortunately, breaking that connection in distributed ledgers is more complicated than the situation faced when implementing relational databases. In its original fully decentralized form, distributed ledgers actually rely on the tight connection between logic and data to create consensus and trust among participants. All participants run the exact same logic, confirming that they receive the exact same outcomes. This leads to some major implications for the management of data on those distributed ledger platforms. For example, any portion of a data management system that affects the writing of data to a distributed ledger is positioned within and under the control of the smart contracts governing the data, essentially making it a part of the smart contract itself. Also, as a part of the smart contract, the data is propagated to all participants in the network so that the participants may run the same data-creation logic.

However, this coupling between logic and data does not make the advantages of the relational model irrelevant, even for restrictive distributed ledger platforms. First, the same consensus mechanism that allows data to be updated by collective agreement may be configured so that participants may agree to upgrades or additions to existing smart contracts. However, if those contracts cannot read and use existing distributed ledger data, they will not be useful. Smart contracts generally cannot do that today and, as a result, such upgrades are not commonly seen in production distributed ledger systems, despite their usefulness.

Even within individual smart contract programs, a consistent approach to storage is increasingly important as the contracts increase in scope and complexity. The relatively simple rules of today's electronic currencies and tradable assets are giving way to fully-distributed ledger-based supply chains and social platforms involving many developers, reusable components, and evolving requirements. Those developers will desire a predictable approach to data storage, just as they do with large traditional programs, and the relational model provides that predictable approach.

The usefulness of the relational model is even greater for pure read operations because they are not governed by consensus, other than for access permission to the data itself in some platforms. This leads to more situations where it is worth the effort to use existing data for new reasons. If data on the distributed ledger is stored according to relational rules, then it may be efficiently read and processed by an RDBMS system running either inside or outside of the distributed ledger, for purposes that go beyond what was envisioned by the original smart contract programmers.

Not every implementation of distributed ledger technology takes advantage of every distributed ledger technology feature or is forced to assume the level of mutual mistrust one sees in public networks like cryptocurrencies. Especially in enterprise settings, partial adoption is actually more common for a variety of reasons. Common situations include the use of distributed ledger platforms as a convenient way to achieve features like cryptographic tamper proofing and data replication. Enterprises also implement a distributed ledger network under their full control, with relaxed consensus rules or a centralized front end, perhaps as a first step toward a more distributed application in the future. Also, consortia with high levels of trust set up distributed ledger networks together with strict smart contract enforcement for support staff but allow administrators and internal auditors to update distributed ledger data directly on their own authority. In each of these cases, there are times when distributed ledger data may be managed exactly like a traditional database for both read and write, much as it could for read-only operations.

Sample Embodiments

The relational data management and organization system described herein delivers the benefits discussed above and provides a set of specifications that may standardize implementations of the relational data management and organization system across different distributed ledger platforms and programming languages. The relational data management and organizations described herein also provides a subset of a standard dialect of SQL (Structured Query Language) for use in directing the management and organization of relational data for a distributed ledger. The relational data management and organization system described herein has further been designed for implementation across a variety of platforms and languages. In sample embodiments, the relational data management and organization system is implemented on the Hyperledger® Fabric distributed ledger network and Node.js® programming language, with mechanisms to support user programs written in Node.js®. However, it will be appreciated that other distributed ledger platforms and programming languages may be used, with the attendant advantages and disadvantages of such platforms and languages.

The description of the relational data management and organization system will begin with a set of specifications, interfaces, and core components that are intended to guide all implementations. FIG. 1 is a block diagram of the relational data management and organization system 100 of sample embodiments. Parts of the relational data management and organization system 100 illustrated in FIG. 1 are common to all implementations, while other parts are customized but follow a set of common specifications. FIG. 1 is an adapted component diagram showing these components and specifications. Throughout this description, relational data management and organization system 100 is also referred to as "ELEMENT" for ease of description.

The common specifications are represented as object elements with the «specification» stereotype to indicate conceptual requirements. Specifications are aspects that are expected to be implemented in a common way among all implementations of the relational data management and organization system. The «abstract» stereotype represents actual software components that are required to be present but will be implemented differently in each realization. The interfaces shown are also specifications in common for all implementations.

The Language Specific Software Development Kit (SDK) components 102 integrate with user applications and relay commands to the relational data management and organization system (ELEMENT) API 104. The Language Specific SDK specification 102 aims to create a common experience across different user programming languages. Among the supported commands is a subset of SQL, which is specified herein as ELEMENT SQL 105. Along with all other calls from the Language Specific SDK 102 and inputs from the ELEMENT user interface (UI) 106, the received commands are parsed, validated, and handled by the ELEMENT Console 108, which has a dependency on the ELEMENT Data Definition Language (DDL) Parser 110. The ELEMENT UI 106 handles direct human interactions for administrative and reporting tasks. ELEMENT UI 106 is a graphical web platform that assists the user to construct valid input queries and represents system responses in an organized format.

In sample embodiments, only DDL operations are handled by the ELEMENT Console 108 via the ELEMENT DDL Parser 110. Data Manipulation Language (DML) operations are passed along to the Distributed-Ledger-Platform-Specific Components 112 over the Service Layer Interface 114 and are parsed by the ELEMENT SQL DML Parser 116 for handling by the Distributed-Ledger-Platform-Specific Components 112. Functionality not described above is realized by a series of Distributed-Ledger-Platform-Specific Components 112. The Service Layer Interface 114 acts as a link between the ELEMENT Console 108 and the Distributed-Ledger-Platform-Specific Service Layer 118 that is the entry-point to these components and their functionality. The Service Layer Interface 114 is involved in all actions with the possible exception of operations initiated by users' smart contracts.

The Distributed-Ledger-Platform-Specific Service Layer 118 forms the major operational logic of the relational data management and organization system 100 and is responsible for accomplishing all user and data management operations. Such operations are split between the Distributed-Ledger-Platform-Specific Service Layer 118 itself and the Distributed-Ledger Platform with Added ELEMENT Features 120. The exact division of work depends on the capabilities of the distributed ledger platform. The functionality is provided by three sub-specifications:

1. The Relational Data Access Control specification 122 specifies the five-level coarse grained access control model that is followed by all implementations of the relational data management and organization system 100. This specification documents user roles and how they affect access to system functionality of the relational data management and organization system 100 including access to data. Access control will use significantly different approaches on different platforms. The specification is Appendix B documents the aspects in common.

2. The Relational Data On Distributed Ledger specification 124 defines requirements for data representations (JSON schemas) and data operations that are supported. This specification documents the requirements for relational data storage in Appendix C.

3. Smart Contract Integration specification 126 specifies which relational data features are accessible from smart contracts.

The Language-Specific SDKs 102 each provide interfaces to access the full functionality of the ELEMENT API 104 from a programming language popular with distributed ledger application implementers. The specification for these SDKs maximizes consistency with respect to function names, parameter ordering and meaning, return values and errors, and so forth. A realization implemented using Fabric and Node.js® is described below.

In sample embodiments, the ELEMENT API 104 is an interface used internally within the relational data management and organization system 100 as a common entry point for invoking database operations. It is called by both the ELEMENT UI 106 and whatever Language-Specific SDK 102 exists in the realization being used. It is specified in the form of a web interface, sometimes referred to as a "REST API." The ELEMENT API 104 is implemented by the ELEMENTDB_Console 108 and reused in all realizations of the relational data management and organization system 100. Further details of the ELEMENT API 104 are provided in APPENDIX D.

The ELEMENT UI 106 is a user interface component that allows users to work manually with databases implemented by the relational data management and organization system 100. The ELEMENT UI 106 provides users the capability to add users and to adjust user access levels, execute SQL queries on the available databases using a built-in text editor, access user documentation including query examples and syntax of ELEMENT-specific SQL language extensions, and view status information of submitted queries and view returned data from queries whose execution has completed successfully.

The ELEMENT console 108 and ELEMENT SQL DDL Parser 110 are core components that are present in all realizations of the relational data management and organization system 100. The ELEMENT console 108 accepts database commands via the ELEMENT API 104 (which may be a representational state transfer (REST) API), originating from the Language Specific SDK 102 or directly from users via the ELEMENT UI 106, which the ELEMENT console 108 also serves. The ELEMENT console 108 converts those commands to a form that may be passed to the Service Layer Interface 114 that links to the Distributed-Ledger-Platform-Specific Components 112 of the relational data management and organization system 100.

In sample embodiments, the common components of the relational data management and organization system 100 (104, 106, 108, 110) are implemented in Node.js® as a web service, which allows for deployment flexibility and horizontal scaling if needed.

ELEMENT SQL 105, which comprises typical SQL operations along with some ELEMENT-specific extensions, is a grammar for describing RDBMS operations in the manner most familiar to developers. In sample embodiments, SQL syntax for the relational data management and organization system 100 was designed for compatibility with a subset of ISO/IEC 9075 (currently SQL:2016). For sake of access management and implementation, operations in ELEMENT SQL have been classified into DDL, DML Write and DML Read queries.

ELEMENT extensions to SQL include adaptations for working in a distributed ledger data environment as well as convenience functions. These extensions are ELEMENT specific keywords that may be used in combination with SQL syntax to form meaningful queries for the ELEMENT system. The extension keywords in sample embodiments include:

1. OPSTAT (Operation Broadcast Status)—This operation checks whether a particular operation's transaction has progressed into the distributed ledger to an extent relevant to the particular distributed ledger platform employed. OPSTAT for DDL operations is set by default for the relational data management and organization system 100; however, OPSTAT may be added at the end of a DML Write operation to fetch a more definitive status of that transaction. There are 3 possible responses expected while OPSTAT is used—SUCCESS, FAILURE or TIMEOUT.

2. QUERYLEVEL—The QUERYLEVEL feature works exclusively with DML Read operations (e.g., SELECT) to fetch metadata information about a particular record of the relational data management and organization system 100. There are two levels of information that may be obtained by using QUERYLEVEL—the first is basic information about a record and the second is a deeper query that provides granular information such as record creation date, last modified date, modified by user and other details.

3. BOOKMARK—This feature relates to the retrieval of table data in pages defined by record count in the relational data management and organization system 100. By default, every query executed with a limit on row count is accompanied by a bookmark value which acts as a reference to the next equally sized page of data based on the same criteria. It will be included with query results if the BOOKMARK keyword is provided (applicable to SELECT queries only).

4. ELEMENT_COLUMN_DEFAULT—This keyword is used with the UPDATE or INSERT SQL operations to indicate that the default value should be used for a table column in the relational data management and organization system 100. The default value may be assigned to a column while creating a table. Columns configured without a default value will not be impacted by this keyword. The ELEMENT SQL Specification in Appendix E below provides additional details of each of these keywords in combination with SQL syntax to form a variant of SQL syntax that may be used to represent queries and commands for processing by the relational data management and organization system 100.

The Service Layer Interface 114 includes functionalities that are to be supported in every realization of the relational data management and organization system 100 for a distributed ledger platform. The specification for the Service Layer Interface 114 covers the entire interface plus the subset of functions that may be realized in either this service layer or on the distributed ledger platform itself. These functions include:

Database creation and drop

Table creation, alter, and drop

Retrieval of database object metadata
DML operations, e.g., insert and select of records
Further DDL operations such as index creation, alter, and drop
User privilege management.

It is noted that modification and deletion in a distributed ledger context will always be done by the appending of changes or deletion indicators, because of the immutability of distributed ledger data history. The relational data management and organization system 100 is also required to provide bulk transaction support, covering at least record-level changes.

In sample embodiments, the service layer interface 114 is implemented in Node.js® and reused regardless of the SDK language or distributed ledger platform targeted. Servicing of requests received via the interface is performed by distributed-ledger-specific components 112; with some functions realizable only on the distributed ledger platform itself, as required to achieve smart contract integration.

The Distributed Ledger Platform with added ELEMENT features specification 120 describes functionality that is to be implemented directly on the distributed ledger platform in order for the relational functionality to be usable by smart contracts on that platform. Like the platforms themselves, these implementations will differ greatly in approach. These specifications set out what will still be common, including a common JSON-based data format for the relational data and schemas. The specifications are split into three categories: relational data on distributed ledger, access control, and smart contract integration.

1. Relational Data On Distributed Ledger (RDODL) Specification

Five familiar abstractions are used in specifying relational data and related functionality in the relational data management and organization system 100. They are: database, table, field, index, and record. There are significant differences in the way these concepts may be implemented for different distributed ledger platforms, but the following is true on every platform:

1. Each instance of each of the five element types will be represented by a standalone JSON document in the standard ELEMENT format.
2. These documents are written to the distributed ledger using the same method and consensus as other distributed ledger transactions.
3. Each modification or change in state to one of these elements is represented by appending to the distributed ledger a complete, updated version of the JSON document.

JSON Schema definitions for the five objects and minimum requirements for indexing are formally specified in the design of the relational data management and organization system 100.

2. Relational Data Access Control Specification

Implementations of the relational data management and organization system 100 support a coarse-grained access control which is defined for individual distributed ledger identities at the database level. The privileges granted to the five access levels are as follows:

SuperAdmin—Database management such as create and drop, plus all privileges of the Admin access level.
Admin—Access to privilege management functionality, plus all privileges of the DDL access level.
DDL—Access to functionality classified as DDL, which includes (for example) functions that change the schema of tables and indexes, plus all privileges of the DML Write access level.
DML Write—Access to functionality classified as DML Write, which includes data writes such as inserts, plus the privileges of the DML Read access level.
DML Read—Access to functionality classified as DML Read. Includes select queries of relational data, schema retrieval, viewing of statistics, and so forth.

Data Definition Language (DDL) refers to operations that change the structure, organization, or description of relational data. Data Manipulation Language (DML) refers to operations involving the relational data itself.

Implementations of the relational data management and organization system 100 base access on the same identities as are used for distributed ledger operations, which enables smart contract integration, and for the requirement that relational data have distributed ledger characteristics equivalent to other data stored on the distributed ledger.

3. Smart Contract Integration Specification

As mentioned, a key aspect of the relational data management and organization system 100 is the ability to access most of the relational data functionality directly from smart contracts. For smart contract integration, the smart contracts have the ability to execute equivalent functions to those specified for the Language Specific SDK 102, excluding DDL database operations. Distributed ledger considerations for these invocations, for example consensus and immutable recording of inputs and results, are equivalent to native smart contract execution. Also, invocation of these functions should conform to the form, naming, and semantics described in the Language Specific SDK 102 to the extent possible in the distributed ledger platform on which the relational data management and organization system 100 is being realized. DDL operations such as schema changes are excluded from smart contract integration because these operations often involve such extensive updates to relational storage that executing them within a single distributed ledger transaction would be unsupportable.

It will be appreciated that the Distributed Ledger Platform with added ELEMENT features specification 120 describes a set of common interfaces, syntax, and requirements that, no matter the implementation, enable relational data storage and operations on the distributed ledger using syntax and semantics already familiar to non-distributed-ledger programmers and that are identical across distributed ledger platforms, particularly the ability to use SQL syntax, which is common to all implementations of the relational data management and organization system 100. The storage is implemented using a standardized JSON data format that eases future data portability across distributed ledger platform implementations. A set of required functionalities are standardized across platforms, so the choice of distributed ledger platform may be a separate concern from the decision to use an RDODL platform like the relational data management and organization system 100. Such capabilities make possible relational data storage access that is consistent via the Language Specific SDK 102, user console and API, or smart contracts.

Relational Data Management and Organization System 100 on Hyperledger® Fabric In sample embodiments, a software development kit for Node.js® applications is provided that uses Hyperledger® Fabric for its distributed ledger platform.

Figure 2:
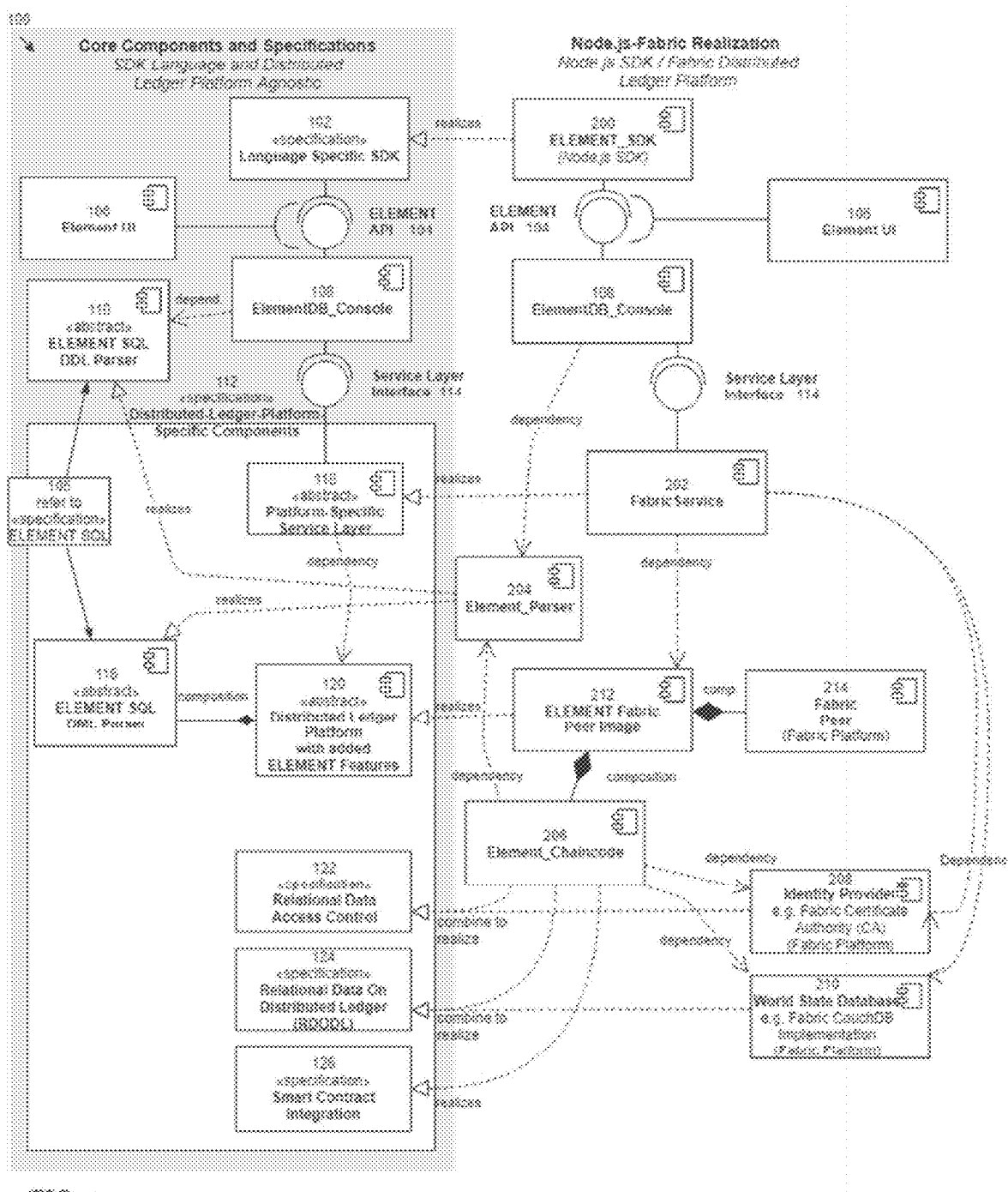
FIG. 2 is a block diagram of an implementation of the relational data management and organization system in a realization where Node.js® is the programming language and Hyperledger® Fabric is the distributed ledger platform used in sample embodiments.

FIG. 2 provides a visual outline of how the Fabric implementation realizes the specifications of the relational data management and organization system 100 described herein plus additional functionality. In sample embodiments, the RDODL realization of the relational data management and organization system 100 on Fabric involves the following aspects. The databases of the relational data management and organization system 100 make use of Fabric's "channel" concept. The Fabric Service Layer of the relational data management and organization system 100 uses the Fabric SDK (included with the distributed ledger platform) to create a Fabric channel each time a new database is requested. System chaincode, which includes functionality of the relational data management and organization system 100 is already present in the peer nodes and becomes accessible to the newly created channel. Channel creation also automatically sets up a new distributed ledger and "world state" database on all participating peer nodes. Also, the script initiates a transaction, invoking the system chaincode of the relational data management and organization system 100 to record high-level information about the database on the distributed ledger. All subsequent database write operations involve similar transactions and the appending of data objects to the distributed ledger in JSON formats pursuant to the RDODL specification. Each such append of database information to the ledger is also reflected by each peer in its world state database. This makes the current version of each data object quickly available for read operations.

In addition to the core components and specifications of the relational data management and organization system 100, FIG. 2 is a block diagram of an implementation of the relational data management and organization system in a realization where Node.js® is the programming language and Hyperledger® Fabric is the distributed ledger platform used. FIG. 2 focuses on how the Fabric/Node.js® implementation realizes the specifications outlined in FIG. 1 along with some additional functionalities.

As illustrated in FIG. 2, Node.js® SDK component 200 realizes the user-language-specific functionality of the Language Specific SDK 102 and enables developers to interact with the relational data management and organization system 100 directly from their application code. Details of the version of the Node.js® SDK component 200 developed for use with Node.js® applications is provided in Appendix F. The ELEMENTDB Console 108, ELEMENT API 104, ELEMENT UI 106, and Service Layer Interface 114 are common to all implementations, identical to FIG. 1. Below them, the ELEMENT FabricService 202 realizes the facade for all platform operations. ELEMENT FabricService 202 implements the Service Layer Interface 114 which acts as a middle man for interaction between the API layer and the distributed ledger. Its services help to perform RDBMS related operations as described in more detail in Appendix G. The realization of ELEMENT SQL parsing is realized by a component called Element_Parser 204 that appears twice in the Fabric realization. First, the Element_Parser 204 appears as a dependency of the ELEMENTDB Console 108 and realizes the DDL parser. This is common to all realizations. Second, the Element_Parser 204 appears as a dependency of the Element_Chaincode 206 and provides DML parsing, which makes DML SQL supportable in user chaincode smart contracts. The specification for the Element_Parser 204 is provided in Appendix H.

Supporting the FabricService 202 directly through its dependency on the Distributed Ledger Platform Plus ELEMENT Features specification are an identity provider (e.g., a Fabric Certificate Authority 208) to which users are registered and access privileges are recorded, and a world state database (e.g., the Fabric world state database 210) which is directly accessed for certain indexing capabilities, and the ELEMENT Fabric Peer Image 212, a core component of Hyperledger® Fabric 214 that is customized for the relational data management and organization system 100.

Element_Chaincode 206 is an additionally created system chaincode added to the ELEMENT Fabric Peer Image 212 that performs all database related operations on Fabric and also has dependencies on the identity provider (e.g., Certificate Authority 208) and world state database (e.g., Fabric world state database 210). Combined with the ledger storage in the peer itself, these empower the ELEMENT Fabric Peer 214 to realize relational data with access control. Also, since the user's smart contracts may call the system chaincode, this realizes Smart Contract Integration, as well. The specification for the Element_Chaincode 206 is provided in Appendix I.

Figure 3:
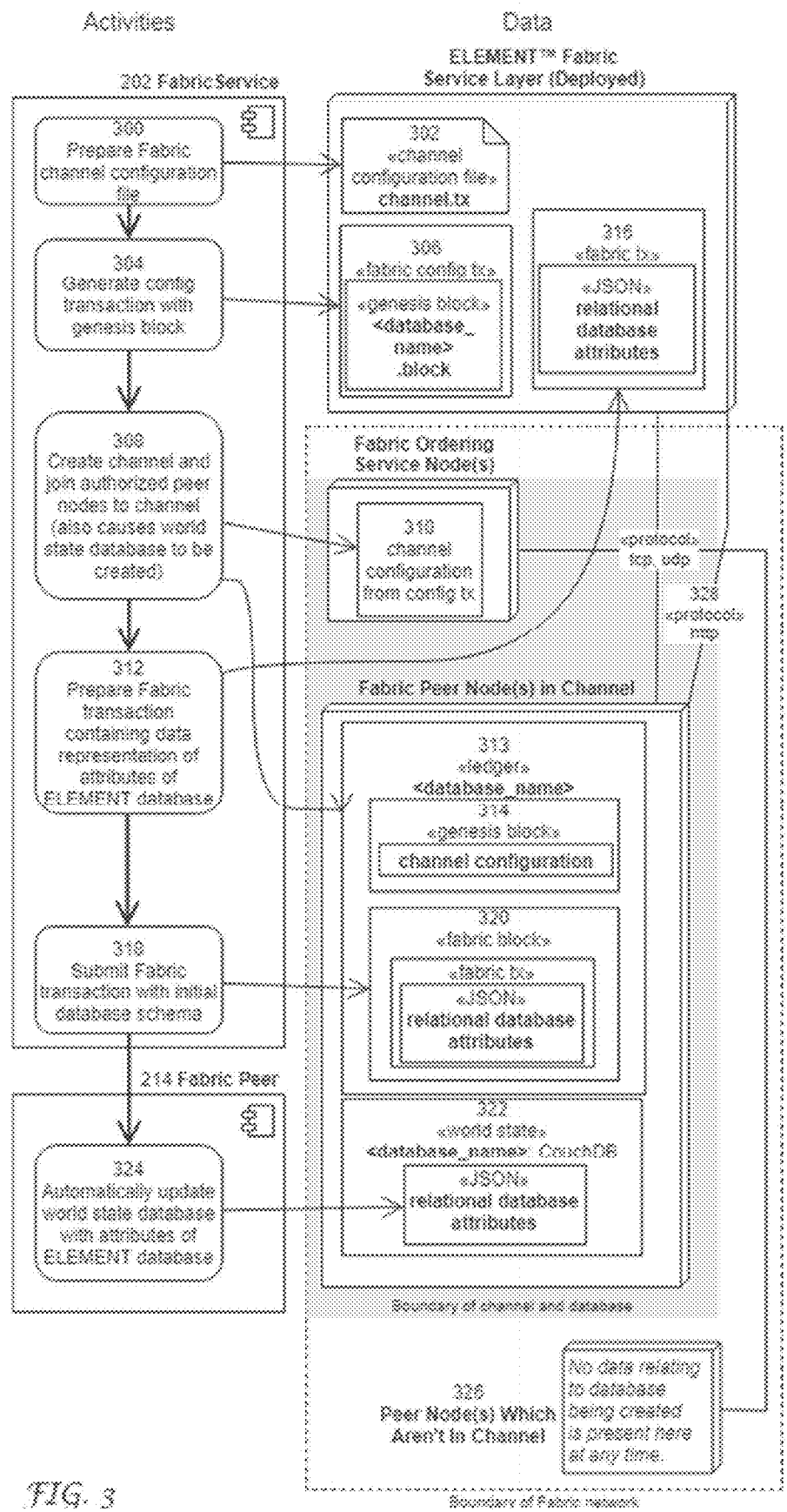
FIG. 3 is a block diagram illustrating the activities, components and data involved in database creation for the relational data management and organization system in sample embodiments.

FIG. 3 is a block diagram illustrating the activities, components and data involved in database creation for the relational data management and organization system 100. Data-wise, database creation involves two Fabric transactions. The first is a "configuration transaction" that creates the channel and defines which peers will maintain a copy of the database. The second is a regular transaction which writes metadata about the relational database itself.

FIG. 3 is a combination of a unified modeling language (UML) Activity model illustrated on the left and a UML object diagram overlaid on the topology of the ELEMENT Fabric Service Layer 202 (on the right) and a deployed Fabric network that hosts these objects. FIG. 3 illustrates the sequence of operations on the left side and the relevant data that exists during and immediately after the system is asked to create a new database in the relational data management and organization system 100 in Fabric on the right side. Creating a database makes use of Fabric's channel (distributed ledger data segregation) creation mechanism plus added functionality.

The blocks on the left half of FIG. 3 are components relevant to database creation, i.e. Fabric Service 202 and Fabric Peer 214. Three data objects are created by the service layer when initially processing a database creation request. As shown, a prepare Fabric channel configuration file activity 300 creates a «channel configuration file» channel.tx 302 for use by the network. A generate config transaction with the genesis block activity 304 creates a special Fabric transaction «fabric config tx» 306 that contains a genesis block and initiates the channel. A genesis block is the proposed first piece of data to be recorded to the distributed ledger, which contains its initial configuration. <database_name>.block is the genesis block itself. Both it and the channel are given names consistent with the name of the database of the relational data management and organization system 100. A create channel and join authorized peer nodes to channel activity 308 creates channel configuration data 310 from «fabric config tx» 306. The create channel and join authorized peer nodes to channel activity 308 also creates a ledger 313 that includes the genesis block 314 and a corresponding empty world state database 322. A prepare Fabric transaction activity 312 containing data representations of attributes of the database of the relational data management and organization system 100 creates a Fabric distributed ledger transaction «fabric tx» 316 that contains a JSON object representing the relational schema and other attributes that will govern data to be stored in this database of the relational data management and organization system 100. A submit Fabric transaction 318 with initial database schema incorporates the Fabric distributed ledger transaction «fabric tx» 316 into a Fabric block 320. Finally, the Fabric Peer 214 automatically updates the world state database 322 with attributes of the database of the relational data management and organization system 100 at 324.

Channels are boundaries within which data is shared in a Fabric distributed ledger network. A peer node outside the area 326 does not receive schema information or data. The network connections between the nodes are also shown. They include the normal interconnects between Fabric nodes, plus an HTTPS path 328 through which the Fabric SDK library (not shown) within the Fabric Service layer contacts a peer node. It is noted that the Fabric SDK is a component supplied by Hyperledger® Fabric and is included as a dependency in the Fabric Service of the relational data management and organization system 100 that allows client programs to initiate basic distributed ledger operations on the Fabric platform.

The full process by which channels are created and transactions processed in a Fabric network is not modeled, but the above objects are communicated to the network during those steps, and the remaining objects are created. First, when the channel is created, three items are obtained that are normal in Fabric for that process:
1. channel configuration from config.tx—The ordering service retains information from the channel configuration file using it to ensure channel data is restricted to participating nodes, among other things.
2. «ledger»<database_name>—Append-only data storage for the channel/database is created and replicated to every participating peer node.
3. «world state»<database_name>—Companion storage to the ledger that contains only the latest value for each item in the ledger is provided in a form that is much more efficiently queried. In the relational data management and organization system 100, this database could be a CouchDB® instance, which is one of the standard choices for Fabric.

After the channel is created, a normal Fabric transaction is processed containing the JSON representation of the database schema (relational data attributes).

Figure 4:
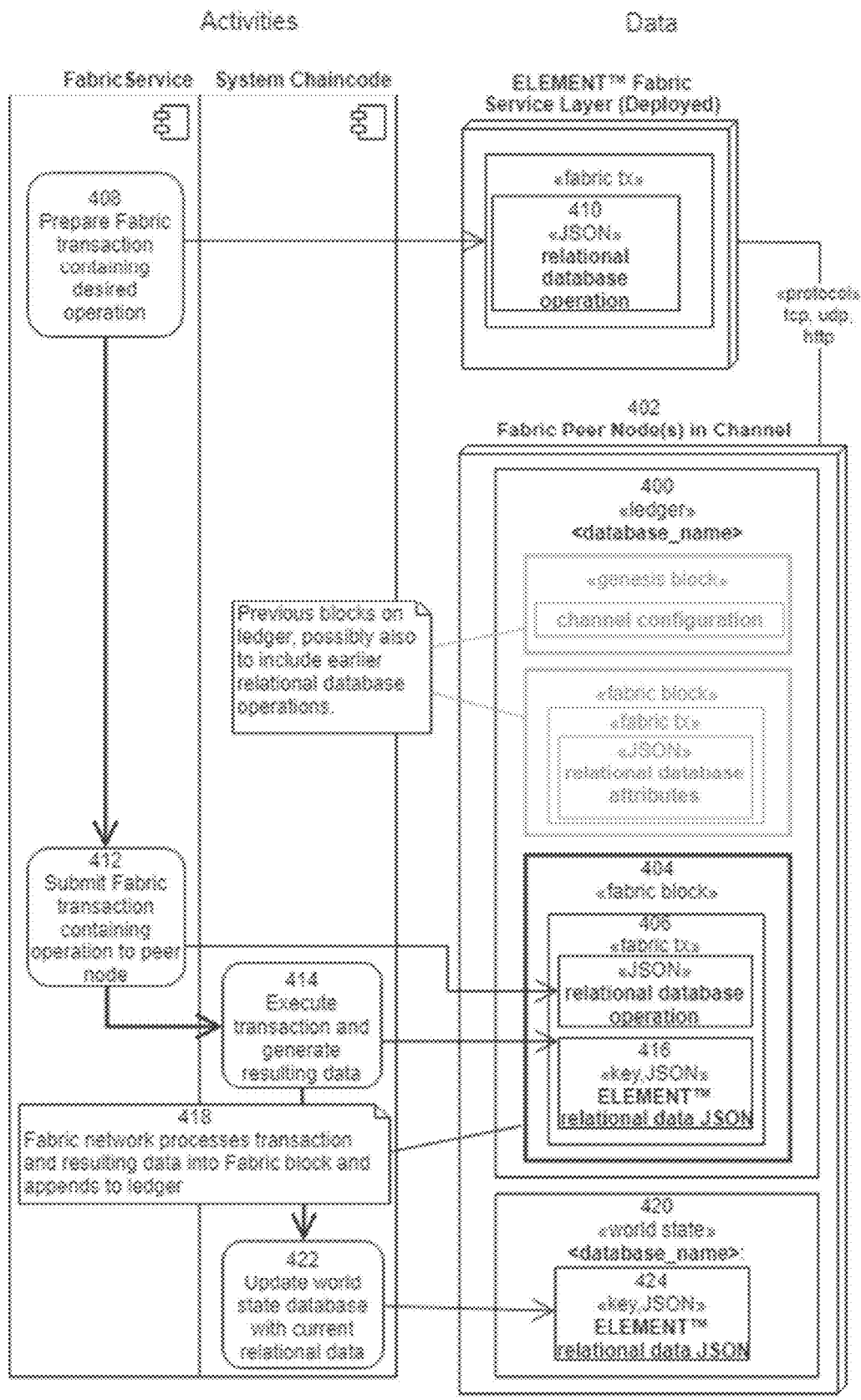
FIG. 4 is a block diagram illustrating an operation to write relational data to an existing database of the relational data management and organization system in sample embodiments.
Figure 5:
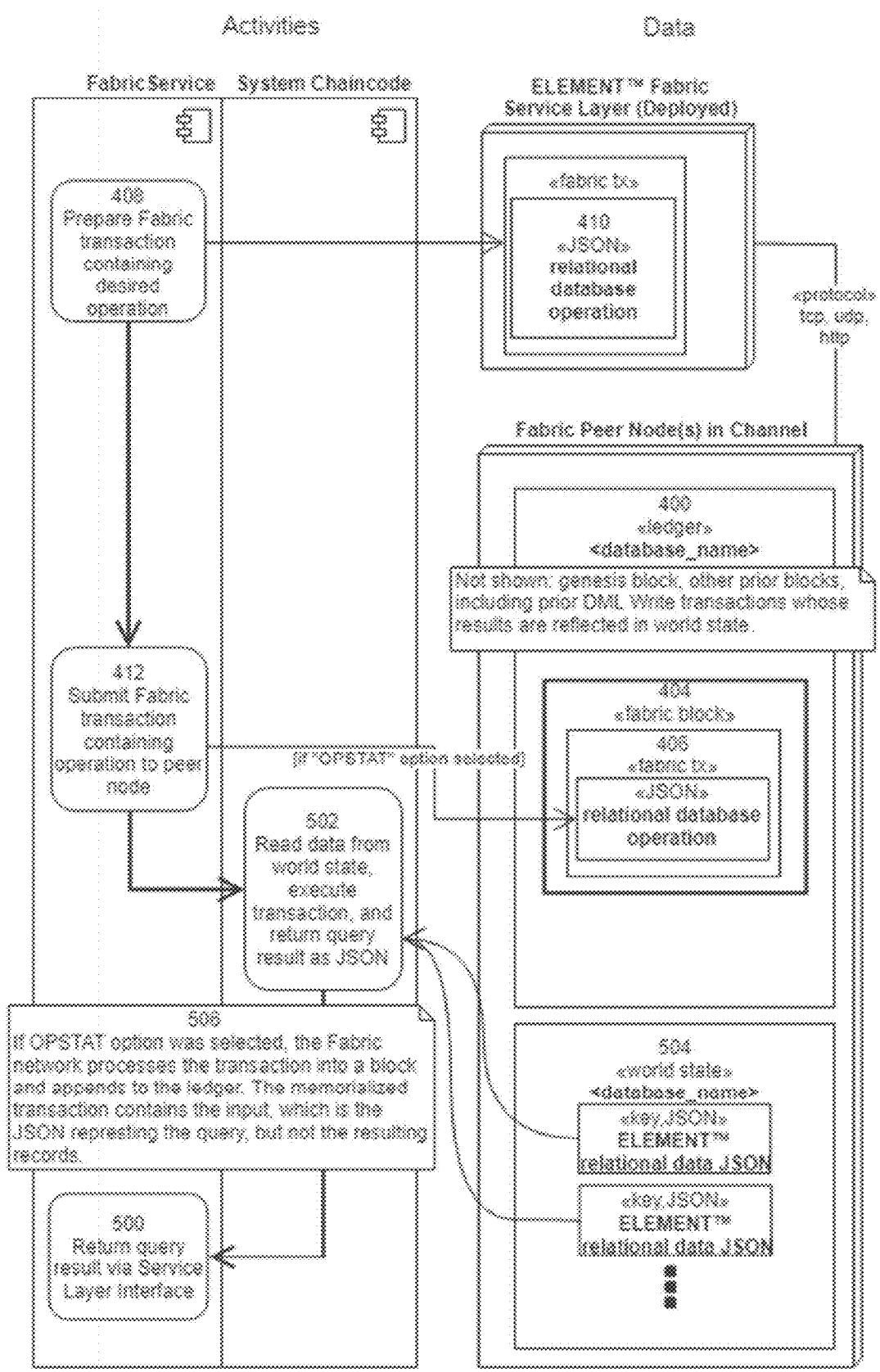
FIG. 5 is a block diagram illustrating the execution of Data Manipulation Language (DML) read queries requested by the user interface of the relational data management and organization system or by a user's application via the Language Specific SDK and application program interface of the relational data management and organization system in sample embodiments.

Subsequent relational database operations are represented as a JSON object in further appended Fabric transactions (with the exception of read queries for which committing to the ledger was explicitly excluded). FIG. 4 illustrates the execution of DML write operations. This process creates JSON relational data objects that, once brought into the world state database, may be used by the system chaincode of the relational data layer 100 to respond to queries and other requests. FIG. 5 shows this, depicting the execution of DML read queries requested by the ELEMENT UI 106 or by a user's application via the Language Specific SDK 102 and ELEMENT API 104.

FIG. 4 is a block diagram illustrating an operation to write relational data to an existing database of the relational data management and organization system 100. Swimlanes on the left represent two participating components, FabricService and the System Chaincode of the relational data management and organization system 100. UML Activities inside each swimlane represent the key activities they perform. Bold arrows connect the activities in order, and additional arrows connect to the data object affected by the activity.

Walking through an update operation, the «ledger»<database_name>object 400 within the Fabric Peer node 402 in the defined channel is the same ledger created in FIG. 3 that may be replicated in each peer node. An additional «fabric block» 404 has been appended within it which contains a «fabric transaction» 406 specifying a relational database operation. This specific operation would have been received from the user in an upstream process including the preparation of a Fabric transaction 408 containing a desired operation that creates the «fabric tx» and submits the Fabric transaction containing the operation to a peer node at 412 for execution of the transaction and the generation of the resulting data at 414 as illustrated under the Activities section located on the left half of FIG. 4. The transaction also contains the results of that operation, which would have been executed by System Chaincode of the relational data management and organization system 100 when the transaction was processed into a block. In some cases, this execution would also involve the chaincode reading data from the world state database. This flow is not shown but may be understood from the DML Read operation in FIG. 5.

The resulting ELEMENT relational data JSON 416 contains objects representing new or changed tables, records, users, and database attributes. Each of these has a unique key identifying the data affected. The Fabric network processes the transaction and the resulting data into a Fabric block at 418 and appends the Fabric block to the ledger 400. In addition to being recorded permanently in the ledger 400 as part of the transaction, the system chaincode updates the world state database 420 with the currently relational data at 422, where the data flows to the «world state» database 420, the same world state database as was created in FIG. 3. There, older entries with the same key are overwritten, with the relational data as the world state database contains just the current state of the database of the relational data management and organization system 100, while the ledger 400 preserves its history. One such object 424 is shown within the world state database 420, but in practice there will be many keys and objects.

FIG. 5 has a similar premise as FIG. 4, with all the components and data objects remaining unchanged. The only difference is the Activities and processes that the data objects go through while processing a DML read operation. The Activities section in the Fabric Service component is fairly similar to FIG. 4 except that the service layer receives a query response at 500 after DML Read operation is executed successfully.

In sample embodiments, the system chaincode executes a query at 502 against the world state database instance 504 with relevant ELEMENT data JSON flowing in return. The system chaincode further processes this data to produce a query result 500 back to the initiator of the query. The read happens on the world state data, so subsequently there is no modifications made on the world state like the update scenario. The DML Read does not access the peer ledger 400. However, the Fabric transaction is logged on the ledger of the peer node upon which the transaction is conducted to keep a record of the operation, unless the default "OPSTAT" option is overridden. If the "OPSTAT" option was selected at 506, the Fabric network processes the transaction into a block and appends the block to the ledger 400. The memorialized transaction contains the input, which is the JSON representing the query but not the resulting records.

DML Read operations that are initiated from user chaincode (smart contracts) operate similarly to FIG. 5, except that the query result is returned directly to the smart contract for its further processing.

In order to realize the five required levels of database access permissions, two Fabric mechanisms are re-used. First, since database creation requires the prerequisite power to create Fabric channels, only the Fabric network administrator is eligible for that permission. For the remaining four access levels, ELEMENT Fabric piggybacks on top of Fabric's existing identity provider functionality. The ELEMENT Fabric relational data access control realization on Fabric thus involves database specific attributes that are appended to every user while registering it to the identity provider. Also, attributes adjoined to the user's registration pertain to its specific access for that database. Subsequently, a transaction to the ELEMENT system chaincode may be initiated to add the user to the database metadata.

Figure 6:
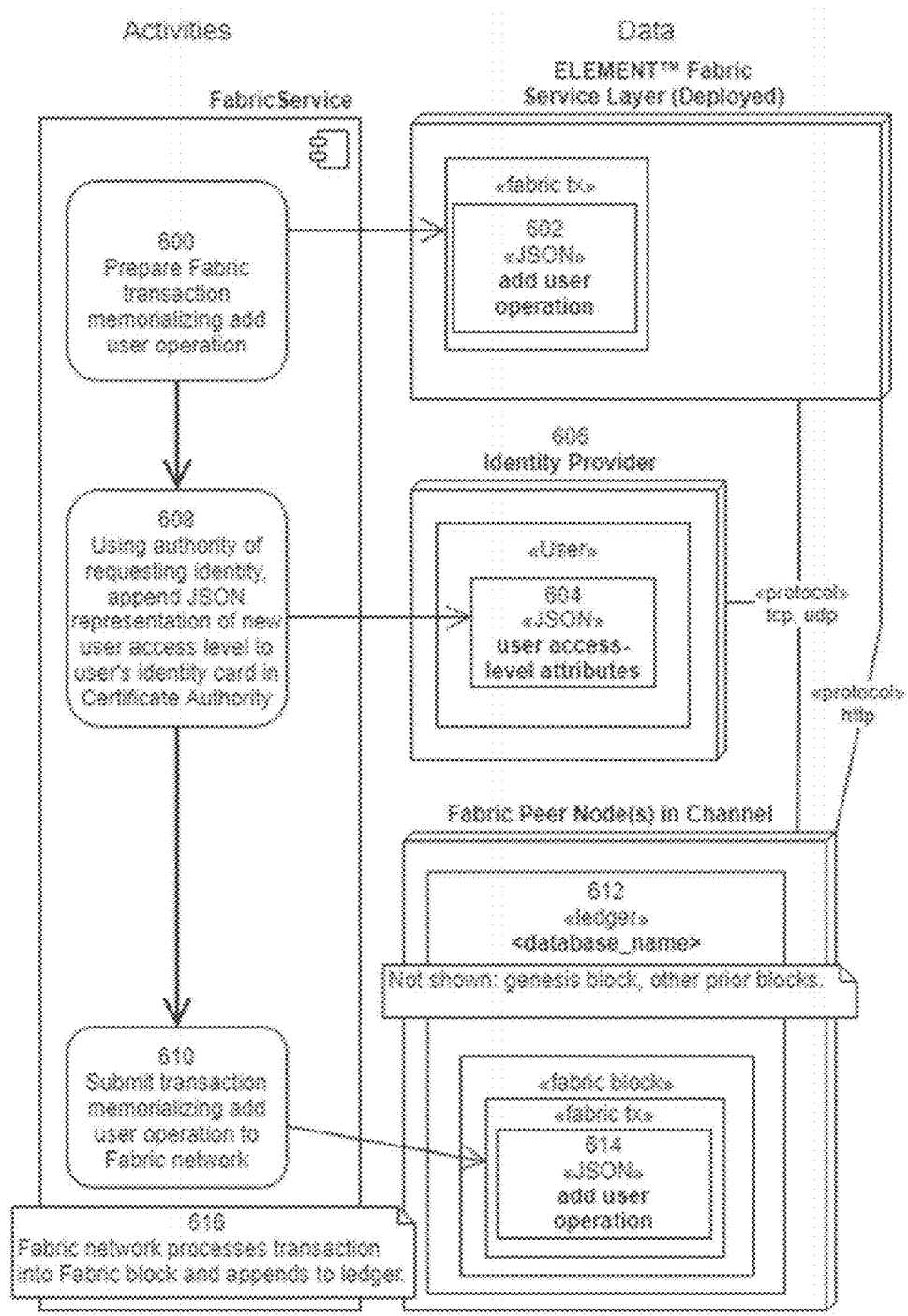
FIG. 6 is a block diagram illustrating the components and data involved in the first part of relational data access control for the addition of users for access below the super-admin level in sample embodiments.

FIG. 6 is a block diagram illustrating the components and data involved in the first part of relational data access control for the addition of users for access below the super-admin level. The control process involves two steps. The first is enrolling a user with database specific attributes in an identity provider such as a Fabric Certificate Authority by preparing a Fabric transaction memorializing the add user operation at 600 to create the add user operation 602. The second is a regular transaction which adds the user to the database itself by using the authority of the requesting entity to append a JSON representation 604 of the new user access level to the user's identity card in the identity provider 606 at 608.

Like FIG. 3, FIG. 6 is a UML object model laid over the topology of an executing ELEMENT Fabric Service Layer and relevant Fabric network. The UML object models the Fabric Service component and related sequential Activities mentioned on the left section of the model and representation of associated data on the right, for adding a user to the relational data management and organization system 100. The model explanations and operational premises from FIG. 3 apply here, with the notable addition of an identity provider such as the Fabric Certificate Authority node 606, although, only the affected sections are displayed in the model. The UML model connects with the service layer, Fabric peer node and ordering service nodes, serving them information about distributed ledger identities. The ordering service and its connections are not shown in this model as they have no special role in this process, beyond what is usual in Fabric transaction processing. It is noted that the Ordering Service node and identity provider (e.g. Certificate Authority) are at the same time likely to be serving other peer nodes, channels, and perhaps databases of the relational data management and organization system 100.

The data objects in FIG. 6 are created during the addition of a new user to one ELEMENT database. The addition of a user is built atop Fabric's existing identity management, similar to how the database itself is built on a Fabric channel and its ledger. In fact, the highest level of access, Super Admin is an exact reuse of Fabric's administrator role. FIG. 6 relates to adding a user with one of the four lower ELEMENT access levels. The model may be divided into three parts in the rough order of their involvement in the process:
1. ELEMENT Fabric Service Layer Node
2. Identity Provider Node, e.g., Certificate Provider (CA)
3. Element Fabric Peer Nodes and Ordering Service Nodes The initial part of the process involves the first two of these: the ELEMENT Fabric Service Layer arranges for the identity provider (e.g., Fabric Certificate Authority 606) to enroll a user identity or to locate the relevant identity if it already exists, and to add ELEMENT privilege attributes to that identity. Note that it is possible but not shown that multiple identity provider nodes may be supporting a given channel and its ELEMENT database. In this case, the process is essentially the same except for specifying which authority is involved.

The «User» object 604 is the representation of that identity in the identity provider (e.g., Certificate Authority 606), sometimes called an "identity card." It is extensible with custom attributes, and the relation data management and organization system 100 takes advantage of this by adding an attribute that represents the identity's access privilege level to an ELEMENT database. The attribute takes the form of a JSON object labeled user access-level attributes 604 in the model.

The other part of the process is a corresponding Fabric transaction 610 to log the access level change in the distributed ledger 612. This transaction 610 is prepared in the service layer (the «fabric tx» 614 containing the add user operation JSON) and added to the «ledger» 612 in a process that first passes it through one peer node, then the ordering service, and finally back to all of the peer nodes as part of a block which is appended to the ledger 612 at 616.

The ledger 612 is the same as was illustrated in FIGS. 3-5. The model focuses on the new «fabric block» containing the add user operation JSON 614, but that block 614 would actually be appended after the genesis and configuration blocks (excluded in this model) of FIG. 3 and any number of blocks for relational operations as illustrated in FIG. 4 and FIG. 5.

After user access levels are defined, the distributed-ledger-specific components read them during each relational database operation to determine if the operation is authorized. The relational database operations occur in two steps. The identity is verified by an identity provider, and the access level is checked. Access is granted for the corresponding function only if the invoking user's access level is found to be appropriate to invoke the function, following which the actual function is executed as described above with respect to FIG. 3.

Achieving the required integration with user smart contracts is straightforward in the Fabric realization. User chaincode is able to call ELEMENT system chaincode directly, which gives access to all the DML features except the bulk operations.

However, the default Fabric setup does not allow system chaincode plugins. The primary change involves rebuilding the Fabric peer with a build tag that allows ELEMENT system chaincode to be deployed. After this the peer's base configuration file requires modification in the path to the compiled ELEMENT system chaincode binary. This allows Fabric peer(s) to read and start the ELEMENT system chaincode upon restart.

The Fabric-specific service layer accepts database commands from the common Console/Parser/API component and translates them to action by invoking a combination of the ELEMENT system chaincode, an identity provider such as a Fabric Certificate Authority, and a world state database as described above.

The ELEMENT Node.js® SDK primarily includes wrapper functions for calling the common Console/Parser/API component from a developer's Node.js® application. Specifically, the ELEMENT Node.js® SDK provides wrapper functions to create a connection with the relational data management and organization system 100, perform DDL operations to define tables and indexes, perform DML operations for data writing and querying, and add a custom smart contract to the channel.

Figure 7:
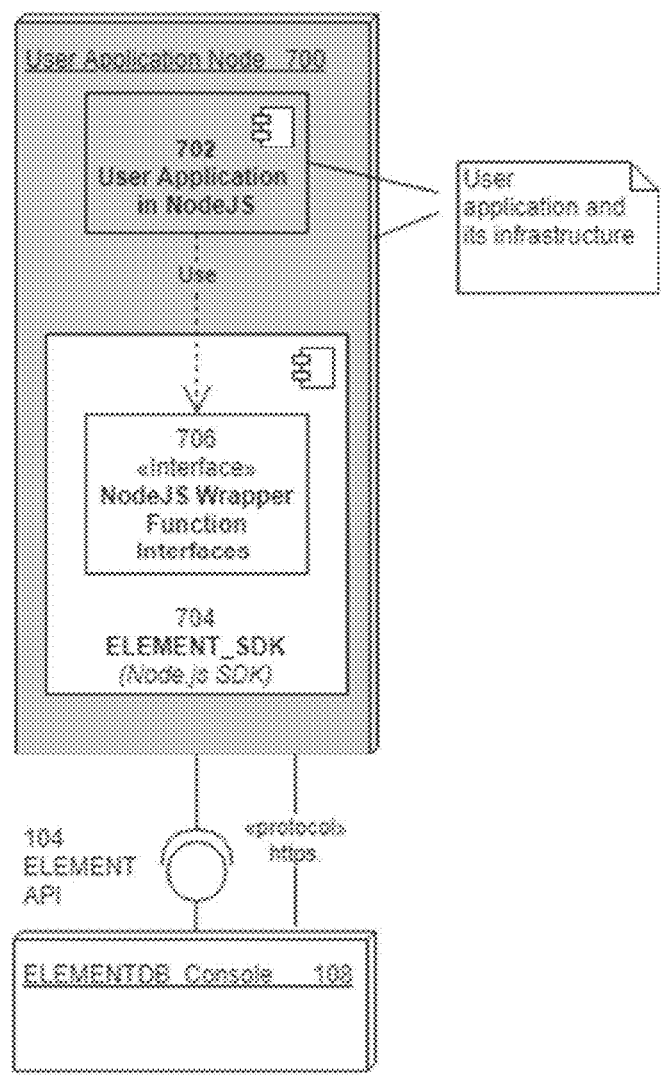
FIG. 7 is a block diagram illustrating the interaction of the ELEMENT Fabric-Node.js® SDK with a user's application and the execution environment in which they are both hosted, which is modeled as the User Application Node in sample embodiments.

FIG. 7 is a block diagram illustrating the interaction of the ELEMENT Fabric-Node.js® SDK with a user's application 702 and the execution environment in which they are both hosted, which is modeled as the User Application Node 700. This node 700 covers a broad range of potential implementations, constrained by required support for Node.js® and the ability to be configured to communicate over HTTPS with a running instance of the ELEMENT Console 108 via its REST ELEMENT API 104 as shown.

Drilling down into the User Application Node 700 in FIG. 7, the User Application 702 in Node.js® is modeled as a component with a dependency on the Fabric/Node.js® ELEMENT SDK 704, which is also installed. Node.js® Wrapper Function Interfaces 706 define the functions directly available to the user's application code 702. These interfaces 706 conform generally to the Language Specific SDK «specification» 102 described with respect to FIG. 1. However, they go beyond the specification in a few ways, supporting some additional Fabric-specific features. This is reflected in the modeling by the inclusion of "Fabric" in the SDK's name. Code in ELEMENT_SDK 704 implements that interface, translating SDK function calls into calls to the ELEMENT API 104.

Beyond the functions required by the ELEMENT specifications, the Fabric/Node.js® realization also includes the abilities to deploy smart contracts (user chaincode) via the ELEMENTDB Console 108 or Language Specific SDK 102 and to maintain physical separation (in the physical versus logical sense) between created databases.

It will be appreciated that the Fabric/Node.js® embodiment provides relational data on a distributed ledger with physical separation between databases as well as a relational data implementation on Fabric that maximizes the reuse of built-in properties of the Fabric platform, thus improving performance and reducing the possibility that platform changes will introduce breaking changes. A programmer-friendly SDK also unifies the structuring of relational data on distributed ledger with the deployment of smart contracts that use that data.

Figure 8:
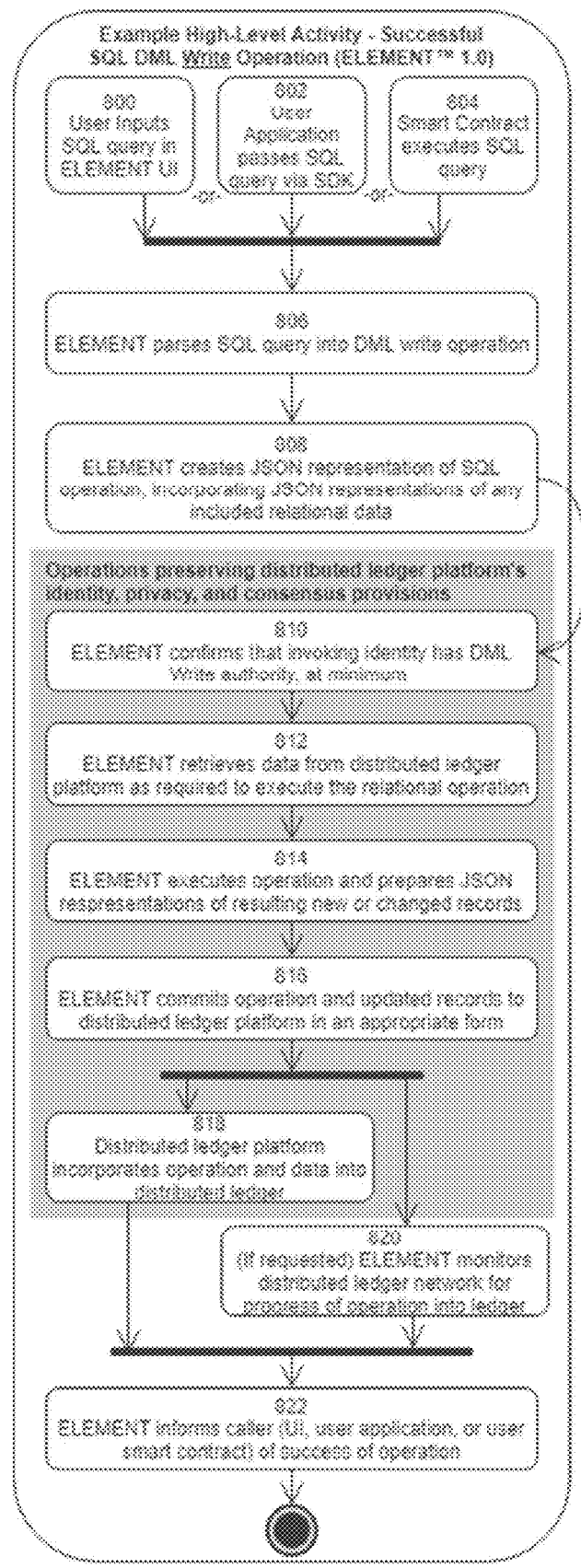
FIG. 8 is a logical flow diagram of an example of a successful SQL DML write operation to a distributed ledger using the relational data management and organization system in sample embodiments.
Figure 9:
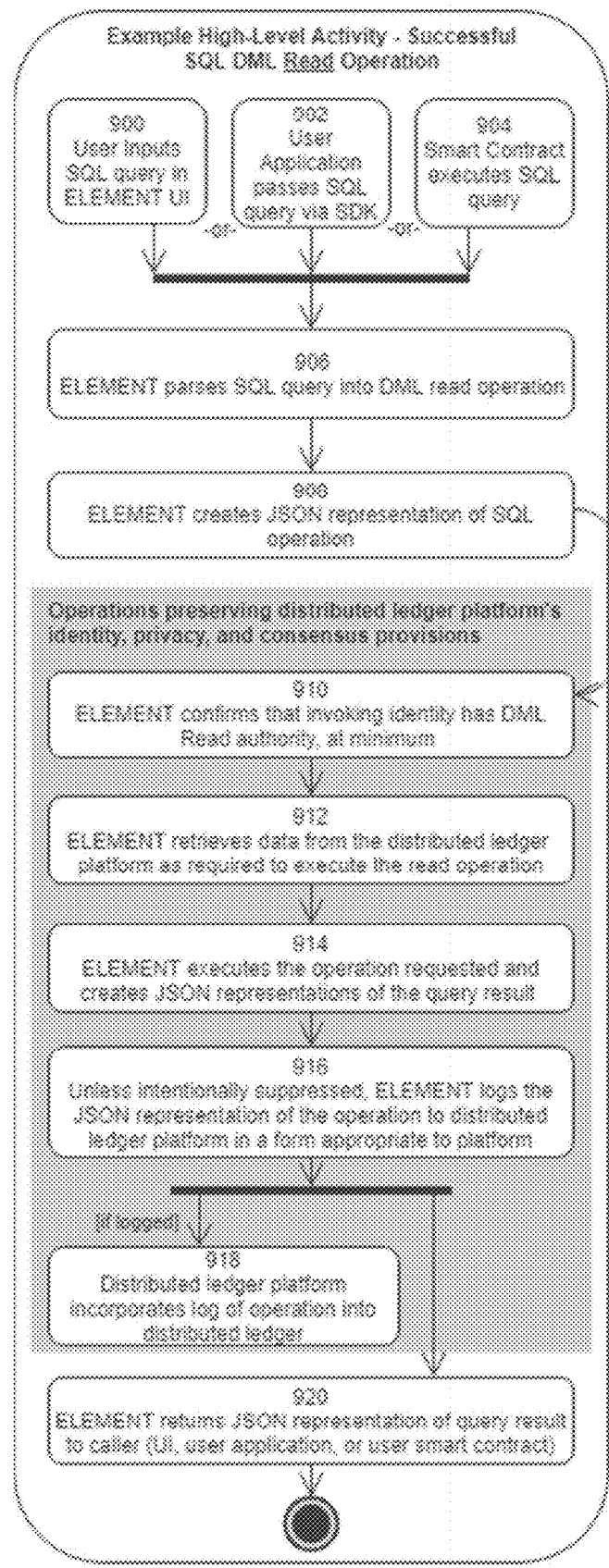
FIG. 9 is a logical flow diagram of an example of a successful SQL DML read operation from a distributed ledger using the relational data management and organization system in sample embodiments.

It will be appreciated by those skilled in the art that the full ANSI SQL language specification is not supported, nor are stored procedures per se. However, user chaincode provides similar ability to couple logic and relational data if desired). By way of example, FIG. 8 and FIG. 9 illustrate use of the relational data management and organization system 100 to implement SQL DML write and read operations. Those skilled in the art will appreciate that the techniques described herein may also be used to implement other SQL activities for interaction with data stored in databases implemented on the distributed ledger as described herein.

FIG. 8 is a logical flow diagram of an example of a successful SQL DML write operation to a distributed ledger using the relational data management and organization system in sample embodiments. As illustrated, the SQL query may be received by the relational data management and organization system 100 in at least three ways: the user may input an SQL query into ELEMENT UI 106 at 800; a user application may pass an SQL query via the ELEMENT SDK 200 at 802; or a smart contract may execute an SQL query at 804. The received SQL query is parsed into a DML write operation at 806. The relational data management and organization system 100 then creates a JSON representation of the SQL operation and incorporates JSON representations of any included relational data at 808. The JSON representation (ELEMENT SQL) is then processed by Fabric/Node.js® operations that preserve the distributed ledger's identity, privacy, and consensus provisions. Such operations include confirming that the invoking identity has at least DML write authority at 810. The relational data management and organization system 100 then retrieves data from the distributed ledger platform as required to execute the relational operation at 812 and executes the operation and prepares JSON representations of the resulting new or changed records at 814. The operation and updated records are committed to the distributed ledger platform in a form appropriate to the distributed ledger platform at 816 in order to preserve records of any changes. The distributed ledger platform then incorporates the operation and data into its distributed ledger at 818. Also, if requested, the relational data management and organization system 100 monitors the distributed ledger network for progress of the operation into acceptance by the distributed ledger at 820. Finally, the relational data management and organization system 100 informs the caller (UI 106, user application 200, or user smart contract) of the success of the operation at 822. This process may be repeated for each new SQL DML write operation.

On the other hand, FIG. 9 is a logical flow diagram of an example of a successful SQL DML read operation from a distributed ledger using the relational data management and organization system 100 in sample embodiments. As illustrated, the SQL query may be received by the relational data management and organization system 100 in at least three ways: the user may input an SQL query into ELEMENT UI 106 at 900; a user application may pass an SQL query via the ELEMENT SDK 200 at 902; or a smart contract may execute an SQL query at 904. The received SQL query is parsed into a DML read operation at 906. The relational data management and organization system 100 then creates a JSON representation of the SQL operation at 908. The JSON representation (ELEMENT SQL) is then processed by Fabric/Node.js® operations that preserve the distributed ledger's identity, privacy, and consensus provisions. Such operations include confirming that the invoking identity has at least DML read authority at 910. The relational data management and organization system 100 then retrieves data from the distributed ledger platform as required to execute the read operation at 912 and executes the operation requested and creates JSON representations of the query result at 914. Unless intentionally suppressed, the relational data management and organization system 100 logs the JSON representation of the operation to the distributed ledger platform in a form appropriate to the distributed ledger platform at 916 in order to preserve records. The distributed ledger platform then incorporates the log of the operation into its distributed ledger at 918. Finally, the relational data management and organization system 100 returns the JSON representation of the query result to the caller (UI 106, user application 200, or user smart contract) at 920. This process may be repeated for each new SQL DML read operation.

Figure 10:
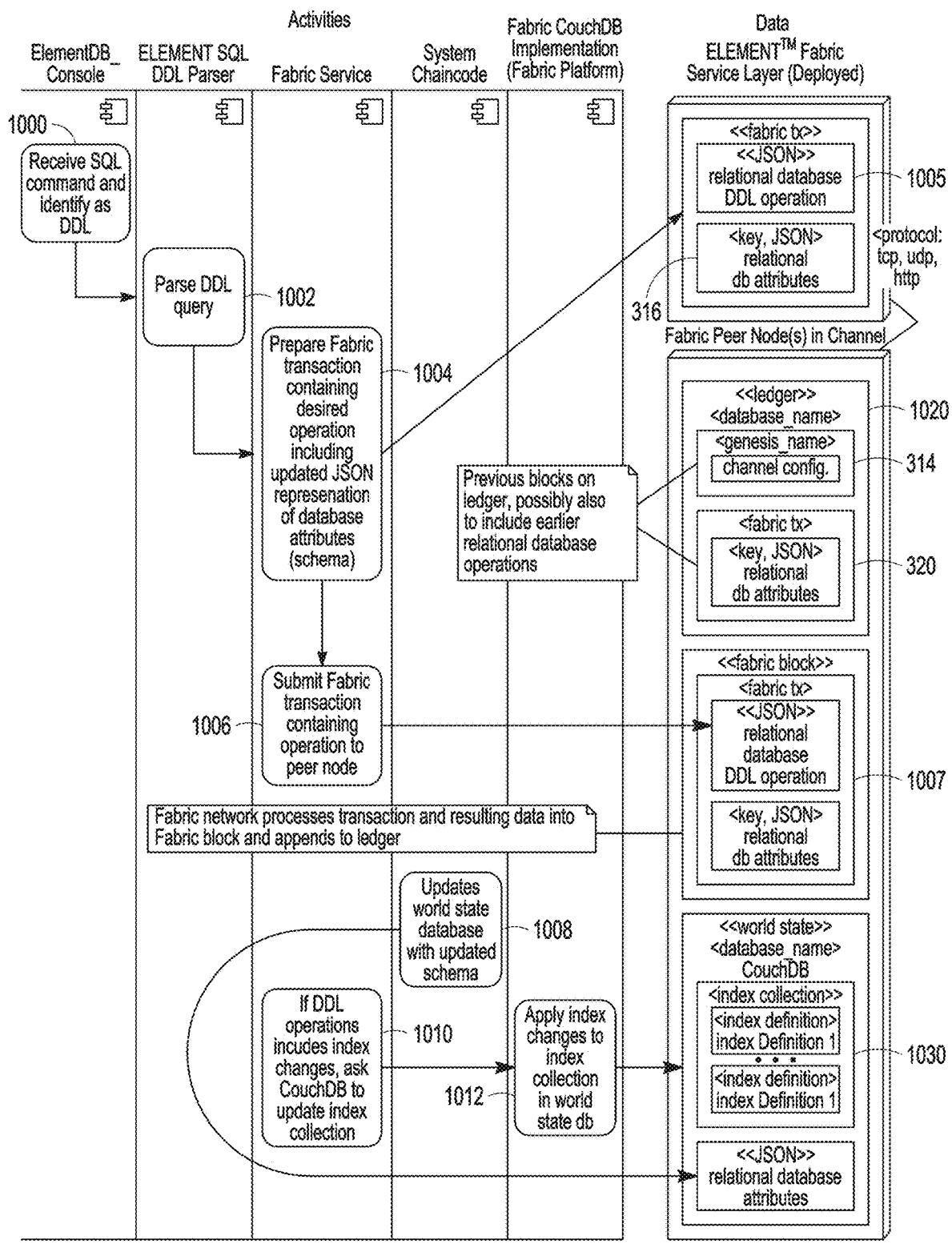
FIG. 10 is a block diagram illustrating the successful execution of Data Definition Language (DDL) writes in sample embodiments.

FIG. 10 is a block diagram illustrating the successful execution of Data Definition Language (DDL) writes in the Fabric realization. Such operations modify or extend the schema of an existing relational data management and organization system database. The swimlanes on the left portion of the diagram represent components responsible for DDL operations. Activities within each lane are specific to the marked component and describe the component's possible contribution to the process. Like previous figures, the flow of the process is denoted by bold arrows between steps which may be causally connected. Additionally, regular arrows connect the activities to the data objects they may create or modify, which are depicted in the object model (denoted by Data) on the right.

DML Write operations may be identified and handled by the ELEMENTDB_Console 108. For example, the ELEMENTDB_Console 108 may receive an SQL command and identify it as DDL at 1000. Handling of the SQL command may include parsing by the Element SQL DDL parser 110 at 1002 to convert the SQL description of the operation to a form that may be processed and represented on the distributed ledger platform. The converted form may be further processed by a FabricService component at 1004 into a Fabric transaction containing the desired operation including an updated JSON representation of database attributes (schema) 1005 that may exist as data within a deployed Fabric Service Layer. The FabricService component may also cause the resulting Fabric transaction to be submitted over a network connection to a Fabric Peer Node in the channel associated with the relational data management and organization system database at 1006. Normal processing by the Fabric network would then incorporate that transaction into a block and append that block to previous ones 1007 in the ledger 1020 for that channel. It is implicit in such appending that the block will be identically appended to other Peer Nodes in the channel. Because the changed relational data attributes may be represented as a piece key-value-pair distributed ledger data, Fabric's System Chaincode may subsequently update the world state database entry at 1008, for with this more recent relational database attributes, overwriting the prior attributes which would have been stored under the same key. In cases where there are index changes indicated by the DDL operation, the relational management and organization system may effect them in practice by direct modification of the world state database's indexing, for example a CouchDB® instance's index collection 1030 at 1010. The index collection 1030 contains the indexes that have been defined for the relational data management and organization system database upon which the operation is being executed. These changes may be requested by the FabricService, received by the world state database's indexing implementation, and subsequently applied to the «world state» database at 1012, causing the application of the updated indexing to subsequent query operations involving the world state database.

Computer Embodiment

Figure 11:
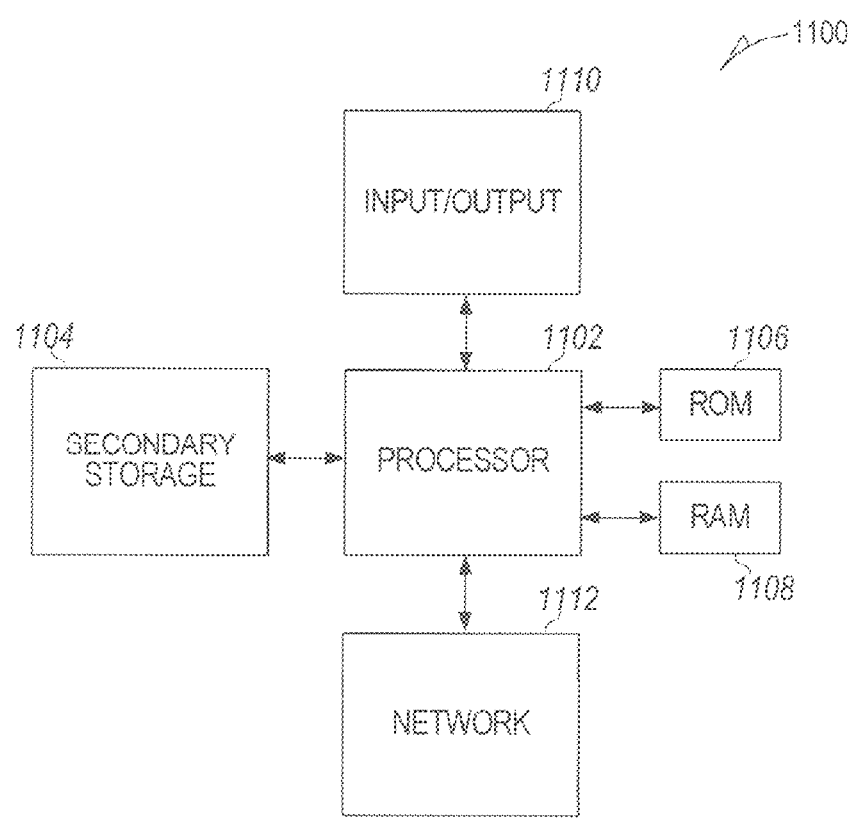
FIG. 11 is a block diagram of a typical, general-purpose computer that may be programmed into a special purpose computer suitable for implementing one or more embodiments of the relational data management and organization disclosed herein.

FIG. 11 is a block diagram of a typical, general-purpose computer 1100 that may be programmed into a special purpose computer suitable for implementing one or more embodiments of the relational data management and organization system 100 disclosed herein. The relational data management and organization system 100 described above may be implemented on any general-purpose processing component, such as a computer with sufficient processing power, memory resources, and communications throughput capability to handle the necessary workload placed upon it. The computer 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

The devices described herein may be configured to include computer-readable non-transitory media storing computer readable instructions and one or more processors coupled to the memory, and when executing the computer readable instructions configure the computer 1100 to perform method steps and operations described above with reference to FIG. 1 to FIG. 10. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure may be installed in and sold with one or more servers and/or one or more routers and/or one or more devices within consumer and/or producer domains consistent with the disclosure. Alternatively, the software may be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments may be implemented, at least in part, in digital electronic circuitry, analog electronic circuitry, or in computer hardware, firmware, software, or in combinations of them. These components may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the techniques described herein may be easily construed as within the scope of the present disclosure by programmers skilled in the art. Method steps associated with the illustrative embodiments may be performed by one or more programmable processors executing a computer program, code or instructions to perform functions (e.g., by operating on input data and/or generating an output). Method steps may also be performed by, and apparatus may be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory may be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

The above-presented description and figures are intended by way of example only and are not intended to limit the illustrative embodiments in any way except as set forth in the appended claims. It is noted that various technical aspects of the various elements of the various exemplary embodiments that have been described above may be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

APPENDIX A

HYPERLEDGER® FABRIC OVERVIEW

Hyperledger® Fabric Model

The key design features woven into Hyperledger® Fabric that fulfill its promise of a comprehensive, yet customizable, enterprise distributed ledger solution include:

- Assets — Asset definitions enable the exchange of almost anything with monetary value over the network, from whole foods to antique cars to currency futures.

- Chaincode — Chaincode execution is partitioned from transaction ordering, limiting the required levels of trust and verification across node types, and optimizing network scalability and performance.

- Ledger Features — The immutable, shared ledger encodes the entire transaction history for each channel and includes SQL-like query capability for efficient auditing and dispute resolution.

- Privacy — Channels and private data collections enable private and confidential multi-lateral transactions that are usually required by competing businesses and regulated industries that exchange assets on a common network.

- Security & Membership Services — Permissioned membership provides a trusted distributed ledger network, where participants know that all transactions can be detected and traced by authorized regulators and auditors.

- Consensus — A unique approach to consensus enables the flexibility and scalability needed for the enterprise.

Assets

Assets can range from the tangible (real estate and hardware) to the intangible (contracts and intellectual property). Hyperledger® Fabric provides the ability to modify assets using chaincode transactions.

Assets are represented in Hyperledger® Fabric as a collection of key-value pairs, with state changes recorded as transactions on a <u>Channel</u> ledger. Assets can be represented in binary and/or JSON form.

Assets may be defined and used in Hyperledger® Fabric applications using the <u>Hyperledger Composer</u> tool.

Chaincode

Chaincode is software defining an asset or assets in smart contracts, and the transaction instructions for modifying the asset(s); in other words, it is the business logic. Chaincode enforces the rules for reading or altering key-value pairs or other state database information. Chaincode functions execute against the ledger's current state database and are initiated through a transaction proposal. Chaincode execution results in a set of key-value writes (write set) that can be submitted to the network and applied to the ledger on all peers.

Chaincodes are completely free of identities. A Chaincode can also call another Chaincode, but the transaction identity is always kept constant as the transaction signer who submitted the transaction throughout the calling chain. On a Fabric network, setting up an escrow account therefore involves adding an external party. As a result, the external account responsible for the escrow must prove its neutrality to the rest of the participants.

Deploying a Chaincode is a two-step process. Because the executable binary for the Chaincode does not actually live on the ledger, they must first be installed on every endorsing peer selected to support it. Next the whole channel must agree on the exact version of the Chaincode to execute and the endorsement policy for transactions, by a step called "Chaincode instantiation". The user submitting the instantiation transaction must pass the validation against the "instantiation policy" to ensure they are approved to do so according to the predetermined rules when the consortium was established.

Chaincodes are upgradeable. They get assigned a name and version. When upgrading, a new version will be assigned and all existing states are inherited automatically.

Ledger Features

The ledger is the sequenced, tamper-resistant record of all state transitions in the fabric. State transitions are a result of chaincode invocations ('transactions') submitted by participating parties. Each transaction results in a set of asset key-value pairs that are committed to the ledger as creates, updates, or deletes.

The ledger is comprised of a blockchain ('chain') to store the immutable, sequenced record in blocks, as well as a state database to maintain current fabric state. There is one ledger per channel. Each peer maintains a copy of the ledger for each channel of which they are a member.

Some features of a Fabric ledger:

- Query and update ledger using key-based lookups, range queries, and composite key queries

- Read-only queries using a rich query language (if using CouchDB® as state database)

- Read-only history queries — Query ledger history for a key, enabling data provenance scenarios

- transactions consist of the versions of keys/values that were read in chaincode (read set) and keys/values that were written in chaincode (write set)

- Transactions contain signatures of every endorsing peer and are submitted to ordering service

- Transactions are ordered into blocks and are "delivered" from an ordering service to peers on a channel

- Peers validate transactions against endorsement policies and enforce the policies

- Prior to appending a block, a versioning check is performed to ensure that states for assets that were read have not changed since chaincode execution time
- There is immutability once a transaction is validated and committed
- A channel's ledger contains a configuration block defining policies, access control lists, and other pertinent information
- Channels contain Membership Service Provider instances allowing for crypto materials to be derived from different certificate authorities See the Ledger topic for a deeper dive on the databases, storage structure, and "query-ability."

Privacy

Hyperledger® Fabric employs an immutable ledger on a per-channel basis, as well as chaincode that can manipulate and modify the current state of assets (i.e. update key-value pairs). A ledger exists in the scope of a channel — it can be shared across the entire network (assuming every participant is operating on one common channel) — or it can be privatized to include only a specific set of participants.

In the latter scenario, these participants would create a separate channel and thereby isolate/segregate their transactions and ledger. In order to solve scenarios that want to bridge the gap between total transparency and privacy, chaincode can be installed only on peers that need to access the asset states to perform reads and writes (in other words, if a chaincode is not installed on a peer, it will not be able to properly interface with the ledger).

When a subset of organizations on that channel need to keep their transaction data confidential, a private data collection (collection) is used to segregate this data in a private database, logically separate from the channel ledger, accessible only to the authorized subset of organizations.

Thus, channels keep transactions private from the broader network whereas collections keep data private between subsets of organizations on the channel.

To further obfuscate the data, values within chaincode can be encrypted (in part or in total) using common cryptographic algorithms such as AES before sending transactions to the ordering service and appending blocks to the ledger. Once encrypted data has been written to the ledger, it can be decrypted only by a user in possession of the corresponding key that was used to generate the cipher text. For further details on chaincode encryption, see the Chaincode for Developers topic.

In Fabric, the private state is calculated during the endorsement phase by the peer's execution the private transaction, and the resulting private state is represented by the hash, along with the input. As a result, the consistent hash on all the nodes after consensus guarantees that the participating nodes of the private transactions always agree on private states.

Fabric also offers complete data isolation as another privacy technique, with the concept of "Channels." Fabric channels can be thought of as separate blockchains, because each channel maintains its completely separate instance of a ledger, shared among the participating nodes of that channel. If a consortium is mainly concerned with bi-lateral transactions, as is the case with most financial instruments, the number of channels get quite large: $O(N^2)$ with N being the number of participants in the consortium.

See the Private Data topic for more details on how to achieve privacy on your blockchain network.

Security & Membership Services

Hyperledger® Fabric underpins a transactional network where all participants have known identities. Public Key Infrastructure is used to generate cryptographic certificates which are tied to organizations, network components, and end users or client applications. As a result, data access control can be manipulated and governed on the broader network and on channel levels. This "permissioned" notion of Hyperledger® Fabric, coupled with the existence and capabilities of channels, helps address scenarios where privacy and confidentiality are paramount concerns.

See the Membership Service Providers (MSP) topic to better understand cryptographic implementations, and the sign, verify, authenticate approach used in Hyperledger® Fabric.

Consensus

In distributed ledger technology, consensus has recently become synonymous with a specific algorithm, within a single function. However, consensus encompasses more than simply agreeing upon the order of transactions, and this differentiation is highlighted in Hyperledger® Fabric through its fundamental role in the entire transaction flow, from proposal and endorsement, to ordering, validation and commitment. In a nutshell, consensus is defined as the full-circle verification of the correctness of a set of transactions comprising a block.

Fabric tolerates, instead of eliminating, non-determinism in its consensus model. Fabric offers full languages for smart contracts as a design principle. Fabric Chaincodes can be written in three full language runtimes: Golang, Node.js® and Java. This is made possible by adopting the execute-order-validate consensus design, so that the blockchain system can endure bad transactions caused by non-deterministic Chaincode while developers continue to perfect the logic and implementation.

Figure 12:
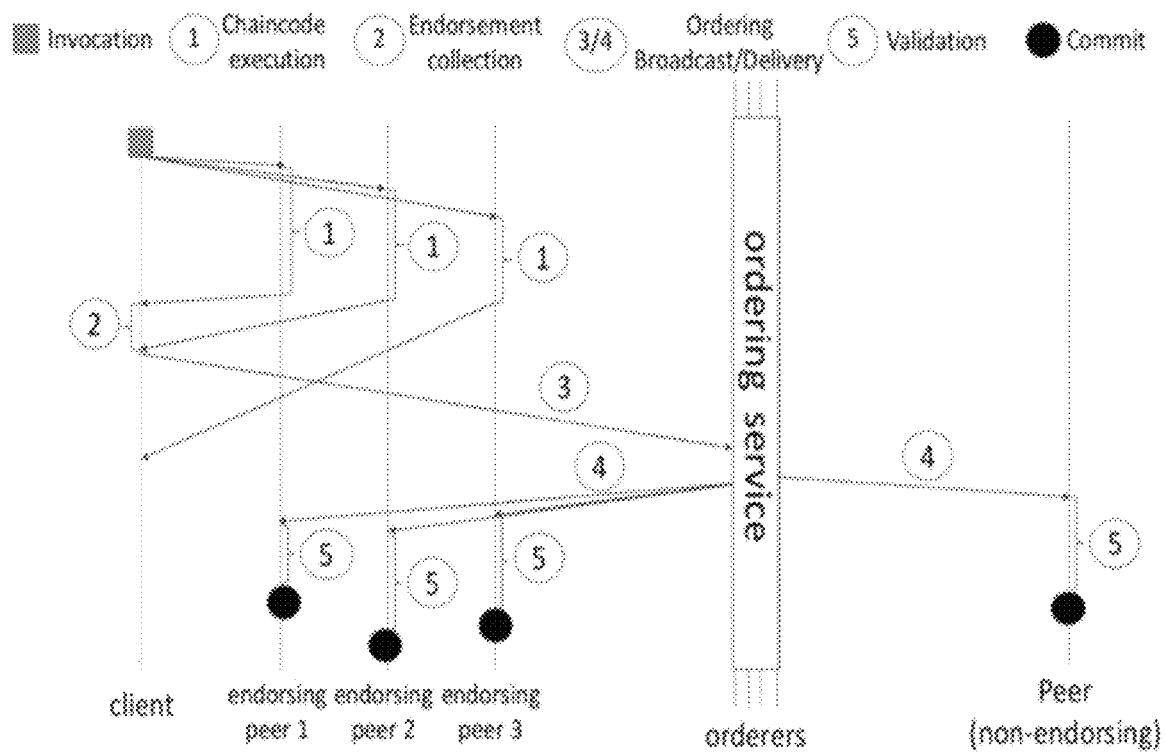
FIG. 12 illustrates an "execute first and order next" design.

The "execute first and order next" design illustrated in FIG. 12 implies that some kind of concurrency version control is necessary, otherwise when multiple transactions are trying to modify the same state value in parallel, the later one will overwrite the earlier one and wipe out the state transfer from the earlier transaction, instead of building on the result of the earlier transaction. Fabric employs a multiversion concurrency control (MVCC) technique borrowed from database design. The chaincode engine keeps track of what state values are being viewed (in readset) and updated (in writeset) when the smart contract is executed. During the validation phase, where each transaction contained inside a block is validated and state transfer is applied, if a transaction's state value versions in its readset do not match the current versions, typically because they have been updated by an earlier transaction in the block, then the transaction is marked as invalid.

The implication is that if a series of transactions need to modify the same state value, they must be regulated such that no more than one transaction lands inside a single block. Otherwise the application will observe a lot of invalid transactions due to concurrent modifications.

Techniques exist to program around this limitation, such as utilizing the composite key capability to assemble unique keys for each transaction while having the ability to group together keys targeting the same underlying state variable.

Consensus is achieved ultimately when the order and results of a block's transactions have met the explicit policy criteria checks. These checks and balances take place during the lifecycle of a transaction and include the usage of endorsement policies to dictate which specific members must endorse a certain transaction class, as well as system chaincodes to ensure that these policies are enforced and upheld. Prior to commitment, the peers will employ these system chaincodes to make sure that enough endorsements are present, and that they were derived from the appropriate entities. Moreover, a versioning check will take place during which the current state of the ledger is agreed or consented upon, before any blocks containing transactions are appended to the ledger. This final check provides protection against double spend operations and other threats that might compromise data integrity and allows for functions to be executed against non-static variables.

In addition to the multitude of endorsement, validity and versioning checks that take place, there are also ongoing identity verifications happening in all directions of the transaction flow. Access control lists are implemented on hierarchical layers of the network (ordering service down to channels), and payloads are repeatedly signed, verified and authenticated as a transaction proposal passes through the different architectural components. To conclude, consensus is not merely limited to the agreed upon order of a batch of transactions; rather, it is an overarching characterization that is achieved as a byproduct of the ongoing verifications that take place during a transaction's journey from proposal to commitment.

Operational Governance

Governance is the process and policy around the protocol runtime to ensure consortium member organizations have proper participation in the decision-making processes.

Fabric has permissioning governance built-in on every layer of the architecture. Operations like starting a new consortium, adding or evicting members, defining a new channel, adding and evicting participants from channels all require collecting approval signatures from the appropriate organizations. The overarching policy model is enforced throughout the system.

Fabric has two levels of permissioning and governance support: consortium and channel. The orderers manage the policies and configurations on the consortium level. Every Fabric blockchain network starts with the orderer bootstrap from a genesis block configuration that defines the organizations and consortiums. The peers manage the policies and configurations on the channel level. Modifying configurations, such as adding new member organizations to a consortium or a channel, requires collecting signatures according to the modification policy: ANY, ALL or MAJORITY of the existing members.

The Fabric architecture itself allows for decentralized orderer implementation. Indeed, with the introduction of Raft based orderer implementation in version 1.4, there is no need to pair the orderer nodes with a centralized ordering engine any longer. Each orderer node itself is a Raft peer and can participate in leader election in the event when the current leader crashed or became unreachable. This allows for a more decentralized deployment where more than a single organization can operate orderer nodes and participate in consensus and proposing blocks.

Peers

A blockchain network is comprised primarily of a set of *peer nodes* (or, simply, *peers*). Peers are a fundamental element of the network because they host ledgers and smart contracts. A ledger immutably records all the transactions generated by smart contracts (which in Hyperledger® Fabric are contained in a *chaincode*). Smart contracts and ledgers are used to encapsulate the shared *processes* and shared *information* in a network, respectively. These aspects of a peer make them a good starting point to understand a Fabric network.

Other elements of the blockchain network are of course important: ledgers and smart contracts, orderers, policies, channels, applications, organizations, identities, and membership. This section focusses on peers, and their relationship to those other elements in a Fabric network.

Figure 13:
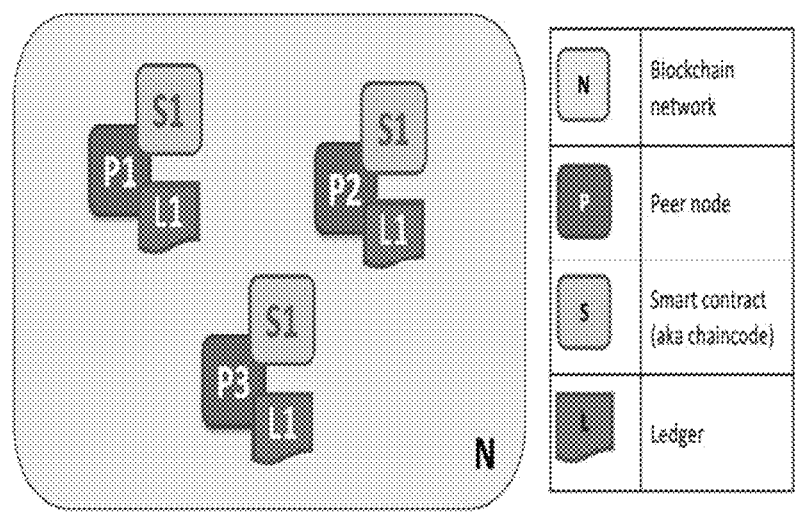
FIG. 13 illustrates a blockchain network comprised of peer nodes, each of which can hold copies of ledgers and copies of smart contracts.

FIG. 13 illustrates a blockchain network comprised of peer nodes, each of which can hold copies of ledgers and copies of smart contracts. In this example, the network N consists of peers P1, P2 and P3, each of which maintain their own instance of the distributed ledger L1. P1, P2 and P3 use the same chaincode, S1, to access their copy of that distributed ledger.

Peers can be created, started, stopped, reconfigured, and even deleted. They expose a set of APIs that enable administrators and applications to interact with the services that they provide.

A word on terminology

Fabric implements smart contracts with chaincode — simply a piece of code that accesses the ledger, written in one of the supported programming languages.

Ledgers and Chaincode

It is the peer that hosts both the ledger and chaincode. More accurately, the peer actually hosts *instances* of the ledger, and *instances* of chaincode. Note that this provides a deliberate redundancy in a Fabric network — it avoids single points of failure.

Figure 14:
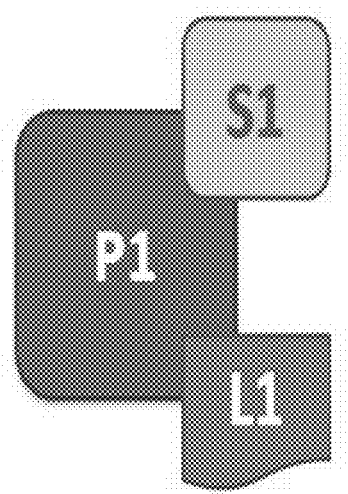
FIG. 14 illustrates a peer hosting instances of ledgers and instances of chaincodes.

FIG. 14 illustrates a peer hosting instances of ledgers and instances of chaincodes. In this example, P1 hosts an instance of ledger L1 and an instance of chaincode S1. There can be many ledgers and chaincodes hosted on an individual peer.

Because a peer is a *host* for ledgers and chaincodes, applications and administrators must interact with a peer if they want to access these resources. That's why peers are considered the most fundamental building blocks of a Fabric network. When a peer is first created, it has neither ledgers nor chaincodes.

Multiple Ledgers

A peer is able to host more than one ledger, which is helpful because it allows for a flexible system design. The simplest configuration is for a peer to manage a single ledger, but it's absolutely appropriate for a peer to host two or more ledgers when required.

Figure 15:
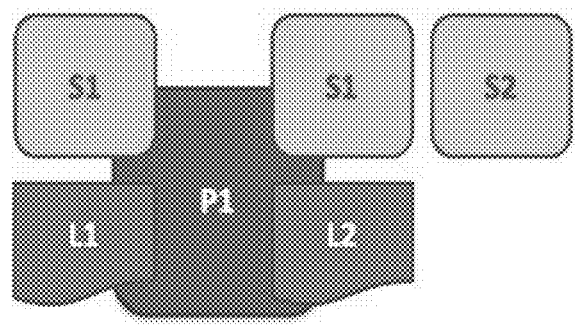
FIG. 15 illustrates a peer hosting multiple ledgers.

FIG. 15 illustrates a peer hosting multiple ledgers. Peers host one or more ledgers, and each ledger has zero or more chaincodes that apply to them. In this example, we can see that the peer P1 hosts ledgers L1 and L2. Ledger L1 is accessed using chaincode S1. Ledger L2 on the other hand can be accessed using chaincodes S1 and S2.

Although it is perfectly possible for a peer to host a ledger instance without hosting any chaincodes which access that ledger, it is rare that peers are configured this way. The vast majority of peers will have at least one chaincode installed on it which can query or update the peer's ledger instances. It's worth mentioning in passing that, whether or not users have installed chaincodes for use by external applications, peers also have special system chaincodes that are always present.

Multiple Chaincodes

There is not a fixed relationship between the number of ledgers a peer has and the number of chaincodes that can access that ledger. A peer might have many chaincodes and many ledgers available to it.

Figure 16:
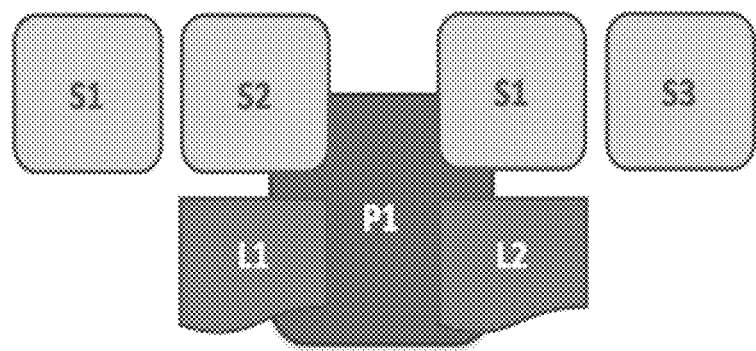
FIG. 16 illustrates an example of a peer hosting multiple chaincodes.

FIG. 16 illustrates an example of a peer hosting multiple chaincodes. Each ledger can have many chaincodes which access it. In this example, we can see that peer P1 hosts ledgers L1 and L2, where L1 is accessed by chaincodes S1 and S2, and L2 is accessed by S1 and S3. S1 can access both L1 and L2.

Applications and Peers

Ledger-query interactions involve a simple three-step dialogue between an application and a peer; ledger-update interactions are a little more involved and require two extra steps.

Applications always connect to peers when they need to access ledgers and chaincodes. The Fabric Software Development Kit (SDK) makes this easy for programmers — its APIs enable applications to connect to peers, invoke chaincodes to generate transactions, submit transactions to the network that will get ordered and committed to the distributed ledger, and receive events when this process is complete.

Through a peer connection, applications can execute chaincodes to query or update a ledger. The result of a ledger query transaction is returned immediately, whereas ledger updates involve a more complex interaction between applications, peers and orderers.

Figure 17:
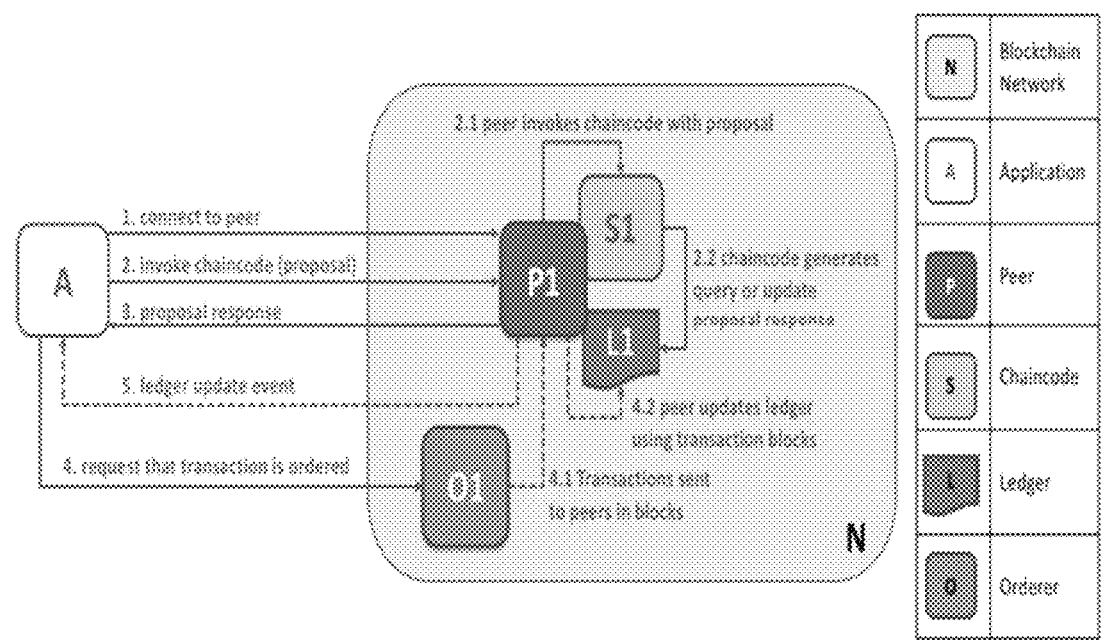
FIG. 17 illustrates peers, in conjunction with orderers, that ensure that the ledger is kept up-to-date on every peer.

FIG. 17 illustrates peers, in conjunction with orderers, that ensure that the ledger is kept up-to-date on every peer. In this example, application A connects to P1 and invokes chaincode S1 to query or update the ledger L1. P1 invokes S1 to generate a proposal response that contains a query result or a proposed ledger update. Application A receives the proposal response and, for queries, the process is now complete. For updates, A builds a transaction from all of the responses, which it sends it to O1 for ordering. O1 collects transactions from across the network into blocks, and distributes these to all peers, including P1. P1 validates the transaction before applying to L1. Once L1 is updated, P1 generates an event, received by A, to signify completion.

A peer can return the results of a query to an application immediately since all of the information required to satisfy the query is in the peer's local copy of the ledger. Peers never consult with other peers in order to respond to a query from an application. Applications can, however, connect to one or more peers to issue a query; for example, to corroborate a result between multiple peers, or retrieve a more up-to-date result from a different peer if there's a suspicion that information might be out of date. In the diagram, you can see that ledger query is a simple three-step process.

An update transaction starts in the same way as a query transaction but has two extra steps. Although ledger-updating applications also connect to peers to invoke a chaincode, unlike with ledger-querying applications, an individual peer cannot perform a ledger update at this time, because other peers must first agree to the change — a process called consensus. Therefore, peers return to the application a proposed update — one that this peer would apply subject to other peers' prior agreement. The first extra step — step four — requires that applications send an appropriate set of matching proposed updates to the entire network of peers as a transaction for commitment to their respective ledgers. This is achieved by the application using an orderer to package transactions into blocks, and distribute them to the entire network of peers, where they can be verified before being applied to each peer's local copy of the ledger. As this whole ordering processing takes some time to complete (seconds), the application is notified asynchronously, as shown in step five.

Peers and Channels

Peers interact with each other, and with applications, via *channels* — a mechanism by which a set of components within a blockchain network can communicate and transact *privately*.

These components are typically peer nodes, orderer nodes and applications and, by joining a channel, they agree to collaborate to collectively share and manage identical copies of the ledger associated with that channel. Conceptually, you can think of channels as being similar to groups of friends. A person might have several groups of friends, with each group having activities they do together. These groups might be totally separate (a group of work friends as compared to a group of hobby friends), or there can be some crossover between them. Nevertheless, each group is its own entity, with "rules" of a kind.

Figure 18:
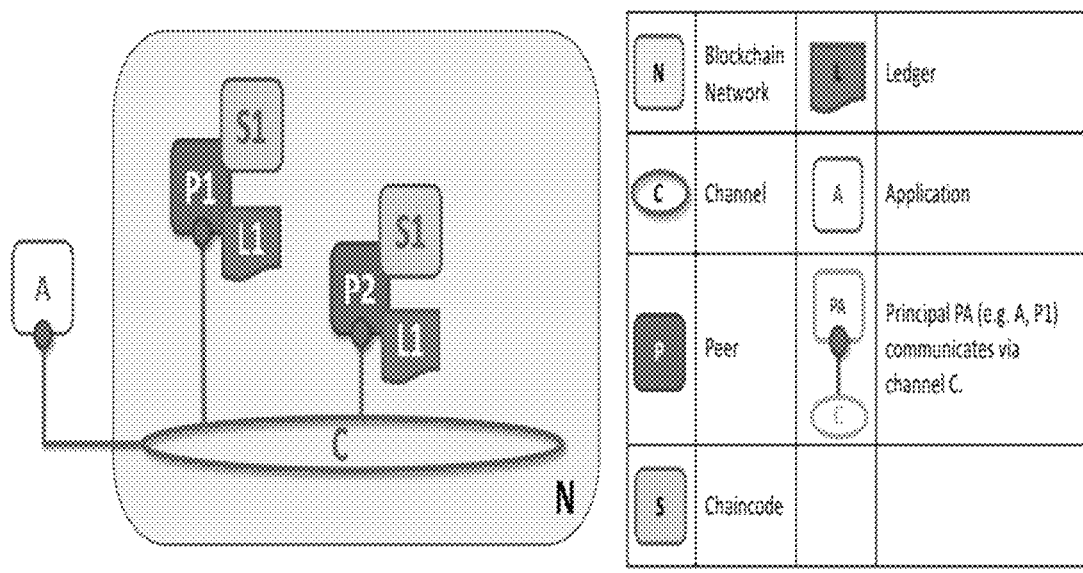
FIG. 18 illustrates channels that allow a specific set of peers and applications to communicate with each other within a blockchain network.

FIG. 18 illustrates channels that allow a specific set of peers and applications to communicate with each other within a blockchain network. In this example, application A can communicate directly with peers P1 and P2 using channel C. You can think of the channel as a pathway for communications between particular applications and peers. (For simplicity, orderers are not shown in this diagram, but must be present in a functioning network.)

Channels do not exist in the same way that peers do — it is more appropriate to think of a channel as a logical structure that is formed by a collection of physical peers. Peers provide the control point for access to, and management of, channels.

Peers and Organizations

Blockchain networks are administered by a collection of organizations rather than a single organization. Peers are central to how this kind of distributed network is built because they are owned by — and are the connection points to the network for — these organizations.

Figure 19:
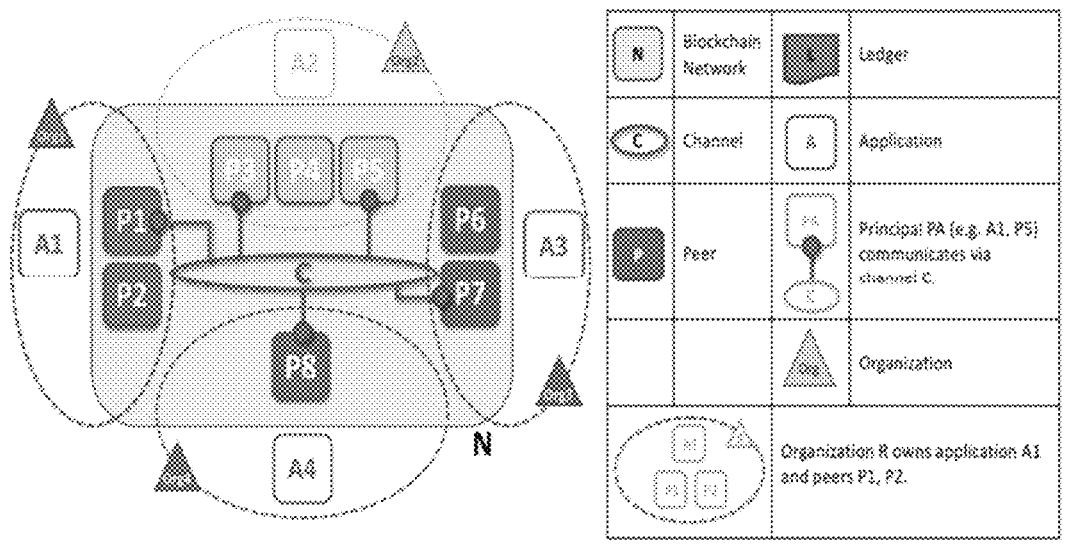
FIG. 19 illustrates peers in a blockchain network with multiple organizations.

FIG. 19 illustrates peers in a blockchain network with multiple organizations. The blockchain network is built up from the peers owned and contributed by the different organizations. In this example, we see four organizations contributing eight peers to form a network. The channel C connects five of these peers in the network N — P1, P3, P5, P7 and P8. The other peers owned by these organizations have not been joined to this channel but are typically joined to at least one other channel. Applications that have been developed by a particular organization will connect to their own organization's peers as well as those of different organizations. Again, for simplicity, an orderer node is not shown in this diagram.

The network is both formed and managed by the multiple organizations who contribute resources to it. Peers are the resources that we're discussing in this topic, but the resources an organization provides are more than just peers. There's a principle at work here — the network literally does not exist without organizations contributing their individual resources to the collective network. Moreover, the network grows and shrinks with the resources that are provided by these collaborating organizations.

Other than the ordering service, there are no centralized resources — in the example above, the network, N, would not exist if the organizations did not contribute their peers. This reflects the fact that the network does not exist in any meaningful sense unless and until organizations contribute the resources that form it. Moreover, the network does not depend on any individual organization — it will continue to exist as long as one organization remains, no matter which other organizations may come and go. This is at the heart of what it means for a network to be decentralized.

Applications in different organizations, as in the example above, may or may not be the same. That's because it is entirely up to an organization as to how its applications process their peers' copies of the ledger. This means that both application and presentation logic may vary from organization to organization even though their respective peers host exactly the same ledger data.

Applications connect either to peers in their organization, or peers in another organization, depending on the nature of the ledger interaction that's required. For ledger-query interactions, applications typically connect to their own organization's peers. For ledger-update interactions, applications need to connect to peers representing *every* organization that is required to endorse the ledger update.

Peers and Identity

Peers have an identity assigned to them via a digital certificate from a particular certificate authority. A digital certificate is like an ID card that provides lots of verifiable information about a peer. *Each and every peer in the network is assigned a digital certificate by an administrator from its owning organization.*

Figure 20:
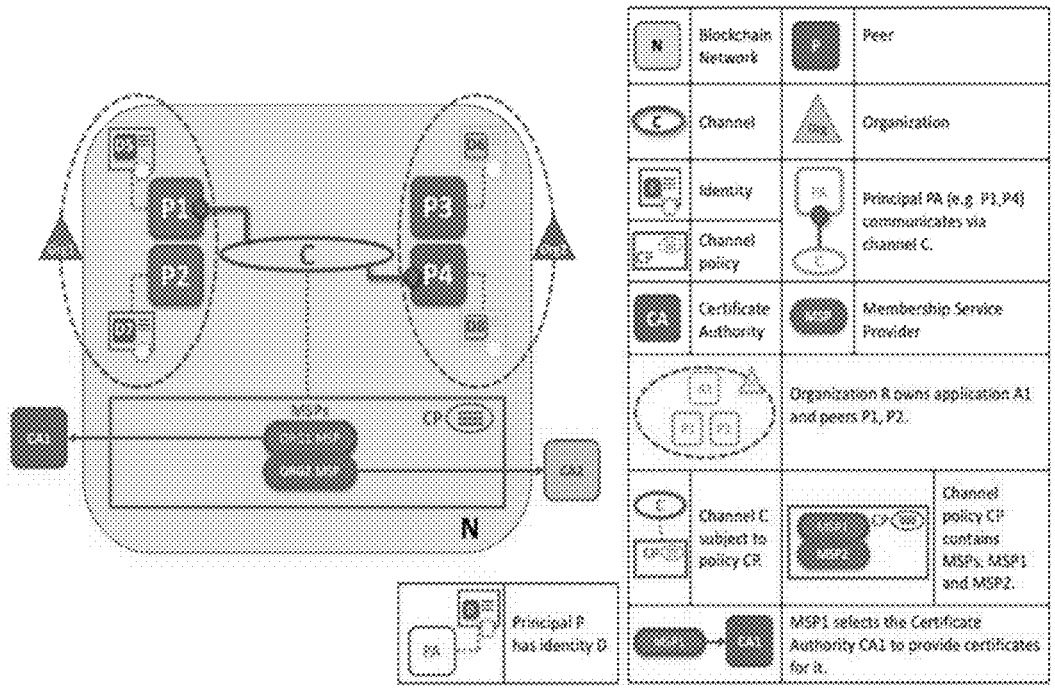
FIG. 20 illustrates that when a peer connects to a channel, its digital certificate identifies its owning organization via a channel MSP.

FIG. 20 illustrates that when a peer connects to a channel, its digital certificate identifies its owning organization via a channel MSP. In this example, P1 and P2 have identities issued by CA1. Channel C determines from a policy in its channel configuration that identities from CA1 should be associated with Org1 using ORG1.MSP. Similarly, P3 and P4 are identified by ORG2.MSP as being part of Org2.

Whenever a peer connects using a channel to a blockchain network, *a policy in the channel configuration uses the peer's identity to determine its rights.* The mapping of identity to organization is provided by a component called a *Membership Service Provider* (MSP) — it determines how a peer gets assigned to a specific role in a particular organization and accordingly gains appropriate access to blockchain resources. Moreover, a peer can be owned only by a single organization and is therefore associated with a single MSP. An MSP provides linkage between an individual identity and a particular organizational role in a blockchain network.

Peers as well as *everything that interacts with a blockchain network acquire their organizational identity from their digital certificate and an MSP.* Peers, applications, end users, administrators and orderers must have an identity and an associated MSP if they want to interact with a blockchain network. *A name is given to every entity that interacts with a blockchain network using an identity — a principal.*

It is not really important where the peer is physically located — it could reside in the cloud, or in a data center owned by one of the organizations, or on a local machine — it is the identity associated with it that identifies it as being owned by a particular organization. In the example above, P3 could be hosted in Org1's data center, but as long as the digital certificate associated with it is issued by CA2, then it is owned by Org2.

Peers and Orderers

The mechanism by which applications and peers interact with each other to ensure that every peer's ledger is kept consistent is mediated by special nodes called *orderers*.

An update transaction is quite different from a query transaction because a single peer cannot, on its own, update the ledger — updating requires the consent of other peers in the network. A peer requires other peers in the network to approve a ledger update before it can be applied to a peer's local ledger. This process is called *consensus*, which takes much longer to complete than a simple query. But when all the peers required to approve the transaction do so, and the transaction is committed to the ledger, peers will notify their connected applications that the ledger has been updated.

Specifically, applications that want to update the ledger are involved in a 3-phase process, which ensures that all the peers in a blockchain network keep their ledgers consistent with each other. In the first phase, applications work with a subset of *endorsing peers*, each of which provide an endorsement of the proposed ledger update to the application, but do not apply the proposed update to their copy of the ledger. In the second phase, these separate endorsements are collected together as transactions and packaged into blocks. In the final phase, these blocks are distributed back to every peer where each transaction is validated before being applied to that peer's copy of the ledger.

Orderer nodes are central to this process. Applications and peers use orderers to generate ledger updates that can be consistently applied to a distributed, replicated ledger.

Phase 1:

Phase 1 of the transaction workflow involves an interaction between an application and a set of peers — it does not involve orderers. Phase 1 is only concerned with an application asking different organizations' endorsing peers to agree to the results of the proposed chaincode invocation.

To start phase 1, applications generate a transaction proposal which they send to each of the required set of peers for endorsement. Each of these *endorsing peers* then independently executes a chaincode using the transaction proposal to generate a transaction proposal response. It does not apply this update to the ledger, but rather simply signs it and returns it to the application. Once the application has received a sufficient number of signed proposal responses, the first phase of the transaction flow is complete.

Figure 21:
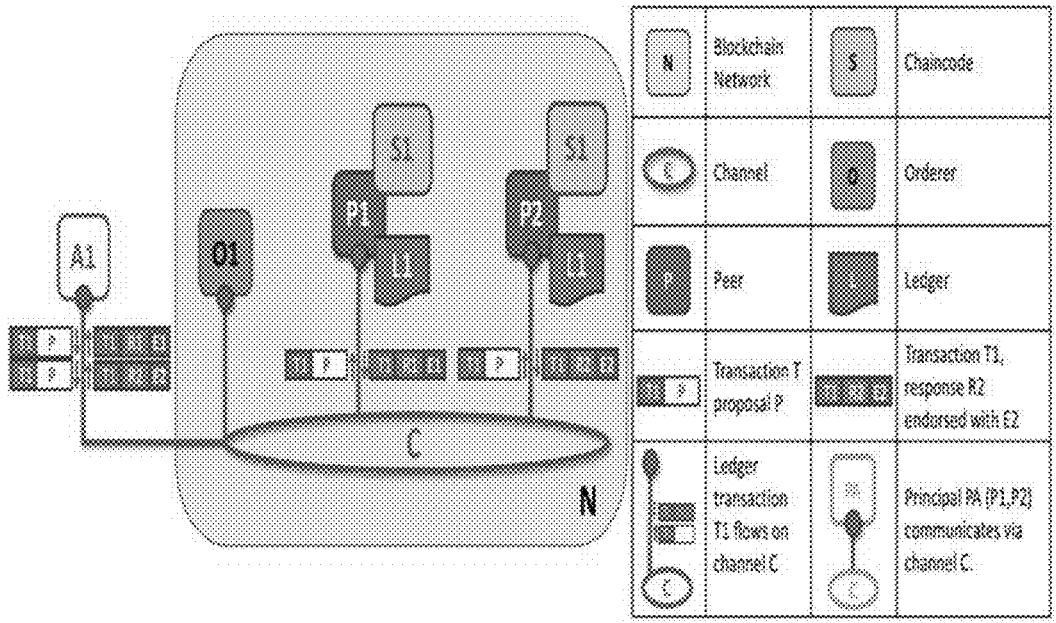
FIG. 21 illustrates transaction proposals that are independently executed by peers who return endorsed proposal responses.

FIG. 21 illustrates transaction proposals that are independently executed by peers who return endorsed proposal responses. In this example, application A1 generates transaction T1 proposal P which it sends to both peer P1 and peer P2 on channel C. P1 executes S1 using transaction T1 proposal P generating transaction T1 response R1 which it endorses with E1. Independently, P2 executes S1 using transaction T1 proposal P generating transaction T1 response R2 which it endorses with E2. Application A1 receives two endorsed responses for transaction T1, namely E1 and E2.

Initially, a set of peers are chosen by the application to generate a set of proposed ledger updates. The peers chosen by the application depends on the *endorsement policy* (defined for a chaincode), which defines the set of organizations that need to endorse a proposed ledger change before it can be accepted by the network. This is literally what it means to achieve consensus — every organization who matters must have endorsed the proposed ledger change *before* it will be accepted onto any peer's ledger.

A peer endorses a proposal response by adding its digital signature, and signing the entire payload using its private key. This endorsement can be subsequently used to prove that this organization's peer generated a particular response. In the above example, if peer P1 is owned by organization Org1, endorsement E1 corresponds to a digital proof that "Transaction T1 response R1 on ledger L1 has been provided by Org1's peer P1."

Phase 1 ends when the application receives signed proposal responses from sufficient peers. Different peers can return different and therefore inconsistent transaction responses to the application *for the same transaction proposal*. It might simply be that the result was generated at different times on different peers with ledgers at different states, in which case an application can simply request a more up-to-date proposal response. Less likely, but much more seriously, results might be different because the chaincode is *non-deterministic*. Non-determinism is the enemy of chaincodes and ledgers and if it occurs it indicates a serious problem with the proposed transaction, as inconsistent results cannot, obviously, be applied to ledgers. An individual peer cannot know that their transaction result is non-deterministic — transaction responses must be gathered together for comparison before non-determinism can be detected.

At the end of phase 1, the application is free to discard inconsistent transaction responses if it wishes to do so, effectively terminating the transaction workflow early. If an application tries to use an inconsistent set of transaction responses to update the ledger, it will be rejected.

Phase 2: Ordering and packaging transactions into blocks

The second phase of the transaction workflow is the packaging phase. The orderer is pivotal to this process — it receives transactions containing endorsed transaction proposal responses from many applications and orders the transactions into blocks. For more details about the ordering and packaging phase, check out conceptual information about the ordering phase.

Phase 3: Validation and commit

At the end of phase 2, orderers have been responsible for the simple but vital processes of collecting proposed transaction updates, ordering them, and packaging them into blocks, ready for distribution to the peers.

The final phase of the transaction workflow involves the distribution and subsequent validation of blocks from the orderer to the peers, where they can be applied to the ledger. Specifically, at each peer, every transaction within a block is validated to ensure that it has been consistently endorsed by all relevant organizations before it is applied to the ledger. Failed transactions are retained for audit but are not applied to the ledger.

Figure 22:
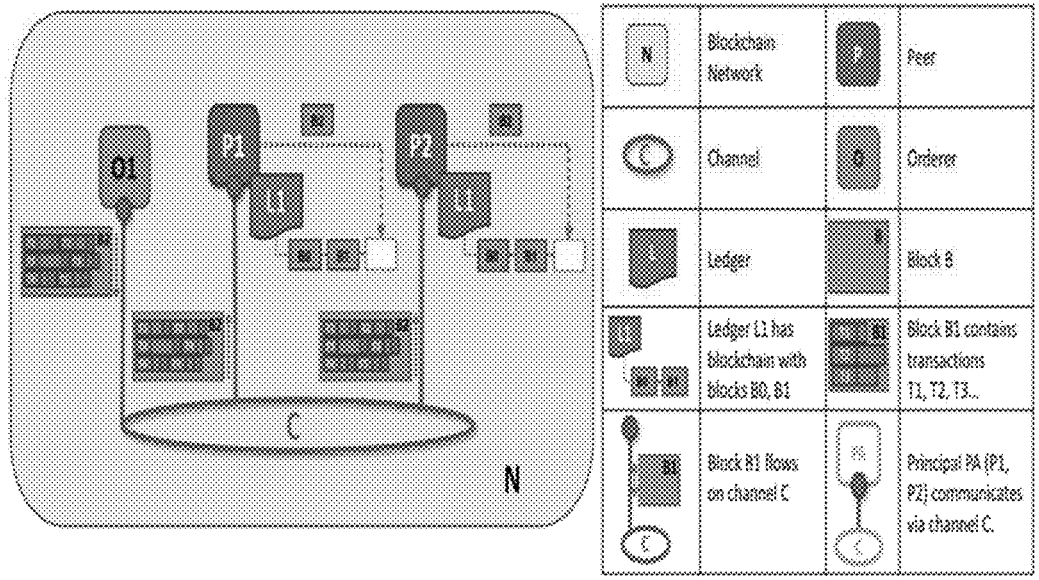
FIG. 22 illustrates the second role of an orderer node, which is to distribute blocks to peers.

FIG. 22 illustrates the second role of an orderer node, which is to distribute blocks to peers. In this example, orderer O1 distributes block B2 to peer P1 and peer P2. Peer P1 processes block B2, resulting in a new block being added to ledger L1 on P1. In parallel, peer P2 processes block B2, resulting in a new block being added to ledger L1 on P2. Once this process is complete, the ledger L1 has been consistently updated on peers P1 and P2, and each may inform connected applications that the transaction has been processed.

Phase 3 begins with the orderer distributing blocks to all peers connected to it. Peers are connected to orderers on channels such that when a new block is generated, all of the peers connected to the orderer will be sent a copy of the new block. Each peer will process this block independently, but in exactly the same way as every other peer on the channel. In this way, the ledger can be kept consistent. Also, not every peer needs to be connected to an orderer — peers can cascade blocks to other peers using the gossip protocol, who also can process them independently.

Upon receipt of a block, a peer will process each transaction in the sequence in which it appears in the block. For every transaction, each peer will verify that the transaction has been endorsed by the required organizations according to the *endorsement policy* of the chaincode which generated the transaction. For example, some transactions may only need to be endorsed by a single organization, whereas others may require multiple endorsements before they are considered valid. This process of validation verifies that all relevant organizations have generated the same outcome or result. Also note that this validation is different than the endorsement check in phase 1, where it is the application that receives the response from endorsing peers and makes the decision to send the proposal transactions. In case the application violates the endorsement policy by sending wrong transactions, the peer is still able to reject the transaction in the validation process of phase 3.

If a transaction has been endorsed correctly, the peer will attempt to apply it to the ledger. To do this, a peer must perform a ledger consistency check to verify that the current state of the ledger is compatible with the state of the ledger when the proposed update was generated. This may not always be possible, even when the transaction has been fully endorsed. For example, another transaction may have updated the same asset in the ledger such that the transaction update is no longer valid and therefore can no longer be applied. In this way each peer's copy of the ledger is kept consistent across the network because they each follow the same rules for validation.

After a peer has successfully validated each individual transaction, it updates the ledger. Failed transactions are not applied to the ledger, but they are retained for audit purposes, as are successful transactions. This means that peer blocks are almost exactly the same as the blocks received from the orderer, except for a valid or invalid indicator on each transaction in the block.

Phase 3 does not require the running of chaincodes — this is done only during phase 1, and that is important. It means that chaincodes only have to be available on endorsing nodes, rather than throughout the blockchain network. This is often helpful as it keeps the logic of the chaincode confidential to endorsing organizations. This is in contrast to the output of the chaincodes (the transaction proposal responses) which are shared with every peer in the channel, whether or not they endorsed the transaction. This specialization of endorsing peers is designed to help scalability.

Finally, every time a block is committed to a peer's ledger, that peer generates an appropriate *event*. *Block events* include the full block content, while *block transaction events* include summary information only, such as whether each transaction in the block has been validated or invalidated. *Chaincode* events that the chaincode execution has produced can also be published at this time. Applications can register for these event types so that they can be notified when they occur. These notifications conclude the third and final phase of the transaction workflow.

In summary, phase 3 sees the blocks which are generated by the orderer consistently applied to the ledger. The strict ordering of transactions into blocks allows each peer to validate that transaction updates are consistently applied across the blockchain network.

Orderers and Consensus

This entire transaction workflow process is called *consensus* because all peers have reached agreement on the order and content of transactions, in a process that is mediated by orderers. Consensus is a multi-step process and applications are only notified of ledger updates when the process is complete — which may happen at slightly different times on different peers.

Thus, orderers may be considered to be nodes which collect and distribute proposed ledger updates from applications for peers to validate and include on the ledger. On the other hand, peers form the network, host chaincodes and the ledger, handle transaction proposals and responses, and keep the ledger up-to-date by consistently applying transaction updates to it.

World State

A world state is a database that holds a cache of the current values of a set of ledger states. The world state makes it easy for a program to directly access the current value of a state rather than having to calculate it by traversing the entire transaction log. Ledger states are, by default, expressed as key-value pairs. The world state can change frequently, as states can be created, updated and deleted.

The world state holds the current value of the attributes of a business object as a unique ledger state. That's useful because programs usually require the current value of an object; it would be cumbersome to traverse the entire blockchain to calculate an object's current value – you just get it directly from the world state.

Figure 23:
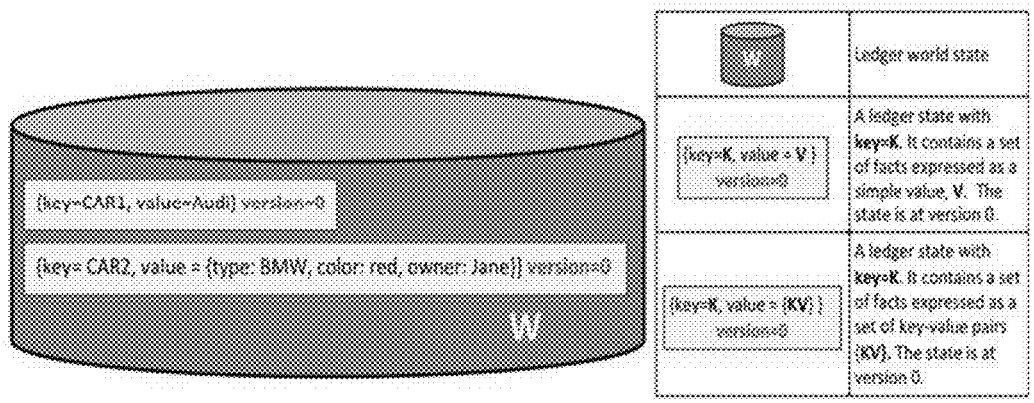
FIG. 23 illustrates a ledger world state containing two states.

FIG. 23 illustrates a ledger world state containing two states. The first state is: key=CAR1 and value=Audi. The second state has a more complex value: key=CAR2 and value={model:BMW, color=red, owner=Jane}. Both states are at version 0.

A ledger state records a set of facts about a particular business object. The above example shows ledger states for two cars, CAR1 and CAR2, each having a key and a value. An application program can invoke a smart contract which uses simple ledger APIs to get, put and delete states. Notice how a state value can be simple (Audi...) or compound (type:BMW...). The world state is often queried to retrieve objects with certain attributes, for example to find all red BMWs.

The world state is implemented as a database. A database provides a rich set of operators for the efficient storage and retrieval of states. Hyperledger® Fabric can be configured to use different world state databases to address the needs of different types of state values and the access patterns required by applications, for example in complex queries.

Applications submit transactions which capture changes to the world state, and these transactions end up being committed to the ledger blockchain. Applications are insulated from the details of this consensus mechanism by the Hyperledger® Fabric SDK; they merely invoke a smart contract, and are notified when the transaction has been included in the blockchain (whether valid or invalid). The key design point is that only transactions that are signed by the required set of endorsing organizations will result in an update to the world state. If a transaction is not signed by sufficient endorsers, it will not result in a change of world state.

A state has a version number, and in the diagram above, states CAR1 and CAR2 are at their starting versions, 0. The version number is for internal use by Hyperledger® Fabric and is incremented every time the state changes. The version is checked whenever the state is updated to make sure the current states matches the version at the time of endorsement. This ensures that the world state is changing as expected; that there has not been a concurrent update.

Finally, when a ledger is first created, the world state is empty. Because any transaction which represents a valid change to world state is recorded on the blockchain, it means that the world state can be re-generated from the blockchain at any time. This can be very convenient – for example, the world state is automatically generated when a peer is created. Moreover, if a peer fails abnormally, the world state can be regenerated on peer restart, before transactions are accepted.

The world state is physically implemented as a database, to provide simple and efficient storage and retrieval of ledger states. Ledger states can have simple or compound values, and to accommodate this, the world state database implementation can vary, allowing these values to be efficiently implemented. Options for the world state database currently include LevelDB and CouchDB®.

LevelDB is the default and is particularly appropriate when ledger states are simple key-value pairs. A LevelDB database is closely co-located with a network node – it is embedded within the same operating system process.

CouchDB® is a particularly appropriate choice when ledger states are structured as JSON documents because CouchDB® supports the rich queries and update of richer data types often found in business transactions. Implementation-wise, CouchDB® runs in a separate operating system process, but there is still a 1:1 relation between a peer node and a CouchDB® instance. All of this is invisible to a smart contract.

In LevelDB and CouchDB®, we see an important aspect of Hyperledger® Fabric – it is *pluggable*. The world state database could be a relational data store, or a graph store, or a temporal database. This provides great flexibility in the types of ledger states that can be efficiently accessed, allowing Hyperledger® Fabric to address many different types of problems.

In Hyperledger® Fabric, each channel has a completely separate ledger. This means a completely separate blockchain, and completely separate world states, including namespaces. It is possible for applications and smart contracts to communicate between channels so that ledger information can be accessed between them.

CouchDB® as the State Database

CouchDB® is an optional alternative external state database. CouchDB® can store any binary data that is modeled in chaincode (CouchDB® attachment functionality is used internally for non-JSON binary data). But as a JSON document store, CouchDB® additionally enables rich query against the chaincode data, when chaincode values (*e.g.* assets) are modeled as JSON data.

CouchDB® supports core chaincode operations such as getting and setting a key (asset), and querying based on keys. Keys can be queried by range, and composite keys can be modeled to enable equivalence queries against multiple parameters. For example, a composite key of owner,asset_id can be used to query all assets owned by a certain entity. These key-based queries can be used for read-only queries against the ledger, as well as in transactions that update the ledger.

If you model assets as JSON and use CouchDB®, you can also perform complex rich queries against the chaincode data values, using the CouchDB® JSON query language within chaincode. These types of queries are excellent for understanding what is on the ledger. Proposal responses for these types of queries are typically useful to the client application but are not typically submitted as transactions to the ordering service. In fact, there is no guarantee the result set is stable between chaincode execution and commit time for rich queries, and therefore rich queries are not appropriate for use in update transactions, unless the application can guarantee the result set is stable between chaincode execution time and commit time or can handle potential changes in subsequent transactions. For example, if one performs a rich query for all assets owned by Alice and transfer them to Bob, a new asset may be assigned to Alice by another transaction between chaincode execution time and commit time, and one would miss this "phantom" item.

CouchDB® runs as a separate database process alongside the peer, therefore there are additional considerations in terms of setup, management, and operations. It is a good practice to model chaincode asset data as JSON, so that one has the option to perform complex rich queries if needed in the future.

Using CouchDB® from Chaincode

Chaincode queries

Most of the chaincode shim APIs can be utilized with a CouchDB® state database, e.g. GetState, PutState, GetStateByRange, GetStateByPartialCompositeKey. Additionally, when utilizing CouchDB® as the state database and model assets as JSON in chaincode, rich queries may be performed against the JSON in the state database by using the GetQueryResult API and passing a CouchDB® query string. The query string follows the CouchDB JSON query syntax.

The marbles02 fabric sample demonstrates use of CouchDB® queries from chaincode. It includes a queryMarblesByOwner() function that demonstrates parameterized queries by passing an owner id into chaincode. It then queries the state data for JSON documents matching the docType of "marble" and the owner id using the JSON query syntax:

{"selector":{"docType":"marble","owner":<OWNER_ID>}}

CouchDB® pagination

Fabric supports paging of query results for rich queries and range-based queries. APIs supporting pagination allow the use of page size and bookmarks to be used for both range and rich queries. To support efficient pagination, the Fabric pagination APIs must be used. Specifically, the CouchDB® limit keyword will not be honored in CouchDB® queries since Fabric itself manages the pagination of query results and implicitly sets the pageSize limit that is passed to CouchDB®.

If a pageSize is specified using the paginated query APIs (GetStateByRangeWithPagination(), GetStateByPartialCompositeKeyWithPagination(), and GetQueryResultWithPagination()), a set of results (bound by the pageSize) will be returned to the chaincode along with a bookmark. The bookmark can be returned from chaincode to invoking clients, which can use the bookmark in a follow-on query to receive the next "page" of results.

The pagination APIs are for use in read-only transactions only, the query results are intended to support client paging requirements. For transactions that need to read and write, use the non-paginated chaincode query APIs. Within chaincode one may iterate through result sets to the desired depth.

Regardless of whether the pagination APIs are utilized, all chaincode queries are bound by totalQueryLimit (default 100000) from core.yaml. This is the maximum number of results that chaincode will iterate through and return to the client, in order to avoid accidental or malicious long-running queries.

CouchDB® indexes

Indexes in CouchDB® are required in order to make JSON queries efficient and are required for any JSON query with a sort. Indexes can be packaged alongside chaincode in a /META-INF/statedb/couchdb/indexes directory. Each index must be defined in its own text file with extension *.json with the index definition formatted in JSON following the CouchDB index JSON syntax. For example, to support the above marble query, a sample index on the docType and owner fields is provided:

{"index":{"fields":["docType","owner"]},"ddoc":"indexOwnerDoc", "name":"indexOwner","type":"json"}

Any index in the chaincode's META-INF/statedb/couchdb/indexes directory will be packaged up with the chaincode for deployment. When the chaincode is both installed on a peer and instantiated on one of the peer's channels, the index will automatically be deployed to the peer's channel and chaincode specific state database (if it has been configured to use CouchDB®). If one installs the chaincode first and then instantiate the chaincode on the channel, the index will be deployed at chaincode instantiation time. If the chaincode is already instantiated on a channel and one later installs the chaincode on a peer, the index will be deployed at chaincode installation time.

Upon deployment, the index will automatically be utilized by chaincode queries. CouchDB® can automatically determine which index to use based on the fields being used in a query. Alternatively, in the selector query the index can be specified using the use_index keyword.

The same index may exist in subsequent versions of the chaincode that gets installed. To change the index, use the same index name but alter the index definition. Upon installation/instantiation, the index definition will get re-deployed to the peer's state database.

If one has a large volume of data already, and later install the chaincode, the index creation upon installation may take some time. Similarly, if one has a large volume of data already and instantiate a subsequent version of the chaincode, the index creation may take some time. Avoid calling chaincode functions that query the state database at these times as the chaincode query may time out while the index is getting initialized. During transaction processing, the indexes will automatically get refreshed as blocks are committed to the ledger.

CouchDB® Configuration

CouchDB® is enabled as the state database by changing the state Database configuration option from goleveldb to CouchDB®. Additionally, the couchDBAddress needs to be configured to point to the CouchDB® to be used by the peer. The username and password properties should be populated with an admin username and password if CouchDB® is configured with a username and password. Additional options are provided in the couchDBConfig section and are documented in place. Changes to the *core.yaml* will be effective immediately after restarting the peer.

One may also pass in docker environment variables to override core.yaml values, for example CORE_LEDGER_STATE_STATEDATABASE and CORE_LEDGER_STATE_COUCHDBCONFIG_COUCHDBADDRESS.

Below is the stateDatabase section from *core.yaml*:

state:

*# stateDatabase - options are "goleveldb", "CouchDB"*

*# goleveldb - default state database stored in goleveldb.*

*# CouchDB - store state database in CouchDB* stateDatabase: goleveldb

*# Limit on the number of records to return per query* totalQueryLimit: 10000 couchDBConfig:

*# It is recommended to run CouchDB on the same server as the peer, and*

*# not map the CouchDB container port to a server port in docker-compose.*

*# Otherwise proper security must be provided on the connection between*

*# CouchDB client (on the peer) and server.* couchDBAddress: couchdb:5984

*# This username must have read and write authority on CouchDB* username:

*# The password is recommended to pass as an environment variable*

*# during start up (e.g. LEDGER_COUCHDBCONFIG_PASSWORD).*

*# If it is stored here, the file must be access control protected*

*# to prevent unintended users from discovering the password.* password:

*# Number of retries for CouchDB errors* maxRetries: 3

*# Number of retries for CouchDB errors during peer startup* maxRetriesOnStartup: 10

*# CouchDB request timeout (unit: duration, e.g. 20s)* requestTimeout: 35s

*# Limit on the number of records per each CouchDB query*

*# Note that chaincode queries are only bound by totalQueryLimit.*

*# Internally the chaincode may execute multiple CouchDB queries,*

*# each of size internalQueryLimit.* internalQueryLimit: 1000

*# Limit on the number of records per CouchDB bulk update batch* maxBatchUpdateSize: 1000

*# Warm indexes after every N blocks.*

*# This option warms any indexes that have been*

*# deployed to CouchDB after every N blocks.*

*# A value of 1 will warm indexes after every block commit,*

*# to ensure fast selector queries.*

*# Increasing the value may improve write efficiency of peer and CouchDB,*

*# but may degrade query response time.* warmIndexesAfterNBlocks: 1

CouchDB® hosted in docker containers supplied with Hyperledger® Fabric have the capability of setting the CouchDB® username and password with environment variables passed in with the COUCHDB_USER and COUCHDB_PASSWORD environment variables using Docker Compose scripting.

For CouchDB® installations outside of the docker images supplied with Fabric, the local.ini file of that installation must be edited to set the admin username and password.

Docker compose scripts only set the username and password at the creation of the container. The *local.ini* file must be edited if the username or password is to be changed after creation of the container.

CouchDB® peer options are read on each peer startup.

Identity

The different actors in a blockchain network include peers, orderers, client applications, administrators and more. Each of these actors — active elements inside or outside a network able to consume services — has a digital identity encapsulated in an X.509 digital certificate. These identities really matter because they determine the exact permissions over resources and access to information that actors have in a blockchain network.

A digital identity furthermore has some additional attributes that Fabric uses to determine permissions, and it gives the union of an identity and the associated attributes a special name — principal. Principals are just like userIDs or groupIDs, but a little more flexible because they can include a wide range of properties of an actor's identity, such as the actor's organization, organizational unit, role or even the actor's specific identity. When we talk about principals, they are the properties which determine their permissions.

For an identity to be verifiable, it must come from a trusted authority. A membership service provider (MSP) is how this is achieved in Fabric. More specifically, an MSP is a component that defines the rules that govern the valid identities for this organization. The default MSP implementation in Fabric uses X.509 certificates as identities, adopting a traditional Public Key Infrastructure (PKI) hierarchical model (more on PKI later).

A Simple Scenario to Explain the Use of an Identity

Imagine that you visit a supermarket to buy some groceries. At the checkout you see a sign that says that only Visa, Mastercard and AMEX cards are accepted. If you try to pay with a different card — let's call it an "ImagineCard" — it does not matter whether the card is authentic and you have sufficient funds in your account. It will not be accepted.

Figure 24:
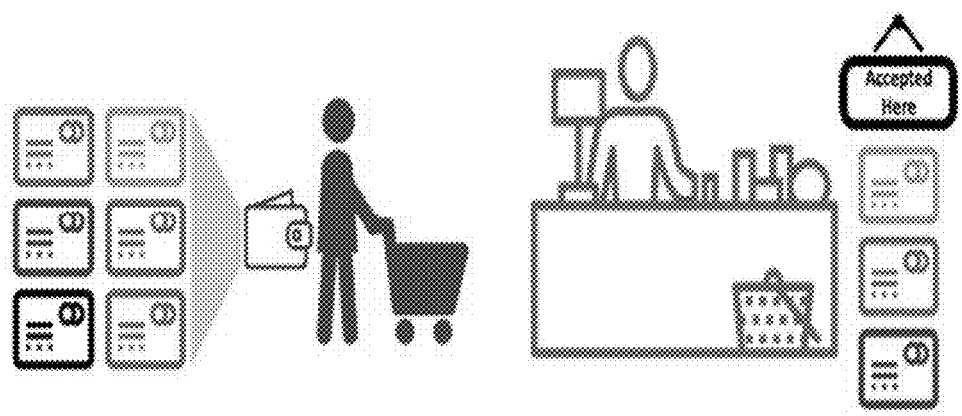
FIG. 24 illustrates that having a valid credit card is not enough—it must also be accepted by the store.

FIG. 24 illustrates that having a valid credit card is not enough — it must also be accepted by the store! PKIs and MSPs work together in the same way — a PKI provides a list of identities, and an MSP says which of these are members of a given organization that participates in the network.

PKI certificate authorities and MSPs provide a similar combination of functionalities. A PKI is like a card provider — it dispenses many different types of verifiable identities. An MSP, on the other hand, is like the list of card providers accepted by the store, determining which identities are the trusted members (actors) of the store payment network. MSPs turn verifiable identities into the members of a blockchain network.

PKIs

A public key infrastructure (PKI) is a collection of internet technologies that provides secure communications in a network.

Figure 25:
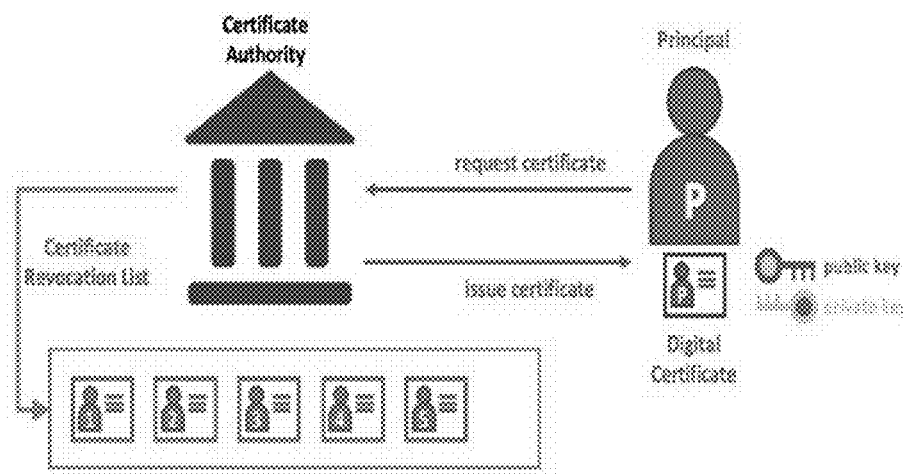
FIG. 25 illustrates the elements of Public Key Infrastructure (PKI).

FIG. 25 illustrates the elements of Public Key Infrastructure (PKI). A PKI is comprised of Certificate Authorities who issue digital certificates to parties (e.g., users of a service, service provider), who then use them to authenticate themselves in the messages they exchange with their environment. A CA's Certificate Revocation List (CRL) constitutes a reference for the certificates that are no longer valid. Revocation of a certificate can happen for a number of reasons. For example, a certificate may be revoked because the cryptographic private material associated to the certificate has been exposed.

Although a blockchain network is more than a communications network, it relies on the PKI standard to ensure secure communication between various network participants, and to ensure that messages posted on the blockchain are properly authenticated. It's therefore important to understand the basics of PKI and then why MSPs are so important.

There are four key elements to PKI:

- Digital Certificates

- Public and Private Keys

- Certificate Authorities

- Certificate Revocation Lists

Digital Certificates

A digital certificate is a document which holds a set of attributes relating to the holder of the certificate. The most common type of certificate is the one compliant with the X.509 standard, which allows the encoding of a party's identifying details in its structure.

For example, Mary Morris in the Manufacturing Division of Mitchell Cars in Detroit, Michigan might have a digital certificate with a SUBJECT attribute of C=US, ST=Michigan, L=Detroit, O=Mitchell Cars, OU=Manufacturing, CN=Mary Morris /UID=123456. Mary's certificate is similar to her government identity card — it provides information about Mary which she can use to prove key facts about her.

Figure 26:
FIG. 26 illustrates a digital certificate describing a party called Mary Morris.

FIG. 26 illustrates a digital certificate describing a party called Mary Morris. Mary is the SUBJECT of the certificate, and the highlighted SUBJECT text shows key facts about Mary. The certificate also holds many more pieces of information, as you can see. Most importantly, Mary's public key is distributed within her certificate, whereas her private signing key is not. This signing key must be kept private.

What is important is that all of Mary's attributes can be recorded using a mathematical technique called cryptography (literally, "*secret writing*") so that tampering will invalidate the certificate. Cryptography allows Mary to present her certificate to others to prove her identity so long as the other party trusts the certificate issuer, known as a Certificate Authority (CA). As long as the CA keeps certain cryptographic information securely (meaning, its own private signing key), anyone reading the certificate can be sure that the information about Mary has not been tampered with — it will always have those particular attributes for Mary Morris. Think of Mary's X.509 certificate as a digital identity card that is impossible to change.

Authentication, Public keys, and Private Keys

Authentication and message integrity are important concepts in secure communications. Authentication requires that parties who exchange messages are assured of the identity that created a specific message. For a message to have "integrity" means that cannot have been modified during its transmission. For example, you might want to be sure you're communicating with the real Mary Morris rather than an impersonator. Or if Mary has sent you a message, you might want to be sure that it hasn't been tampered with by anyone else during transmission.

Traditional authentication mechanisms rely on digital signatures that, as the name suggests, allow a party to digitally sign its messages. Digital signatures also provide guarantees on the integrity of the signed message.

Technically speaking, digital signature mechanisms require each party to hold two cryptographically connected keys: a public key that is made widely available and acts as authentication anchor, and a private key that is used to produce digital signatures on messages. Recipients of digitally signed messages can verify the origin and integrity of a received message by checking that the attached signature is valid under the public key of the expected sender.

The unique relationship between a private key and the respective public key is the cryptographic magic that makes secure communications possible. The unique mathematical relationship between the keys is such that the private key can be used to produce a signature on a message that only the corresponding public key can match, and only on the same message.

Figure 27:
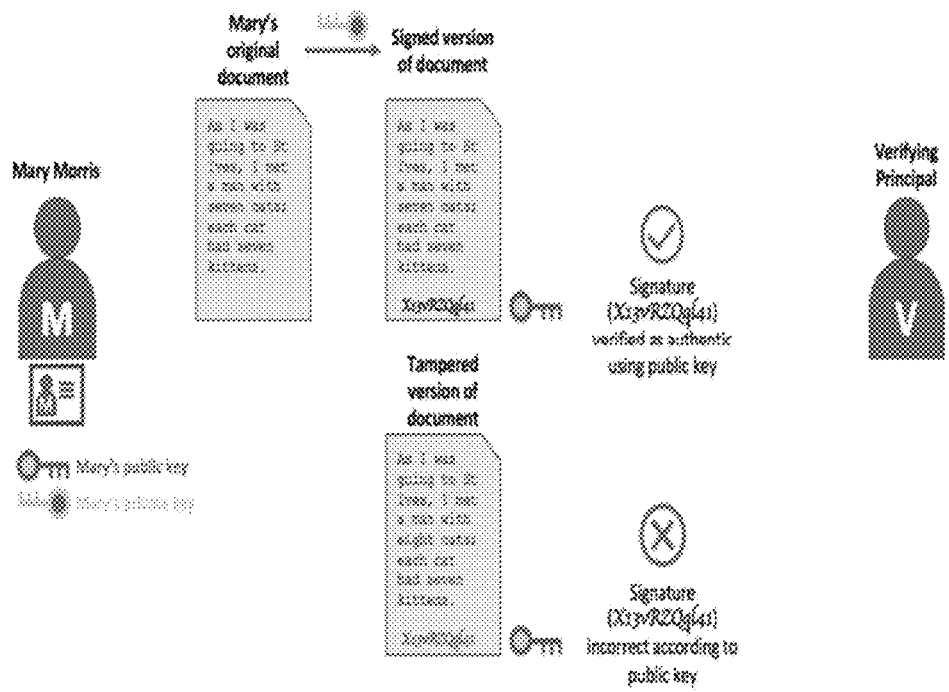
FIG. 27 illustrates an example where Mary uses her private key to sign the message.

In the example illustrated in FIG. 27, Mary uses her private key to sign the message. The signature can be verified by anyone who sees the signed message using her public key.

Certificate Authorities

An actor or a node is able to participate in the blockchain network, via the means of a digital identity issued for it by an authority trusted by the system. In the most common case, digital identities (or simply identities) have the form of cryptographically validated digital certificates that comply with X.509 standard and are issued by a Certificate Authority (CA).

CAs are a common part of internet security protocols such as: Symantec (originally Verisign), GeoTrust, DigiCert, GoDaddy, and Comodo, among others.

Figure 28:
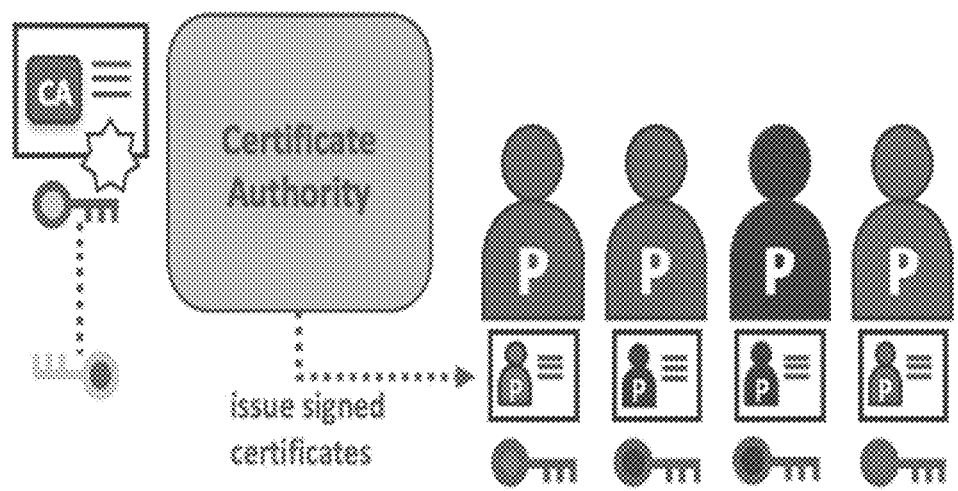
FIG. 28 illustrates a Certificate Authority that dispenses certificates to different actors.

FIG. 28 illustrates a Certificate Authority that dispenses certificates to different actors. These certificates are digitally signed by the CA and bind together the actor with the actor's public key (and optionally with a comprehensive list of properties). As a result, if one trusts the CA (and knows its public key), it can trust that the specific actor is bound to the public key included in the certificate, and owns the included attributes, by validating the CA's signature on the actor's certificate.

Certificates can be widely disseminated, as they do not include either the actors' nor the CA's private keys. As such they can be used as anchor of trusts for authenticating messages coming from different actors.

CAs also have a certificate, which they make widely available. This allows the consumers of identities issued by a given CA to verify them by checking that the certificate could only have been generated by the holder of the corresponding private key (the CA).

In a blockchain setting, every actor who wishes to interact with the network needs an identity. In this setting, you might say that one or more CAs can be used to define the members of an organization from a digital perspective. It is the CA that provides the basis for an organization's actors to have a verifiable digital identity.

Root CAs, Intermediate CAs and Chains of Trust

CAs come in two flavors: Root CAs and Intermediate CAs. Because Root CAs (Symantec, Geotrust, *etc.*) have to securely distribute hundreds of millions of certificates to internet users, it makes sense to spread this process out across what are called *Intermediate CAs*. These Intermediate CAs have their certificates issued by the root CA or another intermediate authority, allowing the establishment of a "chain of trust" for any certificate that is issued by any CA in the chain. This ability to track back to the Root CA not only allows the function of CAs to scale while still providing security — allowing organizations that consume certificates to use Intermediate CAs with confidence — it limits the exposure of the Root CA, which, if compromised, would endanger the entire chain of trust. If an Intermediate CA is compromised, on the other hand, there will be a much smaller exposure.

Figure 29:
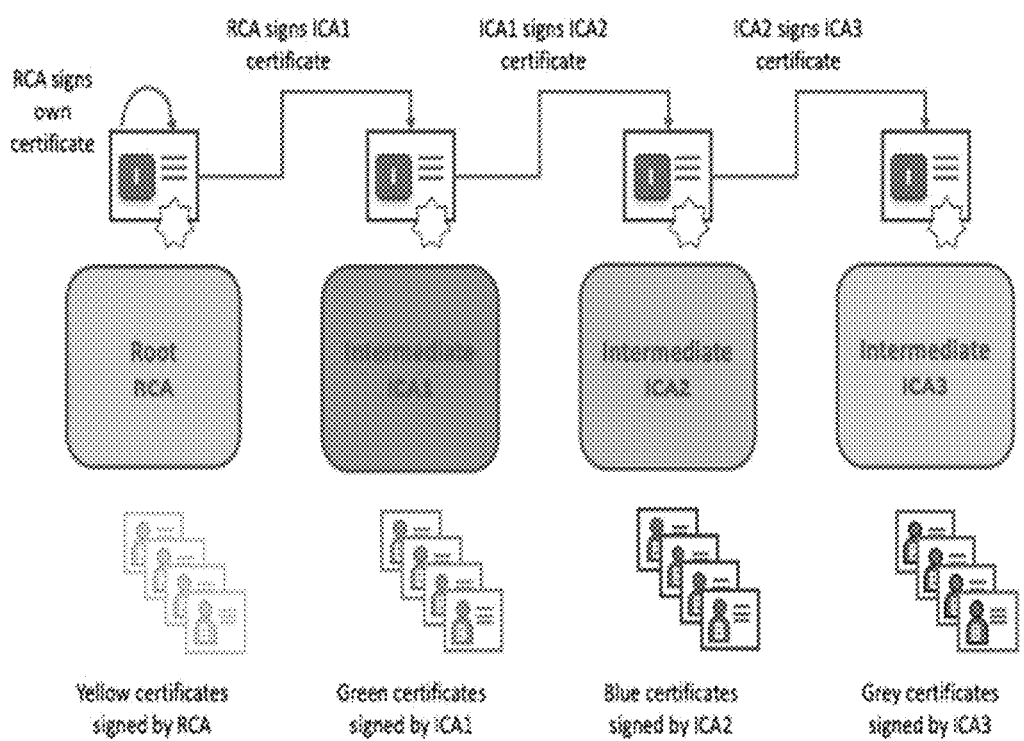
FIG. 29 illustrates a chain of trust is established between a Root CA and a set of Intermediate CAs as long as the issuing CA for the certificate of each of these Intermediate CAs is either the Root CA itself or has a chain of trust to the Root CA.

FIG. 29 illustrates a chain of trust established between a Root CA and a set of Intermediate CAs as long as the issuing CA for the certificate of each of these Intermediate CAs is either the Root CA itself or has a chain of trust to the Root CA.

Intermediate CAs provide a huge amount of flexibility when it comes to the issuance of certificates across multiple organizations, and that is very helpful in a permissioned blockchain system (like Fabric). For example, different organizations may use different Root CAs, or the same Root CA with different Intermediate CAs — it really does depend on the needs of the network.

Fabric CA

Fabric provides a built-in CA component to allow users to create CAs in the blockchain networks that are formed. This component — known as Fabric CA is a private root CA provider capable of managing digital identities of Fabric participants that have the form of X.509 certificates. Because Fabric CA is a custom CA targeting the Root CA needs of Fabric, it is inherently not capable of providing SSL certificates for general/automatic use in browsers. However, because some CA must be used to manage identity (even in a test environment), Fabric CA can be used to provide and manage certificates. It is also possible — and fully appropriate — to use a public/commercial root or intermediate CA to provide identification.

Certificate Revocation Lists

A Certificate Revocation List (CRL) is a list of references to certificates that a CA knows to be revoked for one reason or another. In the store scenario, a CRL would be like a list of stolen credit cards.

When a third party wants to verify another party's identity, it first checks the issuing CA's CRL to make sure that the certificate has not been revoked. A verifier doesn't have to check the CRL, but if they do not, they run the risk of accepting a compromised identity.

Figure 30:
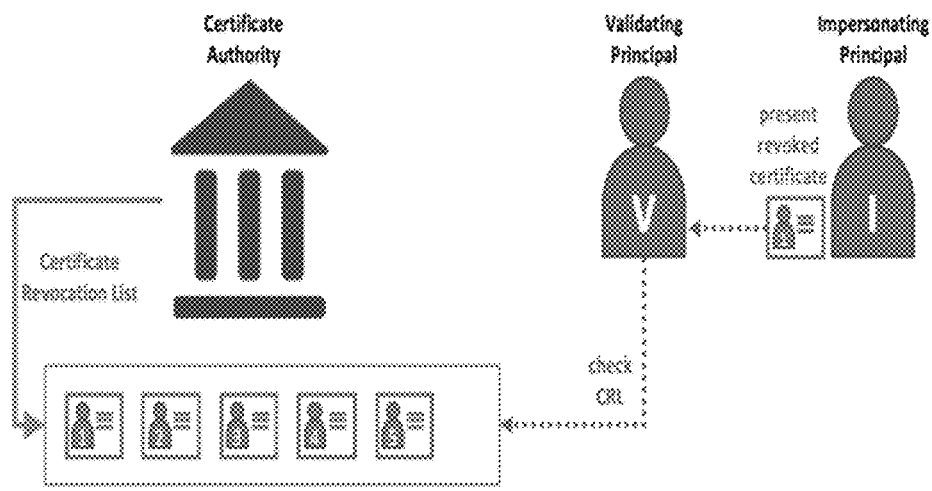
FIG. 30 illustrates using a CRL to check that a certificate is still valid.

FIG. 30 illustrates using a CRL to check that a certificate is still valid. If an impersonator tries to pass a compromised digital certificate to a validating party, it can be first checked against the issuing CA's CRL to make sure it is not listed as no longer valid.

Note that a certificate being revoked is very different from a certificate expiring. Revoked certificates have not expired — they are, by every other measure, a fully valid certificate.

References:

The above information regarding Fabric and CouchDB® were taken from publicly available sources at the following links:

https://hyperledger-fabric.readthedocs.io/en/release-1.4/fabric_model.html# https://kaleido.io/enterprise-blockchain-protocols-ethereum-vs-fa https://hyperledger-fabric.readthedocs.io/en/release-1.4/peers/peers.html#applications-and-peers https://hyperledger-fabric.readthedocs.io/en/release-1.4/ledger/ledger.html#world-state-database-options https://hyperledger-fabric.readthedocs.io/en/release-1.4/couchdb_as_state_database.html https://hyperledger-fabric.readthedocs.io/en/release-1.4/identity/identity.html#identity https://hyperledger-fabric.readthedocs.io/en/release-1.4/identity/identity.html#fabric-ca

APPENDIX B

RELATIONAL DATA ACCESS CONTROL

SUPER ADMIN: THE ROOT PERMISSION

Prerequisite to all other activity in ELEMENT is the creation of a database and the authorization of at least one identity to perform operations on that database. The "Super Admin" access level grants permission to do this.

Because implementation of databases will be highly platform-specific, there are no platform-independent specifications for this permission level other than its existence.

ELEMENT ACCESS LEVELS

The remaining user access levels in the ELEMENT system are granted on a per-database basis The relational data access control management is based on certain unique attributes assigned to a distributed ledger identity upon registering successfully on ELEMENT. All distributed ledger identities using ELEMENT are categorized and verified based on these attributes. The classification of users, based on their identity on a specific database, determines the operational scope granted by ELEMENT.

Figure 31:
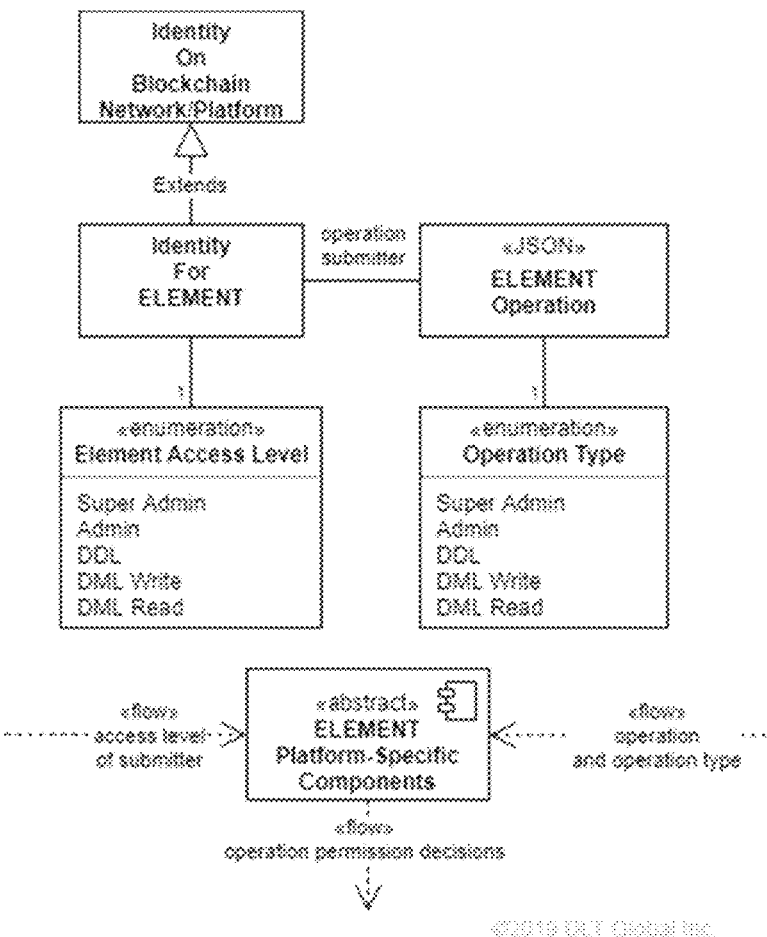
FIG. 31 illustrates access levels and permission determination.
Figure 32:
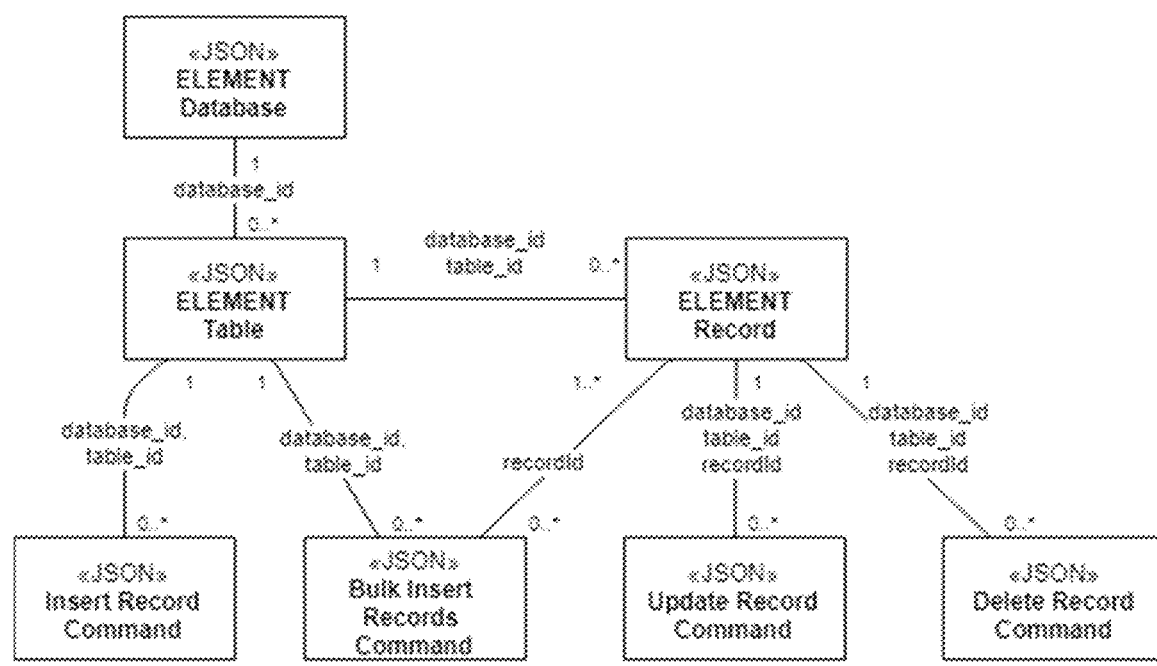
FIG. 32 illustrates an overview of data and operation objects.

FIG. 31 illustrates access levels and permission determination.

There are 5 access levels in ELEMENT and the respective privileges for those levels are discussed below.

SUPER ADMIN

As discussed, Super Admin is the root permission level for ELEMENT and has permission for all operations including creation of databases:

- Create/Drop Databases

- Appoint/Remove Admin User to specific/multiple databases

- Add/Remove users from specific/multiple databases

- View all users and user info across the network

- Perform DDL operations

- Perform DML Read/Write operations

ADMIN

The Admin access level is the user with the highest privileges within a specified database. Admins are appointed/registered on ELEMENT Database by Super Admin user. The privileges for Admin access level are:

- Add/Remove users on the assigned database

- View all users and user info across the assigned database

- Perform DDL operations

- Perform DML Read/Write operations

NOTE: Admin user can add/remove more Admins for the specified database.

DDL

This access level allows the user to perform certain DDL operations (See ELEMENT SQL Specification for more details) along with DML operations. Although, no addition of users is permitted from this access level and below.

- Perform DDL operations such as - Create/Alter/Drop ELEMENT tables, schemas, and columns (indexes) within the specified database.

- Perform DML Read/Write operations

DML WRITE

Users in this access level can perform certain DML functions such as:

- Insert/Update/Delete records on ELEMENT table.

- ELEMENT SQL extensions such as LIMIT and OPSTAT can be used in conjunction with DML Write operations. (Refer ELEMENT SQL Specifications)

DML READ

The DML Read access level is the most basic access that enables users to read data. Users at this level do not have access to modify any data of the database. The following operations can be conducted at this access level:

- Select various records from the specified database and arrange the data in ascending or descending order.

- ELEMENT SQL extensions such as BOOKMARK, QUERYLEVEL, and LIMIT can be used in conjunction with DML Read operations. (Refer ELEMENT SQL Specifications)

- View Tables and table details within the specified database.

NOTE: CREATE and DROP Database DDL operations are disabled for the Admin access level and all the access levels below Admin. If a user tries to execute any of these operations, the ELEMENT system should return an error - 403: Access Denied

USER REGISTRATION

The ELEMENT system (v1.0) has an invite-only enrolment system. The registration process is not public: only a Super Admin has the privilege to add new users to use ELEMENT databases. Subsequently, the super admin can assign Database owners (Admins), who may further add other users to that specific database. ELEMENT users are necessarily built from the existing pool of identities on the distributed ledger network, as ELEMENT operations are built upon distributed ledger network capabilities.

The user registration is handled by Register User ELEMENT API, which is also specified to be accessible via the ELEMENT User Interface, wherein the Super Admin and Admin access levels can grant user access to databases manually.

Endpoint: http://<domain>:3000/api/user/register

The request body for the API contains 3 mandatory parameters:

1. username: A unique/non-existing name for the member

2. database_id: Name of an existing database

3. access_level: Access privileges for the member, this field can have the following allowed values- "DDL", "DML_WRITE", "DML_READ", "ADMIN"

Sample Register User request body:

{

"username": "Matthew",

"database_id": "Customer",

"access_level": "DDL"

}

Once the registration is done successfully, (refer to the ELEMENT™ API specification document for success responses and possible errors) the ELEMENT realization is required to memorialize the operation on the distributed ledger. This action adds the user information on to the metadata of the specified database. (The usernames within a database is saved in an array called "Users".)

REVOKE USER

The Super Admin and Admin access levels can choose to disable a particular user from a specific database/multiple databases. This enables selective user access to multiple databases on the network.

The access levels with proper privileges can disable a user by using the Revoke User ELEMENT API.

Endpoint: http://<domain>:3000/api/user/revoke

The request body for the API contains 2 mandatory parameters:

1. username: exact name for the member

2. database_id: Name of an existing database the member is part of

Sample Revoke User request body:

{

"username": "Matthew",

"database_id": "Customer",

}

Once the revoke request is executed, the revokeUser() function is called through the invokeTransaction() function. The revokeUser() function removes the metadata of the concerned user from the targeted database. (The user is removed from the "Users" array of the database.)

DELETE USER

The Super Admin access level has the privilege to completely remove a user from the network. This can be achieved by using the Delete User ELEMENT API.

When a user is deleted, related metadata is removed from all the databases that the identity was a part of. Apart from the metadata, the digital identity of the user on the network is also cleared completely.

Endpoint: http://<domain>:3000/api/user/delete

The request body for the API contains 1 mandatory parameter:

1. username: exact name for the member

Sample Delete User request body:

```
{
    "username": "Matthew",
}
```

APPENDIX C

RELATIONAL DATA ON DISTRIBUTED LEDGER - HIGH LEVEL REQUIREMENTS

DISTRIBUTED LEDGERS AND CONSENSUS

Relational data must be accessible to smart contracts.

Appended updates to relational data are governed by a consensus mechanism equivalent to that used for appended updates to regular distributed ledger data.

Relational data operations that modify data must be logged to the distributed ledger. Relational operations that modify schemas also must be logged to the distributed ledger.

Relational data should be stored within the distributed ledger if possible and must achieve the same level of immutability and tamper-evidence as distributed ledger data.

Relational schema information should be stored within the distributed ledger if possible.

Relational indexes should not be stored within the distributed ledger if local alternatives are available.

SCHEMAS AND INDEXING

Table schemas support single-field unique primary keys. Non-clustered indexing of the primary key for the current state of the table should be supported.

DATA VISIBILITY

Data, schemas, and logged operations are not visible in unencrypted form at rest or during transport except to identities as authorized in specification "Relational Data Access Control."

DATA AND OPERATION REPRESENTATION

Relational data and logged relational data operations are represented on the distributed ledger (or equivalent as described above) as JSON in specified formats.

FIG. 32 ILLUSTRATES AN OVERVIEW OF DATA AND OPERATION OBJECTS.

ELEMENT relational data objects

ELEMENT API: DEFINITIONS

The functions that are supported by the ELEMENT API are as follows:

DATABASE APIs:

CREATE DATABASE

```
https://<element_base_url>/api/1.0/database/create
```

Permission: Element™ Admin or Authenticated Element™ User with ADMIN or DDL access level

Header

| Field | Type | Description |
|---|---|---|
| Authorization | String | Bearer token with authentication |
| X-ELEMENT-USERNAME | String | Username of a User registered on Element™ |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "admin",
    "Content-Type": "application/json"
}
```

Request body

| Field | Type | Description |
|---|---|---|

| | | |
|---|---|---|
| body | Object | Create Database Request Body Object |
|     database_id | String | Database ID |

- Request-Example:

```
{
    "database_id": "DB22"
}
```

Success 200

| Field | Type | Description |
|---|---|---|
| body | Object | Success Response |
|     result | String | Success Result |
|     database_id | String | Database ID |
|     transaction_id | String | Transaction ID |

- Success-Response:

```
HTTP/1.1 200 OK
{
    "result": "Success",
    "database_id": "DB22",
    "transaction_id": "bc78e5dcee6f3c820f52ba4f8e06b59452e873efa7b63b7a54ff71a80410de4c"
}
```

DROP DATABASE https://<element_base_url>/api/1.0/database/drop

Permission: Element™ Admin or Authenticated Element™ User with ADMIN or DDL access level

Header

| Field | Type | Description |
| --- | --- | --- |
| `Authorization` | String | Bearer token with authentication |
| `X-ELEMENT-USERNAME` | String | Username registered on Element™ |
| `Content-Type` | String | Application/JSON |

- Header-Example:

```
{
   "Authorization": "Bearer eyJhbGciOiJSUzI1NiIsInR5cCIgOiAiS1dUIiwia21kIiA6ICJ",
   "X-ELEMENT-USERNAME": "admin",
   "Content-Type": "application/json"
}
```

Request body

| Field | Type | Description |
| --- | --- | --- |
| `body` | Object | Drop Database Request Body Object |
| `database_id` | String | Database ID |

- Request-Example:

```
{
   "database_id": "DB22"
}
```

Success 200

| Field | Type | Description |
| --- | --- | --- |
| `body` | Object | Success Response |

| 121 | | 122 |
|---|---|---|
| `result` | String | Success Result |
| `database_id` | String | Database ID |
| `transaction_id` | String | Transaction ID |

- Success-Response:

```
HTTP/1.1 200 OK
{
    "result": "Success",
    "database_id": "DB22",
    "transaction_id": "bc78e5dcee6f3c820f52ba4f8e06b59452e873efa7b63b7a54ff71a80410de4c"
}
```

SHOW DATABASES

```
https://<element_base_url>/api/1.0/database/show
```

Permission: Element™ Admin or any Authenticated Element™ User

Header

| Field | Type | Description |
|---|---|---|
| `Authorization` | String | Bearer token with authentication |
| `X-ELEMENT-USERNAME` | String | Username registered on Element™ |
| `Content-Type` | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "admin",
    "Content-Type": "application/json"
}
```

Success 200

| Field | Type | Description |
|---|---|---|
| body | Object | Success Response |
|     query_response | Object | Query Response Object |
|         databases | Array | An Array of Database IDs |
|         transaction_id | String | Transaction ID |

- Success-Response:

```
HTTP/1.1 200 OK
{
    "query_response": {
        "databases": ["db22", "customers", "admins", "networks"],
        "transaction_id": "bc78e5dcee6f3c820f52ba4f8e06b59452e873efa7b63b7a54ff71a80410de4c"
    }
}
```

TABLE APIs:

CREATE TABLE

```
https://<element_base_url>/api/1.0/table/create
```

Permission: Authenticated Element™ User with DDL access

Header

| Field | Type | Description |
|---|---|---|
| Authorization | String | Bearer token with authentication |
| X-ELEMENT-USERNAME | String | Username registered on Element™ |

Content-Type      String      Application/JSON

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Alice",
    "Content-Type": "application/json"
}
```

Request body

| Field | Type | Description |
|---|---|---|
| body | Object | Create Table Request Body Object |
| database_id | String | Existing Database ID |
| table_id | String | Table Name |
| primary_key | String | Column name which will uniquely identify the table |
| columns | Object | Columns with their properties and constraints |
| datatype | String | Column data type<br><br>Allowed values: "NUMBER", "STRING", "BOOLEAN" |
| Not_null<br>optional | Boolean | Column Not Null constraint<br><br>Allowed values: true, false |
| Default_value<br>optional | String | Default value to be used if a column is unassigned |

- Request-Example:

```
{
    "database_id": "city_db",
    "table_id": "details",
    "primary_key": "id",
    "columns": {
        "id": {
            "datatype": "NUMBER",
        },
        "city": {
            "datatype": "STRING",
            "not_null": true,
            "default_value": "New York"
        },
        "army_veteran": {
            "datatype": "BOOLEAN",
            "default_value": false
        },
    }
}
```

Success 200

| Field | Type | Description |
|---|---|---|
| body | Object | Success Response Object |
| result | String | Success Result |
| table_id | String | Table ID |
| transaction_id | String | Transaction ID |

- Success-Response:

```
HTTP/1.1 200 OK
{
    "result": "Table Created",
    "table_id": "tab_1",
    "transaction_id": "bc78e5dcee6f3c820f52ba4f8e06b59452e873efa7b63b7a54ff71a80410de4c"
}
```

ALTER TABLE

```
https://<element_base_url>/api/1.0/table/alter
```
Permission: Authenticated Element™ User with DDL access

Header

| Field | Type | Description |
|---|---|---|
| `Authorization` | String | Bearer token with authentication |
| `X-ELEMENT-USERNAME` | String | Username registered on Element™ |
| `Content-Type` | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Cameron",
    "Content-Type": "application/json"
}
```

General Request body

| Field | Type | Description |
|---|---|---|
| `body` | Object | Alter Table Request Body Object |
| `database_id` | String | Database ID |
| `table_id` | String | Table ID |
| `operation` | String | Alter Table Operation<br><br>Allowed values: "ADD", "DROP", "MODIFY", "RENAME" |

| | | |
|---|---|---|
| `columns` | Object | Column(s) with properties based on the operation |

- General Request-Example:

```
{
    "database_id": "city_db"
    "table_id": "details"
    "operation": "ADD",
    "columns": {
        "social_security_number": {
            "datatype": "NUMBER",
            "not_null": true
        }
    }
}
```

Request body - Add column

| Field | Type | Description |
|---|---|---|
| `body` | Object | Alter Table - Add Column Request Body Object |
| `database_id` | String | Database ID |
| `table_id` | String | Table ID |
| `operation` | String | ADD |
| `columns` | Object | Column(s) and their properties |
| `column_name` | Object | Column Name to be added |
| `datatype` | String | Column data type |
| | | Allowed values: "NUMBER", "STRING", "BOOLEAN" |

| | | |
|---|---|---|
| `Not_null`  *optional* | Boolean | Column Not Null constraint<br><br>Allowed values: `true`, `false` |
| `Default_value`  *optional* | String | Default value to be used if a column is unassigned |

- Add Column Request-Example:

```
{
    "database_id": "factory"
    "table_id": "employees"
    "operation": "ADD",
    "columns": {
        "blood_group": {
            "datatype": "STRING",
            "not_null": true
        }
    }
}
```

Request body - Drop column

| Field | Type | Description |
|---|---|---|
| `body` | Object | Alter Table - Drop Column Request Body Object |
| `database_id` | String | Database ID |
| `table_id` | String | Table ID |
| `operation` | String | DROP |
| `columns` | Array | Array of Column name(s) to be dropped |

- Drop Column Request-Example

```
{
    "database_id": "factory"
    "table_id": "employees"
    "operation": "DROP",
    "columns": ["lastname", "email"]
}
```

Request body - Modify column

| Field | Type | Description |
| --- | --- | --- |
| body | Object | Alter Table - Modify Column Request Body Object |
| database_id | String | Database ID |
| table_id | String | Table ID |
| operation | String | MODIFY |
| columns | Object | Column(s) and their datatype to be set |
| column_name | Object | Column Name to be modified |
| datatype | String | Column data type<br><br>Allowed values: "NUMBER", "STRING", "BOOLEAN" |

- Modify Column Request-Example:

```
{
    "database_id": "factory"
    "table_id": "employees"
    "operation": "MODIFY",
    "columns": {
        "zone_id": {
            "datatype": "NUMBER"
        }
```

```
        }
}
```

Request body - Rename column

| Field | Type | Description |
|---|---|---|
| body | Object | Alter Table - Rename Column Request Body Object |
| database_id | String | Database ID |
| table_id | String | Table ID |
| operation | String | RENAME |
| columns | Object | Column(s) with existing and new names |
| existing_column_name | Object | Column Name to be modified |
| name | String | New Column Name |

- Rename Column Request-Example:
-

```
{
    "database_id": "factory"
    "table_id": "employees"
    "operation": "RENAME",
    "mobile": {
        "name": "contact"
    }
}
```

DROP TABLE

```
https://<element_base_url>/api/1.0/table/drop
```

Permission: Authenticated Element™ User with DDL access

Header

| Field | Type | Description |
|---|---|---|
| Authorization | String | Bearer token with authentication |
| X-ELEMENT-USERNAME | String | Username registered on Element™ |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Beretta",
    "Content-Type": "application/json"
}
```

Request body

| Field | Type | Description |
|---|---|---|
| body | Object | Drop Table Request Body Object |
| database_id | String | Database ID |
| table_id | String | Table ID |

- Request-Example:

```
{
    "table_id": "details"
```

```
    "database_id": "city_db"
}
```

Success 200

| Field | Type | Description |
|---|---|---|
| `body` | Object | Success Response Object |
| `result` | String | Success Result |
| `table_id` | String | Table ID |
| `transaction_id` | String | Transaction ID |

- Success-Response:

```
HTTP/1.1 200 OK
{
    "result": "Table Dropped",
    "table_id": "details",
    "transaction_id": "bc78e5dcee6f3c820f52ba4f8e06b59452e873efa7b63b7a54ff71a80410de4c"
}
```

SHOW TABLES

`https://<element_base_url>/api/1.0/table/show`

Permission: Authenticated Element™ User

Header

| Field | Type | Description |
|---|---|---|
| `Authorization` | String | Bearer token with authentication |
| `X-ELEMENT-USERNAME` | String | Username registered on Element™ |

Content-Type    String    Application/JSON

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Beretta",
    "Content-Type": "application/json"
}
```

Success 200

| Field | Type | Description |
|---|---|---|
| body | Object | Success Response Object |
| query_response | Object | Query Response Object |
| tables | Array | An Array of Table IDs |
| transaction_id | String | Transaction ID |

- Success-Response:

```
HTTP/1.1 200 OK
{
    "query_response": {
        "tables": ["details", "clients", "my-project"],
        "transaction_id": "bc78e5dcee6f3c820f52ba4f8e06b59452e873efa7b63b7a54ff71a80410de4c"
    }
}
```

DESCRIBE TABLE

```
https://<element_base_url>/api/1.0/table/desc/:table_id
```
Permission: Authenticated Element™ User with DDL access

Header

| Field | Type | Description |
|---|---|---|

| Field | Type | Description |
|---|---|---|
| Authorization | String | Bearer token with authentication |
| X-ELEMENT-USERNAME | String | Username registered on Element™ |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Beretta",
    "Content-Type": "application/json"
}
```

Request param

| Field | Type | Description |
|---|---|---|
| param | Object | Describe Table Request Param Object |
| table_id | String | Table ID |

- Request-Example:

```
https://<element_base_url>/api/1.0/table/desc/customers
```

Success 200

| Field | Type | Description |
|---|---|---|
| body | Object | Success Response Object |
| query_response | Object | Query Response Object |
| table | Object | Table Description |

● Success-Response:

```
HTTP/1.1 200 OK
{
    "query_response": "{
        "table": {
            "_id": "tbl2",
            "_rev": "1-cc501925d30b2dca4eb282cf429d66e3",
            "columns": {
                "age": {
                    "data_type": "NUMBER",
                    "default_value": null,
                    "not_null": false
                },
                "city": {
                    "data_type": "STRING",
                    "default_value": null,
                    "not_null": true
                },
                "firstname": {
                    "data_type": "STRING",
                    "default_value": null,
                    "not_null": false
                },
                "id": {
                    "data_type": "STRING",
                    "default_value": null,
                    "not_null": true
                },
                "lastname": {
                    "data_type": "STRING",
                    "default_value": null,
                    "not_null": true
                }
            },
            "columns_index": [
                "id",
                "lastname",
                "firstname",
                "age",
                "city"
            ],
            "created_by": "admin",
            "created_on": "2019-06-20T19:08:07.338370235Z",
            "ddl_process": false,
            "doc_type": "table",
            "primary_key": "id",
            "table_id": "tbl2",
            "updated_on": "2019-06-20T19:08:07.338370235Z"
        }
    },
```

```
"transaction_id": "cb6571f16104e576b7be953e0fe1e85c9d889e40027a79d8aee80dcf2b8d85a8"
}
```

RECORD APIs:

INSERT RECORD

```
https://<element_base_url>/api/1.0/record/insert
```
Permission: Authenticated Element™ User with DML_WRITE access

Header

| Field | Type | Description |
| --- | --- | --- |
| `Authorization` | String | Bearer token with authentication |
| `X-ELEMENT-USERNAME` | String | Username registered on Element™ |
| `X-ELEMENT-OPSTAT` Optional | Boolean | OPSTAT keyword to execute transaction with tracking of operation status |
| `Content-Type` | String | Application/JSON |

- Header-Example:

```
{
    "Authorization": "Bearer eyJhbGciOiJSUzI1NiIsInR5cCIgOiAiS1dUIiwia21kIiA6ICJ",
    "X-ELEMENT-USERNAME": "robert"
    "Content-Type": "application/json"
}
```

Request body

| Field | Type | Description |
| --- | --- | --- |
| `body` | Object | Insert Record Request Body Object |

| | | |
|---|---|---|
| database_id | String | Database Id |
| table_id | String | Table Id |
| col1 | String | Value1 |
| col2 | String | Value2 |
| col3 | String | Value3 |

- Request-Example:

```
{
    "database_id": "DB22",
    "table_id": "tab967",
    "col1": "value1",
    "col2": "value2",
    "col3": "value3"
}
```

Success 200

| Field | Type | Description |
|---|---|---|
| body | Object | Success Response Object |
| result | String | Success Result |
| transaction_id | String | Transaction Id |

- Success-Response:

```
HTTP/1.1 200 OK
{
    "result": "Record Inserted"
    "transaction_id": "bc78e5dcee6f3c820f52ba4f8e06b59452e873efa7b63b7a54ff71a80410de4c"
}
```

UPDATE RECORD https://<element_base_url>/api/1.0/record/update

Permission: Authenticated Element™ User with DML_WRITE access

Header

| Field | Type | Description |
|---|---|---|
| Authorization | String | Bearer token with authentication |
| X-ELEMENT-USERNAME | String | Username registered on Element™ |
| X-ELEMENT-OPSTAT  | Boolean | OPSTAT keyword to execute transaction with tracking of operation status. |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Bob"
    "Content-Type": "application/json"
}
```

Request body

| Field | Type | Description |
|---|---|---|
| body | Object | Update Record Request Body Object |
| database_id | String | Database Id |
| table_id | String | Table Id |

| | | |
|---|---|---|
| col1 | String | Value1 |
| col2 | String | Value2 |
| col3 | String | Value3 |

- Request-Example:

```
{
    "database_id": "DB22",
    "table_id": "tab967",
    "col1": "value1",
    "col2": "value2",
    "col3": "value3"
}
```

Success 200

| Field | Type | Description |
|---|---|---|
| body | Object | Success Response Object |
| result | String | Success Result |
| transaction_id | String | Transaction Id |

- Success-Response:

```
HTTP/1.1 200 OK
{
    "result": "Record Updated",
    "transaction_id": "bc78e5dcee6f3c820f52ba4f8e06b59452e873efa7b63b7a54ff71a80410de4c"
}
```

DELETE RECORD

```
https://<element_base_url>/api/1.0/record/delete
```

Permission: Authenticated Element™ User with DML_WRITE access

Header

| Field | Type | Description |
|---|---|---|
| `Authorization` | String | Bearer token with authentication |
| `X-ELEMENT-USERNAME` | String | Username registered on Element™ |
| `X-ELEMENT-OPSTAT` *optional* | Boolean | OPSTAT keyword to execute transaction with tracking of operation status. |
| `Content-Type` | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Alice",
    "Content-Type": "application/json"
}
```

Request body

| Field | Type | Description |
|---|---|---|
| `database_id` | String | Database Id |
| `table_id` | String | Table Name |
| `record_id` | String | Record Id |

- Request-Example:

```
{
    "database_id": "DB1",
    "table_id": "tab_1",
    "record_id": 123
}
```

Success 200

| Field | Type | Description |
|---|---|---|
| body | Object | Success Response Object |
|    result | String | Success Result |
|    transaction_id | String | Transaction Id |

- Success-Response:

```
HTTP/1.1 200 OK
{
    "result": "Record Deleted",
    "record_id": 123,
    "transaction_id": "bc78e5dcee6f3c820f52ba4f8e06b59452e873efa7b63b7a54ff71a80410de4c"
}
```

SELECT RECORD https://<element_base_url>/api/1.0/record/select

Permission: Authenticated Element™ User with DML_READ access

Header

| Field | Type | Description |
|---|---|---|
| Authorization | String | Bearer token with authentication |
| X-ELEMENT-USERNAME | String | Username registered on Element™ |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Alice",
    "Content-Type": "application/json"
}
```

Request body

| Field | Type | Description |
|---|---|---|
| body | Object | Select Record Request Body Object |
| database_id | String | Existing Database Id |
| table_id | String | Existing Table Name |
| bookmark | String | Bookmark for pagination |
| where optional | String | Where clause/condition |
| limit optional | String | Limit of query |
| order_by optional | String | Order by<br><br>Allowed values: "ASC", "DESC" |
| query_level optional | String | Decides the depth of query (default: INFO)<br><br>Allowed values: "INFO", "SYSTEM" |

- Request-Example:

```
{
  "database_id": "city_db",
  "table_id": "details",
  "where": "agent = 'Murphy', branch = 'Civil'",
  "limit": 150,
  "order_by": "DESC",
  "query_level": "INFO"
}
```

Success 200

| Field | Type | Description |
|---|---|---|
| `body` | Object | Response Body Object |
| `query_response` | String | Query Response Object |
| `transaction_id` | String | Transaction Id |
| `bookmark` | String | Bookmark of the current page (for Pagination) |

- Success-Response:

```
HTTP/1.1 200 OK
{
    "query_response": {
        "c045235": {
            "id": "c045235",
            "agent": "Murphy",
            "place_of_incidence": "Central Park",
            "evidence": "ev.pdf",
            "branch": "Civil"
        }
    },
    "transaction_id": "bc78e5dcee6f3c820f52ba4f8e06b59452e873efa7b63b7a54ff71a80410de4c"
    "bookmark": "34k13r4lk423mrkl",
}
```

USER APIs:

REGISTER USER https://<element_base_url>/api/1.0/user/register

Permission: Element™ Admin or Authenticated Element™ User with ADMIN access level

Header

| Field | Type | Description |
|---|---|---|
| `Authorization` | String | Bearer token with authorization |

| Field | Type | Description |
|---|---|---|
| X-ELEMENT-USERNAME | String | Username of a User registered on Element™ |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Jim",
    "Content-Type": "application/json"
}
```

Request body

| Field | Type | Description |
|---|---|---|
| body | Object | Register User Request Body Object |
| username | String | Unique username |
| database_id | String | Existing Database Id |
| access_level | String | Access level to enroll the user with<br><br>Allowed values: "DDL", "DML_WRITE", "DML_READ", "ADMIN" |

- Request-Example:

```
{
    "username": "Matthew",
    "database_id": "Customer",
    "access_level": "DDL"
}
```

Success 200

| Field | Type | Description |
|---|---|---|

| | | |
|---|---|---|
| body | Object | Success Response Object |
| result | String | Success Result |
| username | String | Username |
| transaction_id | String | Transaction Id |

- Success-Response:

```
HTTP/1.1 200 OK
{
    "result": "User Registered",
    "username": "Matthew",
    "transaction_id": "bc78e5dcee6f3c820f52ba4f8e06b59452e873efa7b63b7a54ff71a80410de4c"
}
```

REVOKE USER

```
https://<element_base_url>/api/1.0/user/revoke
```
Permission: Element™ Admin or Authenticated Element™ User with ADMIN access level

Header

| Field | Type | Description |
|---|---|---|
| Authorization | String | Bearer token with authorization |
| Content-Type | String | Application/JSON |
| X-ELEMENT-USERNAME | String | Username of a User registered on Element™ |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Tom",
    "Content-Type": "application/json"
}
```

Request body

| Field | Type | Description |
|---|---|---|
| `body` | Object | Revoke User Request Body Object |
| `username` | String | Existing username |
| `database_id` | String | Existing Database Id |

- Request-Example:

```
{
    "database_id": "db1",
    "username": "Jamie"
}
```

Success 200

| Field | Type | Description |
|---|---|---|
| `body` | Object | Success Response Object |
| `result` | String | Success Result |
| `username` | String | Username |
| `transaction_id` | String | Transaction Id |

- Success-Response

```
{
    "result": "User Revoked",
    "username": "Jamie",
    "transaction_id": "bc78e5dcee6f3c820f52ba4f8e06b59452e873efa7b63b7a54ff71a80410de4c"
}
```

DELETE USER

```
https://<element_base_url>/api/1.0/user/delete
```

Permission: Element™ Admin or Authenticated Element™ User with ADMIN access level

Header

| Field | Type | Description |
| --- | --- | --- |
| `Authorization` | String | Bearer token with authorization |
| `Content-Type` | String | Application/JSON |
| `X-ELEMENT-USERNAME` | String | Username of a User registered on Element™ |

- Header-Example:

```
{
  "Authorization": "Bearer eyJhbGciOiJSUzI1NiIsInR5cCIgOiAiSldUIiwia2lkIiA6ICJ",
  "X-ELEMENT-USERNAME": "Tom",
  "Content-Type": "application/json"
}
```

Request body

| Field | Type | Description |
| --- | --- | --- |
| `body` | Object | Revoke User Request Body Object |
| `username` | String | Existing username |

- Request-Example:

```
{
  "username": "Jamie"
}
```

Success 200

| Field | Type | Description |
| --- | --- | --- |

| | | |
|---|---|---|
| `body` | Object | Success Response Object |
| `result` | String | Success Result |
| `username` | String | Username |
| `transaction_id` | String | Transaction Id |

- Success-Response

```
{
  "result": "User Deleted",
  "username": "Jamie",
  "transaction_id": "bc78e5dcee6f3c820f52ba4f8e06b59452e873efa7b63b7a54ff71a80410de4c"
}
```

INDEX APIs:

CREATE INDEX

```
https://<element_base_url>/api/1.0/index/create
```

Permission: Authenticated Element™ User with DML_WRITE access

Header

| Field | Type | Description |
|---|---|---|
| `Authorization` | String | Bearer token with authentication |
| `X-ELEMENT-USERNAME` | String | Username registered on Element™ |
| `Content-Type` | String | Application/JSON |

- Header-Example:

```
{
  "Authorization": "Bearer eyJhbGciOiJSUzI1NiIsInR5cCIgOiAiSldUIiwia2lkIiA6ICJ",
```

```
"X-ELEMENT-USERNAME": "Alice",
"Content-Type": "application/json"
}
```

Request body

| Field | Type | Description |
|---|---|---|
| body | Object | Create Table Request Body Object |
| database_id | String | Existing Database Id |
| table_id | String | Existing Table Name |
| index_name | String | Name of the Index (unique identifier) |
| index_fields | String | Name of the fields to be indexed |

- Request-Example:

```
{
    "database_id": "city_db",
    "table_id": "details",
    "index_name": "detailsIdCityInd",
    "index_fields": ["id", "city"]
}
```

Success 200

| Field | Type | Description |
|---|---|---|
| body | Object | Success Response Object |
| result | String | Success Result |
| index_name | String | Index Name |

| | | |
|---|---|---|
| transaction_id | String | Transaction Id |

- Success-Response:

```
HTTP/1.1 200 OK
{
    "result": "Index Created",
    "index_name": "detailsIdCityInd",
    "transaction_id": "bc78e5dcee6f3c820f52ba4f8e06b59452e873efa7b63b7a54ff71a80410de4c"
}
```

DELETE INDEX https://<element_base_url>/api/1.0/index/delete

Permission: Authenticated Element™ User with DML_WRITE access

Header

| Field | Type | Description |
|---|---|---|
| Authorization | String | Bearer token with authentication |
| X-ELEMENT-USERNAME | String | Username registered on Element™ |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "Alice",
    "Content-Type": "application/json"
}
```

Request body

| Field | Type | Description |
|---|---|---|
| body | Object | Create Index Request Body Object |

| | | |
|---|---|---|
| `database_id` | String | Existing Database Id |
| `table_id` | String | Existing Table Name |
| `index_name` | String | Name of the Index (unique identifier) |

- Request-Example:

```
{
    "database_id": "city_db",
    "table_id": "details",
    "index_name": "detailsIdCityInd"
}
```

Success 200

| Field | Type | Description |
|---|---|---|
| `body` | Object | Success Response Object |
| `result` | String | Success Result |
| `index_name` | String | Index Name |
| `transaction_id` | String | Transaction Id |

- Success-Response:

```
HTTP/1.1 200 OK
{
    "result": "Index Deleted",
    "index_name": "detailsIdCityInd",
    "transaction_id": "bc78e5dcee6f3c820f52ba4f8e06b59452e873efa7b63b7a54ff71a80410de4c"
}
```

*BULK TRANSACTION APIs:*

*INSERT BULK RECORDS*

```
https://<element_base_url>/api/1.0/record/bulk/insert
```

Permission: Authenticated Element™ User with DML_WRITE access

Header

| Field | Type | Description |
| --- | --- | --- |
| Authorization | String | Bearer token with authentication |
| X-ELEMENT-USERNAME | String | Username registered on Element™ |
| X-ELEMENT-OPSTAT (optional) | Boolean | OPSTAT keyword to execute transaction with tracking of operation status. |
| Content-Type | String | Application/JSON |

- Header-Example:

```
{
  "Authorization": "Bearer eyJhbGciOiJSUzI1NiIsInR5cCIgOiAiSldUIiwia2lkIiA6ICJ",
  "X-ELEMENT-USERNAME": "robert"
  "Content-Type": "application/json"
}
```

Request body

| Field | Type | Description |
| --- | --- | --- |
| body | Object | Bulk Insert Record Request Body Object |
| database_id | String | Database Id |
| table_id | String | Table Id |
| records | Array | Array of Arrays of records to insert |

- Request-Example:

```
{
  "database_id": "DB22",
  "table_id": "tab967",
```

```
    "records": [
        [
            799021,
            "saf89efuew099j",
            78123.912341,
            "MINED",
            null
        ],
        [
            235235,
            "wqknt32i123knafss",
            43534.43523,
            "PENDING",
            true
        ],
        [
            764654,
            "podn4bfjs24o45sa",
            null,
            "MINED",
            true
        ],
        [
            235354,
            "sdglmd49wtw32r3wq",
            3554.34654,
            "MINED",
            false
        ],
        [
            533246,
            "235oijasfsnsafioi",
            457.47334,
            "FAILED",
            false
        ]
    ]
}
```

Success 200

| Field | Type | Description |
|---|---|---|
| body | Object | Success Response Object |
| result | String | Success Result |
| transaction_id | String | Transaction Id |

- Success-Response:

```
HTTP/1.1 200 OK
{
    "result": "Records Inserted"
```

```
    "transaction_id": "bc78e5dcee6f3c820f52ba4f8e06b59452e873efa7b63b7a54ff71a80410de4c"
}
```

UPDATE BULK RECORDS

```
https://<element_base_url>/api/1.0/record/bulk/update
```
Permission: Authenticated Element™ User with DML_WRITE access

Header

| Field | Type | Description |
| --- | --- | --- |
| Authorization | String | Bearer token with authentication |
| X-ELEMENT-USERNAME | String | Username registered on Element™ |
| X-ELEMENT-OPSTAT optional | Boolean | OPSTAT keyword to execute transaction with tracking of operation status. |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "robert"
    "Content-Type": "application/json"
}
```

Request body

| Field | Type | Description |
| --- | --- | --- |
| body | Object | Bulk Update Record Request Body Object |
| database_id | String | Database Id |
| table_id | String | Table Id |

| | | |
|---|---|---|
| `where` | String | Where clause/condition |
| optional | | |
| `record_field` | String | Records to be updated with the new values |

- Request-Example:

```
{
    "database_id": "DB22",
    "table_id": "",
    "where": "column2 = '002'",
    "record_field": {
        "column3": "new_value"
    }
}
```

Success 200

| Field | Type | Description |
|---|---|---|
| `body` | Object | Success Response Object |
| `result` | String | Success Result |
| `transaction_id` | String | Transaction Id |

- Success-Response:

```
HTTP/1.1 200 OK
{
    "result": "Records Updated"
    "transaction_id": "bc78e5dcee6f3c820f52ba4f8e06b59452e873efa7b63b7a54ff71a80410de4c"
}
```

*DELETE BULK RECORDS*

```
https://<element_base_url>/api/1.0/record/bulk/delete
```
Permission: Authenticated Element™ User with DML_WRITE access

Header

| Field | Type | Description |
|---|---|---|

| | | |
|---|---|---|
| Authorization | String | Bearer token with authentication |
| X-ELEMENT-USERNAME | String | Username registered on Element™ |
| X-ELEMENT-OPSTAT*optional* | Boolean | OPSTAT keyword to execute transaction with tracking of operation status. |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "robert"
    "Content-Type": "application/json"
}
```

Request body

| Field | Type | Description |
|---|---|---|
| body | Object | Bulk Delete Record Request Body Object |
| database_id | String | Database Id |
| table_id | String | Table Id |
| where | String | Where clause/condition |

*optional*

- Request-Example:

```
{
    "database_id": "DB22",
    "table_id": "",
    "where": "column2 = '002'"
}
```

Success 200

| Field | Type | Description |
| --- | --- | --- |
| body | Object | Success Response Object |
| result | String | Success Result |
| transaction_id | String | Transaction Id |

- Success-Response:

```
HTTP/1.1 200 OK
{
    "result": "Records Deleted"
    "transaction_id": "bc78e5dcee6f3c820f52ba4f8e06b59452e873efa7b63b7a54ff71a80410de4c"
}
```

*SQL QUERY APIs:*

*EXECUTE SQL QUERY*

▬

```
https://<element_base_url>/api/1.0/query
```

Permission: Authenticated Element™ User with access level based on the query among ADMIN, DDL, DML_WRITE & DML_READ

Header

| Field | Type | Description |
| --- | --- | --- |
| Authorization | String | Bearer token with authentication |
| X-ELEMENT-USERNAME | String | Username registered on Element™ |
| Content-Type | String | Application/JSON |

- Header-Example:

```
{
    "Authorization": "Bearer eyJhbGciOiJSUzI1NiIsInR5cCIgOiAiSldUIiwia2lkIiA6ICJ",
    "X-ELEMENT-USERNAME": "admin",
    "Content-Type": "application/json"
}
```

Request body - Create and Drop Database Query

| Field | Type | Description |
|---|---|---|
| body | Object | Drop Database Query Request Body Object |
| query | String | Drop Database Query |

Request body - All other queries

| Field | Type | Description |
|---|---|---|
| body | Object | Create Table Query Request Body Object |
| database_id | String | Existing Database Id |
| query | String | Create Table Query |

- Request Example

```
{
  "database_id": "organization",
  "query": "DELETE FROM Reports WHERE status = 'Rejected' LIMIT 50 OPSTAT"
}
```

Success response - Create Database Query

| Field | Type | Description |
|---|---|---|
| body | Object | Success Response Object |
| query_response | String | Query Result |
| database_id | String | Database Id |

| | | |
|---|---|---|
| transaction_id | String | Transaction Id |

Success response - Drop Database Query

| Field | Type | Description |
|---|---|---|
| body | Object | Success Response Object |
| query_response | String | Query Result |
| database_id | String | Database Id |
| transaction_id | String | Transaction Id |

Success response - Create Table Query

| Field | Type | Description |
|---|---|---|
| body | Object | Success Response Object |
| query_response | String | Query Result |
| table_id | String | Table Id |
| transaction_id | String | Transaction Id |

Success response - Alter Table Query

| Field | Type | Description |
|---|---|---|

| | | |
|---|---|---|
| body | Object | Success Response Object |
| query_response | String | Query Result |
| table_id | String | Table Id |
| transaction_id | String | Transaction Id |

Success response - Drop Table Query

| Field | Type | Description |
|---|---|---|
| body | Object | Success Response Object |
| query_response | String | Query Result |
| table_id | String | Table Id |
| transaction_id | String | Transaction Id |

Success response - Insert Record Query

| Field | Type | Description |
|---|---|---|
| body | Object | Success Response Object |
| query_response | String | Query Response |
| rows_affected | Number | Record Inserted |

| Field | Type | Description |
| --- | --- | --- |
| record_ids | Array | Array containing the inserted Record Id |
| transaction_id | String | Transaction Id |

Success response - Update Record Query

| Field | Type | Description |
| --- | --- | --- |
| body | Object | Success Response Object |
| query_response | String | Query Response |
| rows_affected | Number | Number of Record(s) Updated |
| record_ids | Array | Array of Record Id(s) |
| transaction_id | String | Transaction Id |

Success response - Delete Record Query

| Field | Type | Description |
| --- | --- | --- |
| body | Object | Success Response Object |
| query_response | String | Query Response |
| rows_affected | Number | Number of Record(s) Deleted |
| record_ids | Array | Array of Record Id(s) |

| | | |
|---|---|---|
| transaction_id | String | Transaction Id |

Success response - Select Record Query

| Field | Type | Description |
|---|---|---|
| body | Object | Success Response Object |
| query_response | String | Query Response |
| records | Object | Record Objects fetched |
| bookmark | String | Bookmark of the current page (for Pagination) |
| transaction_id | String | Transaction Id |

Success response - Bulk Insert Record Query

| Field | Type | Description |
|---|---|---|
| body | Object | Success Response Object |
| query_response | String | Query Response |
| rows_affected | Number | Number of Record(s) Inserted |
| record_ids | Array | Array of Record Id(s) |
| transaction_id | String | Transaction Id |

Success response - Show Tables Query

| Field | Type | Description |
|---|---|---|
| body | Object | Success Response Object |
| query_response | String | Query Response |
| tables | Array | Array of table(s) |
| transaction_id | String | Transaction Id |

Success response - Show Databases Query

| Field | Type | Description |
|---|---|---|
| body | Object | Success Response Object |
| query_response | String | Query Response |
| databases | Array | Array of database(s) |
| transaction_id | String | Transaction Id |

Success response - Describe Table Query

| Field | Type | Description |
|---|---|---|
| body | Object | Success Response Object |
| query_response | String | Query Response |

| | | |
|---|---|---|
| tables | Array | Array of table(s) |
| transaction_id | String | Transaction Id |

- Success-Response:

```
HTTP/1.1 200 OK
{
    "transaction_id": "c0ebe811e3439c2c71849c88fdaf5df9ca93661cc85eb129e95eec01e62ac09a",
    "query_response": {
        "bookmark":
"g1AAAABMeJzLYWBgYMpgSmHgKy5JLCrJTq2MT8lPzkzJBYrz5VaWJBla6OVWFqUmGxmBVHHAVGGRzwIAPWwWfw",
        "records": {
            "j32432": {
                "age": 23,
                "city": "Portland",
                "firstname": "Jacob",
                "id": "j32432",
                "lastname": "Williams"
            },
            "m325253": {
                "age": 45,
                "city": "Toronto",
                "firstname": "Michael",
                "id": "m325253",
                "lastname": "Corleone"
            }
        }
    }
}
```

APPENDIX E

ELEMENT SQL: HIGH-LEVEL REQUIREMENTS

SQL QUERY INPUT PATHWAYS

ELEMENT 1.0 realizations accept ELEMENT SQL queries from three sources, as outlined in the following table:

| SQL Input Pathway | Notes |
| --- | --- |
| ELEMENT Console 108 | The ELEMENT Console 108 prepares queries and commands in ELEMENT SQL form and has the capability to send them to the ELEMENT API 104 in the bodies of HTTP requests. |
| ELEMENT SDK 102 | Once properly configured, the ELEMENT SDK 102 provides an *executeQuery()* function (with exact form appropriate to the SDK language). The function accepts a string, which is expected to be a valid ELEMENT SQL statement. The ELEMENT SDK 102 passes the statement to the ELEMENT API 104 to be parsed and executed. |
| Smart Contracts | The ELEMENT system is also specified to allow users' smart contracts to execute at least a subset of ELEMENT SQL queries. This allows a distributed ledger identity to access RDBMS features of ELEMENT to save data in a structured format without the requirements of the other pathways. DML queries are made available to smart contracts; database creation, updates to access rights, and DDL queries also may be made available to smart contract code. |

SQL CONCEPTS SUPPORTED IN ELEMENT

Implicit in the remainder of this specification is the fact that ELEMENT implementations support equivalents to a number of common SQL constructs including:

Columns

Data types

Identifiers

Null values

Rows (also called *Records* here)

Schema definitions

SQL-schema statements

SQL-statements

Tables

DATA TYPES

DATA TYPES IN ELEMENT - BACKGROUND

Records in the ELEMENT system are associated with a specific table. Every cell value belongs to a data type which is dictated by a column defined in its ELEMENT table.

In ELEMENT SQL, the name of a predefined data type is a reserved keyword. The data types are inspired from existing SQL types; however, the ELEMENT system is composed of native precision and range metrics that differ from previous SQL implementations.

All ELEMENT predefined data types are atomic in nature, *i.e.* a data type whose values are not composed of values of other data types.

The ELEMENT system currently supports 3 predefined data types:

1. Number

The 'Number' data type of ELEMENT system supports all operational number types. It is a combination of familiar SQL data types such as NUMERIC, INTEGER and DECIMAL types that also supports precision for decimal values.

'NUMBER' is a data type as well as a keyword that denotes any numerical values while constructing SQL queries. The maximum length or the precision for Number is exactly 16 digits that include the scale or digits of decimal fraction.

RANGE:

-9999999999999998 to 9999999999999998

Consider the following examples to determine the acceptable range of Number datatype.

- ✅ INSERT INTO Customers (CustomerId) VALUES ( -9999999999999998 )
- ✅ INSERT INTO Customers (CustomerId) VALUES ( 17458909.98754397 )
- ❌ INSERT INTO Customers ( CustomerId ) VALUES ( 9999999999999999 )
- ❌ INSERT INTO Customers ( CustomerId ) VALUES (1367778390.99984778666658 )

2. String

The String data type for ELEMENT system supports all string related values. It is a composition of variable length character string types and resembles the TEXT datatype in SQL.

The string data type is denoted by the 'STRING' keyword that accepts all variable length character strings. ELEMENT v1.0 does not support fixed-length strings. The ELEMENT implementation-defined range of STRING data type has no set hard limit, but there is a physical limit that is defined by various factors such as operating hardware, connectivity and distributed ledger platform configurations.

Input STRING values for ELEMENT queries are UTF-8 encoded. Alternate encodings like CESU-8 and Modified UTF-8 are not treated as valid UTF-8.

3. Boolean

A value of the Boolean data type is either true or false.

The truth-value of the unknown is sometimes represented by the null value.

If a boolean column has the null value enabled, then null represents an unknown truth value.

TYPOGRAPHICAL CONVENTIONS

This documentation consists of text descriptions of a simple variant of Backus-Naur Form (BNF) that includes the following typographical and syntax conventions:

| Convention | Description |
| --- | --- |
| Bold | Bold typeface indicates commands or characters the user types, the names of user interface elements or more frequently indicates to keywords. Keywords are case-sensitive in some, but not all, operating systems. Words that are not in boldface are placeholders (elaborated below) for which the user substitutes a name or value. |
| Fixed width | A fixed-width(Courier New) font is used in syntax, code examples, system output, and file names. |
| *Fixed width Italics* | Fixed width italics (Calibri) marks non-contextual content. Headings, additional information, *etc.* may be represented using this convention. |
| ::= | The definition operator is used to provide definitions of the element appearing on the left side of the operator in a production rule. |
| [ ] | Square brackets indicate the items within them are optional. |
| { } | Braces indicate the items within them are required. |
| <> | Angle brackets refer to specific variable inputs such as SQL data types and respective values. |

| | A vertical bar indicates a choice which separates alternatives within brackets or braces. |
|---|---|
| ... | Ellipsis points show that the preceding syntactic element may be repeated. |

SQL Syntax Glossary For ELEMENT

Keywords from Standard SQL

ELEMENT 1.0 supports a subset of the SQL language including the following standard keywords, plus a few ELEMENT-specific ones which will be described later in the specification:

| ADD | ALL | ALTER | AND | ANY |
|---|---|---|---|---|
| BETWEEN | BULK | CREATE | COLUMN | DATABASE |
| DEFAULT | DELETE | DROP | FROM | INSERT |
| IN | INTO | LIKE | NOT IN | NOT NULL |
| OR | ORDER BY | PRIMARY KEY | RENAME | SELECT |
| SET | TABLE | TO | TYPE | UPDATE |
| VALUES | WHERE | | | |

NOTE: The * symbol is also supported by ELEMENT system which denotes ALL the records/columns of an ELEMENT table.

NULL Keyword

NULL is used as a keyword as well as a value.

Null differs from other values in the following respects:

The null value may be used to either show blank or no value for certain fields by using the data type 'null' for a record. NULL as a keyword may be used, along with NOT operator as validation to check empty records. NULL may also be used to set a default value of a column as null.

The value of null does not 'equal' to any other value, similarly it is 'not equal' to any other value — it is unknown whether or not null is equal to any other given value. The absence of any meaningful data value may be represented as null.

IDENTIFIERS

ELEMENT v1.0 supports only English as the local language, support for Internationalization (i18n) will be available for future release. Two types of identifiers are defined in ELEMENT:

*database_name* identifiers match this regular expression:

/^(?=.{1,50}$)([a-zA-Z0-9]+(-[a-zA-Z0-9]+)*)$/

*identifier* is a string that matches the following regular expression:

/^(?=.{1,50}$)([a-zA-Z0-9]+((-|_)[a-zA-Z0-9]+)*)$/

All identifiers have a maximum length of 50 characters.

*identifier* is used in the following contexts:

> *table_name* ::= *identifier*
> 
> *column_name* ::= *identifier*
> 
> *old_column_name* ::= *identifier*
> 
> *new_column_name* ::= *identifier*

ELEMENT system restricts *identifier* to include the names of default and reserve keywords.

DATA TYPES AND VALUES

ELEMENT v1.0 supports 3 predefined data types: String, Number, and Boolean as discussed earlier.

*data_type* ::= [ NUMBER | STRING | BOOLEAN ]

*value* ::=

<value> *(Corresponding to selected data type)* - Refer <u>Data Types In Element</u> section.

COMPARISON OPERATORS

Comparison operators in ELEMENT SQL, as their name suggests, allows the comparison of two values. It equates strings or numbers for relationships such as equality, greater or smaller than values.

List of Comparison Operators:

| Operators | Description |
| --- | --- |
| < ( less than) | Returns true when the left operand is less than the right operand. |
| > ( greater than) | Returns true when the left operand is greater than the right operand. |
| <= ( less than or equal ) | Returns true when the left operand is less than or equal to the right operand. |
| >= (greater than or equal) | Returns true when the left operand is greater than or equal to the right operand. |
| = ( equal ) | Returns true when the operands are equal, but the type of the operands are the same. |

<> or != ( not equal)    Returns true when the operands are not equal.

*comparision_operator ::=*

[ < | > | <> | != | >= | <= | = ]

COMBINATION EXPRESSIONS

ELEMENT SQL supports the evaluation of two or more situational data or selections using conditional keywords generally used with the WHERE clause. Logical along with some comparison operators together form the Combination Operators in ELEMENT system. The supported combination operators are mentioned below:

ALL

The ALL operator queries data by comparing a value with a list of values or a set of values returned by a subquery.

*all_expression ::=* column_name comparision_operator ALL ( { subquery | <value> , <value> , ... } )

ANY

The ANY operator compares a value to a list of values or a set of values returned by a subquery.

*any_expression ::=* column_name comparision_operator ANY ( { subquery | <value> , <value> , ... } )

IN

The IN operator is used within the WHERE clause to check if a value matches any value in a list of values.

*in_expression* ::= column_name IN ( { subquery | <value> , <value> , ... } )

The AND, OR, and NOT keywords are ELEMENT SQL's logical operators. These keywords are mostly used to join or invert conditions in a SQL statement, specifically in the WHERE clause. The syntax for the logical operators are explained further with combination of other SQL commands.

PATTERN MATCHING

ELEMENT SQL supports regex based string pattern matching. The patterns may be matched by for record values present in table columns using the LIKE operator. The LIKE operator acts like an 'equals' ( = ) operator to match string patterns. There are two wildcards often used in conjunction with the LIKE operator:

% - The percent sign represents zero, one, or multiple characters

_ - The underscore represents a single character

Note: Asterisk (*) and question mark (?) s are also supported.

*like_clause* ::= column_name LIKE ' <pattern> '

*pattern* ::=

{ <character> | <wildcard> } [ <character> | <wildcard> ] [ <character> | <wildcard> } ...

*wildcard* ::=

{ % | _ | $ | * | ? }

SUBQUERY

A subquery is a SQL query nested inside, usually embedded in WHERE clause, of a larger SQL query.

The subquery may be nested inside a SELECT, INSERT, UPDATE, or DELETE statement or inside another subquery. It is usually added within the WHERE Clause of another SQL SELECT statement. Comparison operators, such as >, <, or =, along with combination operators such as IN, ANY, or ALL may be used with subqueries.

A subquery is also called an inner query or inner select, while the statement containing a subquery is also called an outer query or outer select.

Rules for Subquery

- The subquery executes before the execution of the main query.

- The subquery result is processed as an input for the main query.

- A subquery is enclosed in parentheses, although for INSERT, the subquery is treated as a regular SELECT statement.

- A subquery is placed on the right side of the comparison operator.

- Subqueries cannot manipulate corresponding results internally, therefore ORDER BY clause cannot be added into a subquery. An ORDER BY clause may be used in the main SELECT statement which will be the last clause.

- SQL operators should be used based on number of rows affected by the subquery.

- If a subquery returns a null value to the main query, the main query will not return any rows while using certain combination operators in a WHERE clause.

- ELEMENT specific keywords and extensions MAY NOT be used in a subquery.

Type of Subqueries

- Single row subquery : Returns zero or one row.

- Multiple row subquery : Returns one or more rows.

- Multiple column subqueries : Returns one or more columns.

- Nested subqueries : Subqueries are placed within another subquery.

*subquery ::=*

SELECT { * | <column_name> | <column_name> , <column_name> , ... }
FROM <table_name>
WHERE search_condition
[ LIMIT <value> ]

*search_condition ::=* search_clause [{ AND | OR } search_clause [ { AND | OR } search_clause ] ... ]

*search_clause::=*

[ NOT ]{ comparison_clause | combination_clause | between_clause | like_clause }

*comparison_clause ::=*

<column_name> comparision_operator {<value> | NULL }

*combination_clause ::=*

{ all_expression | any_expression | in_expression }

*between_clause ::=*

{ ( <value> [ NOT ] BETWEEN <value> AND <value> ) }

DDL COMMANDS

A data definition language (DDL) is a computer language used to create and modify the structure of database objects in a database. Supported database objects in ELEMENT SQL include schemas, tables and indexes. The following DDL SQL statements are supported by ELEMENT implementations, using the syntax described.

As stated in high-level requirements, DDL SQL statements may be supported for invocation by smart contracts.

CREATE DATABASE

Creates a new database in the system.

*create_database_statement ::=*

CREATE DATABASE database_name [ ; ]

*database_name ::= Identifier*

Name of the database to be created

CREATE TABLE

Creates a new table in the current database. A table may have multiple columns, with each column definition consisting of a name, data type, and optional column definition.

*create_table_statement ::=*

CREATE TABLE table_name ( {column_definition}, ... )[ ; ]

*column_definition ::=* column_name <data_type> [ DEFAULT | NULL | NOT NULL | PRIMARY KEY ] [ ; ]

*table_name ::= identifier*

Name of the table to be created

*column_name ::= identifier*

Name of the column

ALTER TABLE

Modifies the properties, columns, or constraints for an existing table.

NOTE: ELEMENT SQL grammar for ALTER TABLE does not support more than one operation at a time. In this syntax, the action keyword shows all the ELEMENT supported variations of ALTER table query available for the user.

*alter_table_statement ::=*

ALTER TABLE table_name { action }

*action ::=*

{

ADD column_name <data_type> [DEFAULT] <value> |

DROP column_name |

ALTER column_name TYPE <data_type> *(Only applicable when table has no records)* |

RENAME COLUMN old_column_name TO new_column_name

} [ ; ]

*table_name ::= identifier*

Name of the table to be altered

*column_name ::= identifier*

Name of the column to be altered

*old_column_name ::= identifier*

Name of the column to be renamed

*new_column_name ::= identifier*

New name of the column after alteration

DROP TABLE

Removes a table from the current database.

*drop_table_statement ::=*

DROP TABLE table_name [ ; ]

*table_name ::= identifier*

Name of the table to be removed

DROP DATABASE

Removes a database from the ELEMENT system.

*NOTE: The data on the database is cleared, however the database is not hard-deleted from the network. The database name, even after using the DROP DATABASE operation, is unique and cannot be reused.

*drop_database_statement ::=*

DROP DATABASE database_name [ ; ]

*database_name ::= identifier*

Name of the database to be cleared

SHOW TABLES

Lists the tables for which the user has access privileges. The command may be used to list tables for the current/specified database.

The output returns a list of tables, ordered lexicographically by table name.

>  *show_tables_statement ::=*
>  SHOW TABLES [ ; ]

SHOW DATABASES

Lists the databases for which the user has access privileges across the entire account, including dropped databases that will be visible on the distributed ledger platform.

The output returns a list of databases, ordered lexicographically by database name.

>  *show_databases_statement ::=*
>  SHOW DATABASES [ ; ]

DESCRIBE TABLE

Describes either the columns or the current values in a table. DESCRIBE query returns all the details and meta data of the selected table.

>  *describe_table_statement ::=*
>  DESC [ RIBE ] [ TABLE ] table_name [ ; ]

>  *table_name ::= identifier*
>  Name of the table for which description will be returned

DML (WRITE) COMMANDS

Data Manipulation Language (DML) is a computer programming language used for adding (inserting), deleting, and modifying (updating) data in a database. A DML is often a sublanguage of a broader database language such as SQL, with the DML comprising some of the operators in the language, as is the case here. The following are DML SQL write commands, which may alter the current state of data, and are supported by ELEMENT realizations.

INSERT record

Updates a table by inserting one or more rows into the table. The values inserted into each column in the table may be explicitly specified.

*insert_statement ::=*

INSERT INTO table_name [ column_name, column_name, ... ]

[ select_statement | subquery ]

VALUES { DEFAULT | NULL | <value>, <value>, ... }

[OPSTAT][ ; ]

*table_name ::= identifier*

Name of the table where data will be added

*column_name ::= identifier*

Name of the column where data will be added

NOTE: The values for INSERT are mandatory and at least one field ( primary key field ) will have a definite value. The rest of the values, if left unfilled will be considered as NULL by the ELEMENT system.

DELETE record

Remove data from a table. Specific data is removed using WHERE clause.

*delete_statement ::=*

DELETE FROM table_name

WHERE search_condition

[ LIMIT | OPSTAT ] [ ; ]

*table_name ::= identifier*

Name of the table from which records will be removed

UPDATE record

Updates specified rows in the target table with new values.

*update_statement ::=*

UPDATE table_name

SET assignment

[ WHERE search_condition] [ ; ]

[ LIMIT | OPSTAT ] [ ; ]

*assignment ::=*

{ ( column_name = <value> | NULL ,

[ column_name = <value> | NULL ], ... ) }

*table_name ::= identifier*

Name of the table to be modified

*column_name ::= identifier*

Name of the column used to compare or search for a particular data

DML (READ) COMMANDS

Read-only selecting of data is sometimes distinguished as being part of a separate Data Query Language(DQL), but it is closely related and sometimes also considered a component of a DML. The following SQL DML read command is supported by ELEMENT implementations, with the syntax described.

SELECT

*select_statement* ::=

SELECT [ * | column_name | column_name , column_name ... ]

FROM table_name

WHERE search_condition

[ ORDER BY column_name ASC | DSC ]

[ LIMIT <value> ]

[ QUERYLEVEL {INFO | SYSTEM }] | [ BOOKMARK <value> ][ ; ]

*table_name* ::= *identifier*

Name of the table from which data is read

*column_name* ::= *identifier*

Name of the column from which data is retrieved, or by which results are ordered NOTE: The ORDER BY operation may only be conducted on indexed columns.

ELEMENT EXTENSIONS TO SQL

ELEMENT 1.0 realizations also support the following keywords as extensions to standard SQL.

1. OPSTAT

OPSTAT is the request for tracking of indication that an operation has been incorporated in the ledger.

When OPSTAT is added to the end of a SQL DML Write query invoked from the Console or SDK, the caller will receive one of three responses by the end of the preconfigured time out. The 3 possible responses are:

I. SUCCESS: The success responses means that the SQL operation is successfully updated and the data has been incorporated in the distributed ledger to a platform-relevant extent.
II. FAILURE: The failure status represents that the SQL command was not successfully executed and the data was never updated on the ledger.
III. TIMEOUT: When the SQL command exceeds the preconfigured time-out period, users are returned with a TIMEOUT response. There is currently not a confirmation that the query results were incorporated in the ledger.

OPSTAT is also assumed for all DDL operations, whether added to the query or not. For queries run directly from smart contracts, OPSTAT is ignored if included, and a regular query response is returned instead. This is because the ELEMENT operation is a step within a larger transaction (the invocation of the smart contract) and for this reason, the success or failure of the operation isn't defined except as a part of the successful execution of the entire smart contract transaction.

Syntax Rules for OPSTAT:

- OPSTAT is used at the end of a valid query, this means that no operations or clauses may appear after the OPSTAT keyword.

- OPSTAT keyword is used with SELECT, UPDATE, INSERT and DELETE operations only.

Examples:
INSERT INTO sample_table[('ABC','DEF',123,false)] OPSTAT

DELETE FROM Task WHERE status = 'Rejected' LIMIT 50 OPSTAT

2. LIMIT

The LIMIT keyword is similar to the traditional SQL LIMIT operation along with some ELEMENT specific rules. LIMIT constrains the maximum number of rows returned by a query.

Syntax Rules for LIMIT:

- LIMIT is used with SELECT, UPDATE and DELETE operations.

- LIMIT is used before OPSTAT keyword for UPDATE and DELETE queries.

- In SELECT query, LIMIT is used before BOOKMARK or QUERY_LEVEL keywords.

Examples:
SELECT contact_id, last_name, first_name FROM contacts WHERE city = 'Vienna' ORDER BY last_name ASC LIMIT 400 QUERYLEVEL SYSTEM BOOKMARK tldg213sd45sa7fd

DELETE FROM Task WHERE status = 'Rejected' LIMIT 50 OPSTAT

3. QUERYLEVEL

The QUERYLEVEL feature provides the metadata information about the selected records. User receives the information in the query response after executing the QUERYLEVEL command with the SELECT query.

There are two information levels for this functionality:

1. INFO: This is the default information level set by ELEMENT. At this level the user is provided with Column names and their respective values.

2. SYSTEM: The SYS or the System QUERYLEVEL provides a detailed information about the selected records. The detailed metadata include fields such as:

a. date of creation b. last modified date c. created by d. unique ids: record id, table id e. version details

Syntax Rules for QUERYLEVEL:

- QUERYLEVEL is used for read operations, i.e. only with SELECT query.

- It is used before LIMIT keyword and is positioned at the end of the query.

- The position of QUERYLEVEL may be interchanged with BOOKMARK keyword.

Examples:
**SELECT * FROM data WHERE city = 'LA' LIMIT 70 BOOKMARK nw1e83ge6ds43uia QUERYLEVEL INFO**

SELECT id FROM data WHERE city = 'Newark' QUERYLEVEL SYSTEM BOOKMARK erttnkel63ze9fs02vfe

4. BOOKMARK

The BOOKMARK query is used for pagination of an ELEMENT table data. The page size for a table is set using the LIMIT keyword along with Bookmark. By default, all the pages have a designated unique marker which the user may access by using the BOOKMARK query. The query returns an object that contains the BOOKMARK and the query response. Using the obtained BOOKMARK user may view/access the data on the subsequent page.

Syntax Rules for BOOKMARK:

- BOOKMARK keyword is used with SELECT query only.

- BOOKMARK is used at the end of query; hence it is used after LIMIT keyword.

- The position of BOOKMARK may be interchanged with QUERYLEVEL keyword.

Examples:
**SELECT * FROM data WHERE id = 'j3' LIMIT 70 BOOKMARK** nw1e83ge6ds43uia

**SELECT * FROM data WHERE city = 'LA' LIMIT 70 BOOKMARK nw1e83ge6ds43uia QUERYLEVEL INFO**

HTTP/1.1 200 OK
{
    "transaction_id": "c0ebe811e3439c2c71849c88fdaf5df9ca93661cc85eb129e95eec01e62ac09a",
    "query_response": {

```
"bookmark":
"g1AAAABMe3zLYWBgYMpgSmHgKy5JLCrJTq2MT8lPzkzJBYrz5VaWJBla6
OVWFqUmGxmBVHHAVGGRzwIAPWWWfw",
        "records": {
                "j32432": [
                        "age": 23,
                        "city": "Portland",
                        "firstname": "Jacob",
                        "id": "j3",
                        "lastname": "Williams"
                },
                "m325253": {
                        "age": 45,
                        "city": "Toronto",
                        "firstname": "Michael",
                        "id": "j3",
                        "lastname": "Corleone"
                }
            }
        }
}
```

Query Response with Bookmark

5.    BULK INSERT records

ELEMENT supports the multiple insertion of records to ELEMENT tables using the BULK INSERT feature.

The BULK INSERT operation functions very similar to DELETE and UPDATE queries where multiple rows are affected/modified. Hence the 'number of rows affected' (more details in ELEMENT API Specification – Appendix D) field in the subsequent query responses for these operations may be any number 'n'. Although an ELEMENT specific limit has been set for optimal operation.

On the contrary, the INSERT command only deals with a singular row so the 'number of rows affected' value in the INSERT query response is fixed at 1.

Example:

BULK INSERT INTO EventLogs

[(799021, "saf89efuew099j", 78123.912341, "MINED", null), (235235, "wqknt32il23knafss", 43534.43523, "PENDING", true), (764654, "podn4bfjs24o45sa", null, "MINED", true), (235354, "sdglmd49wtw32r3wq", 3554.34654, "MINED", false), (533246, "235oijasfsnsafioi", 457.47334, "FAILED", false)]

HTTP/1.1 200 OK

{

"query_response": "{

"rows_affected": 3,

"record_ids": [

"Cardinal",

"Jones",

"Edward"

],

{

"transaction_id": "cb6571f16104e576b7be953e0fele85c9d889e40027a79d8aee80dcf2b8d85a8"

:

Query Response for Bulk Insert

APPENDIX F

ELEMENT Node.js® SDK Function Documentation

Introduction

Element's Language-Specific SDK is a tool which enables developers to interact with the ELEMENT™ system directly from their application code. This document details the version of the SDK that has been developed for use with Node.js® applications.

The Node.js® SDK (called "ELEMENT_SDK") is fairly simple, comprising a constructor that configures it for use for a specific user and ELEMENT database, and a function that accepts a SQL statement parameter. The database operations themselves are invoked using the syntax of the SQL parameter. For details, see Appendix E.

Reuse In Element_Chaincode

In the Fabric realization, Node.js® is also an accepted language for extending the distributed ledger platform (via "system chaincode"). Because of this, there was an opportunity to reuse the work on the Node.js® ELEMENT_SDK in the Element_Chaincode deployed in the Fabric platform. As a result, ELEMENT_SDK has been turned into two similar packages. The first is used as the SDK as illustrated in the ELEMENT specifications. The second version of the package is deployed as part of the Element_Chaincode component that adds ELEMENT features to Fabric peer nodes. This makes the executeQuery() function available to "user chaincode" smart contracts, enabling their use of SQL as required by the ELEMENT specification.

| ELEMENT Node.js® SDK | |
|---|---|
| constructor | constructor can accept the config as an object (json) or string arguments (baseUrl, database, username, [authToken]).<br><br>config as an object<br>{<br>  baseUrl: "baseurl",<br>  database: "database name",<br>  username: "user name",<br>  authToken: "token" (optional field)<br>}<br><br>string arguments<br>baseurl : string <base url><br>database : string <database name><br>username : string <user name><br>authToken : string <token> (optional fields)<br><br>This is used to instantiate the ElementClient. |

| Method Name | Input Parameter | Response | Logic Sequence |
|---|---|---|---|
| executeQuery | query : string<br><br>query is a valid Element sql statement. | Success Response :<br>{<br>  status : http status code,<br>  payload : response object | Invokes /query API of the ElementDB_Console component with the provided query. |

| | (for details refer to ELEMENT™ 1.0 Specification-ELEMENT SQL™) | } | |
| --- | --- | --- | --- |
| | | Error Response : { status : http status code, error: error object } error object List : { 'msg': 'Invalid Base URL', 'code': 'INVALID_BASE_URL' } { 'msg': 'Invalid Base URL', 'code': 'INVALID_ARGUMENTS' } | |
| User Chaincode SDK | | | |
| Method Name | Input Parameter | Response | Logic Sequence |
| executeQuery | query : string<br><br>query is a valid Element sql statement. | {<br>"query_response":{<br>"record_ids":[<br>"myrec34" | Invokes of executeQuery() of Elemen_ Chaincode with the provided query. |

| | (for details refer to ELEMENT™ 1.0 Specification- ELEMENT SQL™) | ],<br>"rows_affected":1<br>}<br>} | |
|---|---|---|---|

APPENDIX G

FABRIC SERVICE LAYER INTERFACE SPECIFICATION

Introduction

FabricService realizes the Platform-Specific Service Layer abstract component in the ELEMENT 1.0 specification and implements the Service Layer Interface which acts as a middle man for interaction between the API layer and the distributed ledger platform. Its services help to perform RDBMS related operations.

This Appendix details FabricService, and its function signatures (excluding a few Fabric-specific functions like bulk update) can be taken as the specification for the Service Layer Interface.

Prerequisite

The following prerequisites are required to deploy FabricService with Element™ Console:

Node 8.x should be installed.

Fabric setup should be configured properly.

Service and Methods

| Method Name | Input Parameter | Response | Logic Sequence |
|---|---|---|---|
| Database Service | | | |
| createDatabase | username : string, databaseId : string | { result: "Database Created", database_id: databaseId, transaction_id: transactionId } | Calls createAndJoinChannel() Invokes invokeTransaction() of Fabric Service |
| dropDatabase | username : string, databaseId : string | { result: "Database Dropped", database_id: databaseId, transaction_id: transactionId } | Invokes invokeTransaction() of Fabric Service Calls dropTable() method of TableService. |
| Table Service | | | |
| createTable | username : string, tableObj : json  Example : tableObj { "database_id": "testdb", "table_id": "table1", | { result: "Table Created", table_id: tableId, transaction_id: transactionId } | Invokes invokeTransaction() of Fabric Service |

| | | | |
|---|---|---|---|
| | "primary_key": "id", <br> "columns": { <br> "id": { <br> "datatype": "NUMBER", <br> }, <br> "city": { <br> "datatype": "STRING", <br> "not_null": true, <br> "default_value": "New York" <br> }, <br> "isactive": { <br> "datatype": "BOOLEAN", <br> "default_value": true <br> }, <br> } <br> } | | |
| dropTable | username : string, <br> tableObj : json <br><br> Example : tableObj <br> { <br>   "database_id": "testdb", <br>   "table_id": "table1", | { <br> result: "Table Dropped", <br> table_id: tableId, <br> transaction_id: transactionId <br> } | Invokes invokeTransaction() of Fabric Service <br><br> Recursive call of invokeTransaction() to delete the records of table |

|  | } |  |  |
| --- | --- | --- | --- |
| alterTable<br><br>Operation:<br>  Rename<br>  Drop column<br>  Add column<br>  Modify datatype | username : string,<br>tableObj : json<br><br>Example : tableObj<br>{<br>  "database_id":<br>"factory",<br>  "table_id":<br>"employees",<br>  "operation":<br>"RENAME",<br>  "mobile": {<br>    "name": "contact"<br>  }<br>} | {<br>result: "Table Altered",<br>table_id: tableId,<br>transaction_id: transactionId<br>} | Invokes invokeTransaction() of Fabric Service<br><br>Recursive call of invokeTransaction() to update the records of altered table |
| Record Service | | | |
| insertRecord | username : string,<br>recordObj : json,<br>opstat : boolean<br><br>Example : recordObj<br>{<br>  "database_id":<br>"DB22",<br>  "table_id": "tab967",<br>  "col1": "value1", | {<br>result: "Record Inserted",<br>record_id: recordId,<br>transaction_id: transactionId<br>} | Invokes invokeTransaction() of Fabric Service |

| | | | |
|---|---|---|---|
| | "col2": "value2",<br>"col3": "value3"<br>} | | |
| updateRecord | username : string,<br>recordObj : json,<br>opstat : boolean<br><br>Example : recordObj<br>{<br>  "database_id": "DB22",<br>  "table_id": "tab967",<br>  "col1": "value1",<br>  "col2": "value2",<br>  "col3": "value3"<br>} | {<br>  result: "Record Updated",<br>  record_id: recordId,<br>  transaction_id: transactionId<br>} | Invokes invokeTransaction() of Fabric Service |
| deleteRecord | username : string,<br>recordObj : json,<br>opstat : boolean<br><br>Example : recordObj<br>{<br>  "database_id": "DB1",<br>  "table_id": "tab_1",<br>  "record_id": 123<br>} | {<br>  result: "Record Deleted",<br>  record_id: recordId,<br>  transaction_id: transactionId<br>} | Invokes invokeTransaction() of Fabric Service |
| Bulk Service | | | |

| | | | |
|---|---|---|---|
| bulkInsertRecord | username : string,<br>recordObj : json,<br>opstat : boolean<br><br>Example : recordObj<br>{<br>  "database_id": "DB22",<br>  "table_id": "tab967",<br>  "records": [<br>    [<br>      799021,<br>      "saf89efuew099j",<br>      78123.912341,<br>      "MINED",<br>      null<br>    ],<br>    [<br>      235235,<br>      "wqknt32il23knafss",<br>      43534.43523,<br>      "PENDING",<br>      true<br>    ]<br>  ]<br>} | {<br>  result: "Records Inserted",<br>  transaction_id: transactionId<br>} | Invokes invokeTransaction() of Fabric Service |
| bulkUpdateRecord | username : string,<br>recordObj : json, | { | Invokes invokeTransaction() of Fabric Service |

| | opstat : boolean<br><br>Example : recordObj<br>{<br>  "database_id": "DB22",<br>  "table_id": "",<br>  "where": "column2 = '002'",<br>  "record_field": {<br>    "column3": "new_value"<br>  }<br>} | result: "Records Updated",<br>  transaction_id: transactionId<br>} | |
|---|---|---|---|
| bulkDeleteRecord | username : string,<br>recordObj : json,<br>opstat : boolean<br><br>Example : recordObj<br>{<br>  "database_id": "DB22",<br>  "table_id": "",<br>  "where": "column2 = '002'",<br>  "record_field": {<br>    "column3": "new_value"<br>  }<br>} | {<br>  result: "Records Deleted",<br>  transaction_id: transactionId<br>} | Invokes invokeTransaction() of Fabric Service |

| | } | | |
|---|---|---|---|
| Select Service | | | |
| selectRecord | username : string, recordObj : json  Example : recordObj { "database_id": "city_db", "table_id": "details", "where": "agent = 'Murphy', branch = 'Civil'", "limit": 150, "order_by": "DESC", "query_level": "INFO" } | { query_response:queryRecords, transaction_id: transactionId, bookmark: bookmarkString } | Invokes invokeTransaction() of Fabric Service |
| Query Service | | | |
| executeService | username : string, recordObj : json  Example : recordObj { "query": <SQL QUERY> | { transaction_id: transactionId, query_response: queryResponse } | Invokes invokeTransaction() of Fabric Service |

| | } | | |
|---|---|---|---|
| User Service | | | |
| registerUser | username : string, recordObj : json<br><br>Example : recordObj<br>{<br>  "username": "Matthew",<br>  "database_id": "Customer",<br>  "access_level": "DDL"<br>} | {<br>  result: "User Registered",<br>  user_id: user,<br>  transaction_id: transactionResponse<br>} | Invokes invokeTransaction() of Fabric Service |
| revokeUser | username : string, recordObj : json<br><br>Example : recordObj<br>{<br>  "database_id": "db1",<br>  "username": "Jamie"<br>} | {<br>  result: "User Revoked",<br>  user_id: user,<br>  transaction_id: transactionResponse<br>} | Invokes updateUserIdentity() of Fabric Service<br><br>Invokes invokeTransaction() of Fabric Service |

Fabric Service

These services are Fabric distributed ledger platform specific services. Below are the services and their methods:

| Method Name | Input Parameter | Uses | Logic Sequence |
|---|---|---|---|
| Fabric Service | | | |
| constructor | clientConfig : object<br><br>Config Object Keys:<br>clientConfig.caTLSCACerts - (optional) CA Certificate (read .pem file)<br>clientConfig.connectionConfig        - Connection Config File containing "client",<br>                "organizations", "peers", "orderers" and "certificateAuthorities"<br>clientConfig.walletPath            - Location to store user credentials<br>clientConfig.defaultCA            - Name of the Primary CA<br>clientConfig.admin                - Admin object containing "username" & "secret"<br>clientConfig.orgMSPName            - Organization MSP Name<br>clientConfig.maxEnrollments        - set -1 when Identity needs to be updated<br>clientConfig.commitTimeout        - Transaction Commit Timeout (Event Hub)<br>clientConfig.discoveryAsLocalHost    - Discovery of peer node as local host<br>                        (set 'true' in case of Docker composed setup)<br><br>It instantiates Fabric Service having above these config parameters. | | |

| | | | |
|---|---|---|---|
| getAdminService | | Provide the instance of Admin Service as per provided config | |
| getChannelService | | Provide the instance of Channel Service as per provided config | |
| getTransactionService | | Provide the instance of Transaction Service as per provided config | |
| getUserService | | Provide the instance of User Service as per provided config | |
| Channel Service | | | |
| createAndJoinChannel | username : string, channelName: string, peers: string array, artifactConfigs: json, createChannelTimeout:number, joinChannelTimeout: number | Creates channel and join the peers on this. | Instantiates fabric gateway.<br><br>Existence of channel is checked.<br><br>Channel specific artifacts are generated.<br><br>Channel is Create and is joined all the specified target peers. |

| User Service | | | |
|---|---|---|---|
| registerUser | username : string, role : string, [attributes] : object array | It registers user on the Fabric distributed ledger and generates identity artifacts. | Gets the admin identity context.<br><br>Enrolls User with user specific properties, incase attributes are supplied the user gets enrolled with the attributes.<br><br>User's identity artifacts are generated and identity is created.<br><br>The user specific artifacts are imported into fabric wallet. |
| deleteUser | username : string | It deletes the user specific artifacts from fabric wallet. | Deletes the user identity artifacts from the wallet. |
| updateUserIdentity | username : string, attributes : object array | It updated the user's fabric specific attributes. | Gets the identity context of user and appends the attributes supplied or updates the attributes in case they are already present. |

| Transaction Service | | | |
|---|---|---|---|
| invokeTransaction | username : string, channelName: string, chaincodeName: string, functionName: string, functionArgs:string array, ehEnabled:boolean | It is used to invoke the chaincode functions to perform requested operation with the specified arguments. This invocation results is a transaction on the ledger. | Instantiates fabric gateway.<br><br>Existence of channel is checked.<br><br>Creates and submits the transaction on the Fabric distributed ledger. |
| Admin Service | | | |
| enrollAdmin | | It is used to enroll fabric admin and imports its identity artifacts into the fabric wallet. | The CA related config is gathered.<br><br>Enroll function of CA is invoked which results in the enrollment of the admin. |

APPENDIX H

ELEMENT™ PARSER: INTRODUCTION

Element Parser is a component of ELEMENT™ which deals with a query string in the following ways:

- Checks the query for valid syntax
- Returns a parsed *Abstract Syntax Tree*
- Returns an error if the query is invalid
- Checks whether the identifiers like Database ID, Table ID, and Column Names follow the specified syntax as mentioned in Element SQL Specification
- Handles various existing SQL keywords in combination with Element Specific keywords, known as, ELEMENT SQL™

The parser is implemented on top of 'pg-parser-native' which uses a C library that uses the actual PostgreSQL server source to parse SQL queries and return the internal PostgreSQL parse tree.

The parser provides a convenient way to deal with relational data by parsing SQL queries into an object that can be committed to the distributed ledger by ELEMENT as native distributed ledger data. ELEMENT's ability to parse SQL enables developers to manipulate relational data on the distributed ledger using syntax that is already commonly understood.

ELEMENT™ PARSER: HIGH-LEVEL REQUIREMENTS

The following requirements need to be fulfilled in order to ensure the successful consumption of the parser in the ELEMENT Fabric realization.:

- Element System Chaincode should be up and running
- Element Console needs to be deployed

- The Parser should be installed as a Node.js® module in Element Console
- It should also be present in all the Fabric Peers where the System Chaincode is installed. This ensures that the System Chaincode is able to access the parser locally.

SEGREGATION OF PARSER FUNCTIONALITY

The ELEMENT Parser as implemented is a single unified component. However, the Parser functionality is divided into 2 parts based on the portion of the ELEMENT specification being fulfilled. Specifically, DDL and DML components.

The DDL parsing of user queries/inputs is performed within the ELEMENT Console, of which the DDL Parser is a composition. The Console, with the help of the DDL Parser, manages all database structure modification requests. Making DDL functions available entirely within the Fabric network itself is not possible without extensive modification, so these functions are not accessible in the Fabric-NodeJS realization.

DML Parsing for input queries *is* required within the Distributed Ledger Platform With Added ELEMENT features. For this NodeJS/Fabric realization, the DML Parser functions from the ELEMENT System Chaincode and is thus accessible to smart contracts (user chaincode).

INPUT TYPE

Element Parser takes query inputs in string format and is invoked using a function present in the parser called "parseQuery". The queries follow the query specification for Postgres SQL. The specifications can be found in detail in ELEMENT™ 1.0 ELEMENT SQL™ document. The queries are featured with the added Element specific keywords, which provides better handling of data.

COMPOSITION OF ELEMENT™ Parser

The Parser constitutes of 4 categories of functions which are classified along the same lines as user access levels. The following table: summarizes these functions:

| Query Classification | Function | Returns (JSON Object) | Return Example |
|---|---|---|---|
| Database (DDL) | Create Database | <ul><li>Database ID</li><li>Function Name</li><li>Function Type</li></ul> | {<br>"databaseId": "Organization",<br>"function": "createDatabase",<br>"functionType": "DDL"<br>} |
| | Drop Database | <ul><li>Database ID</li><li>Function Name</li><li>Function Type</li></ul> | {<br>"databaseId": "Organization",<br>"function": "dropDatabase",<br>"functionType": "DDL"<br>} |
| | Show Databases | <ul><li>Function Name</li><li>Function Type</li></ul> | {<br>"function": "showDatabases",<br>"functionType": "SYS"<br>} |
| Table (DDL) | Create Table | <ul><li>Table ID</li><li>Primary Key</li><li>An object of columns with constraints</li></ul> | {<br>"tableId":"Persons",<br>"primaryKey":"id",<br>"columns":{<br>  "id":{<br>    "dataType":"number",<br>    "notNull":true |

| | | | |
|--|--|--|--|
| | | <ul><li>An array of column names in the order of insertion</li><li>Function Name</li><li>Function Type</li></ul> | `},`<br>`"lastname":{`<br>  `"dataType":"string",`<br>  `"notNull":true`<br>`},`<br>`"firstname":{`<br>  `"dataType":"string",`<br>  `"notNull":false`<br>`},`<br>`"age":{`<br>  `"dataType":"number",`<br>  `"notNull":false`<br>`},`<br>`"city":{`<br>  `"dataType":"boolean",`<br>  `"notNull":true,`<br>  `"defaultVal":false`<br>`}`<br>`},`<br>`"columnsIndex":[`<br>  `"id",`<br>  `"lastname",`<br>  `"firstname",`<br>  `"age",`<br>  `"city"`<br>`],`<br>`"function":"createTable",`<br>`"functionType":"DDL"`<br>`}` |

| | | | |
|---|---|---|---|
| | Alter Table | • Table ID<br>• Operation: ADD, MODIFY, DROP and RENAME<br>• An array or object ('array' in case of DROP operation and 'object' in other cases) of columns based on the operation, also containing the constraints<br>• Function Name<br>• Function Type | {<br>"tableId":"Persons",<br>"operation":"ADD",<br>"columns":{<br>  "ssn":{<br>    "dataType":"string",<br>    "notNull":true<br>  }<br>},<br>"function":"alterTable",<br>"functionType":"DDL"<br>} |
| | Drop Table | • Table ID<br>• Function Name<br>• Function Type | {<br>"tableId": "Employees",<br>"function": "dropTable",<br>"functionType": "DDL"<br>} |
| | Show Tables | • Function Name<br>• Function Type | {<br>"function": "showTables",<br>"functionType": "SYS"<br>} |
| | Describe Table | • Table ID<br>• Function Name<br>• Function Type | {<br>"tableId": "Employees",<br>"function": "descTable",<br>"functionType": "SYS"<br>} |

| | | | |
|---|---|---|---|
| Record (DML_WRITE) | Insert Record | <ul><li>Table ID</li><li>A Record Field object with column name as the key and column value as the value or an array of values in case the column names aren't specified</li><li>Function Name</li><li>Function Type</li><li>Limit which decides the number of records to be affected</li><li>OPSTAT</li></ul> | {<br>"tableId":"Customers",<br>"recordField":{<br>  "customername":"John Doe",<br>  "contactname":"Jane Doe",<br>  "Address":"1 Example Rd.",<br>  "city":"Stavanger",<br>  "postalcode":4006,<br>  "country":false<br>},<br>"function":"insertRecord",<br>"functionType":"DML",<br>"limit":500,<br>"opstat":true<br>} |
| | Update Record | <ul><li>Table ID</li><li>A Record Field object column name as the key and the column value to be updated as the value</li><li>[optional] A query object parsed from the 'Where Clause' which decides the target fields to be updated</li></ul> | {<br>"tableId":"Customers",<br>"recordField":{<br>  "timezone":"GMT-4"<br>},<br>"query":{<br>  "selector":{<br>    "record_field":{<br>      "city":{<br>        "$eq":"Toronto"<br>      }<br>    },<br>    "doc_type":"record", |

| | | | |
|---|---|---|---|
| | | <ul><li>Function Name</li><li>Function Type</li><li>Limit which decides the number of records to be affected</li><li>OPSTAT</li></ul> | "table_id":"Customers"<br>},<br>"limit":500<br>},<br>"function":"updateRecord",<br>"functionType":"DML",<br>"limit":500,<br>"opstat":false<br>} |
| | Delete Record | <ul><li>Table ID</li><li>A query object parsed from the 'Where Clause' which decides the target fields to be deleted</li><li>Function Name</li><li>Function Type</li><li>Limit which decides the number of records to be affected</li></ul> | {<br>"tableId":"Customers",<br>"query":{<br>"selector":{<br>"record_field":{<br>"city":{<br>"$eq":"Atlanta"<br>}<br>},<br>"doc_type":"record",<br>"table_id":"Customers"<br>},<br>"limit":500<br>},<br>"function":"deleteRecord",<br>"functionType":"DML",<br>"limit":500,<br>"opstat":true<br>} |
| | Bulk Insert | <ul><li>Table ID</li></ul> | {<br>"tableId":"some_table", |

| | | | |
|---|---|---|---|
| | | <ul><li>An array of arrays of record values</li><li>Function Name</li><li>Function Type</li><li>Limit which decides the number of records to be affected</li></ul> | "records":[<br>[<br>"Customer",<br>52,<br>"+1 123 456 7890",<br>false<br>],<br>[<br>"Client",<br>35,<br>"+1 987 654 3210",<br>null<br>],<br>[<br>"Business Partner",<br>29,<br>"+1 123 451 2345",<br>false<br>]<br>],<br>"function":"bulkInsert",<br>"functionType":"DML",<br>"opstat":true<br>} |
| Select (DML_READ) | Select Query | <ul><li>Table ID</li><li>A query object parsed from the 'Where Clause' which decides the</li></ul> | {<br>"tableId":"Customers",<br>"query":{<br>"selector":{<br>"record_field":{<br>"city":{ |

| | | | |
|---|---|---|---|
| | | target fields to be selected<br>• Function Name<br>• Function Type<br>• Limit which decides the number of records to be affected | "$eq":"Atlanta"<br>}<br>},<br>"doc_type":"record",<br>"table_id":"Customers"<br>},<br>"limit":500<br>},<br>"function":"selectQuery",<br>"functionType":"DML",<br>"limit":50<br>} |

PARSING IN ELEMENT™ SYSTEM CHAINCODE

Parsing in Element™ System Chaincode involves the following steps:

1. The Parser is consumed by the 'Execute Query' function present in System Chaincode. System Chaincode. After the function is invoked with a DML query, Parser parses the query into an AST object.
2. The object is validated as per the business rules of Element™ DML operations. Invalid objects result in an error.
3. The validated AST object is then transformed into an object which contains keys which are specific to the functions present in the Element™ System Chaincode based on the operation that the query is intended for.
4. This enables the Element™ System Chaincode to further process the input data and handle all the DML operations.

PARSING IN ELEMENT™ CONSOLE

Parsing in Element™ Console follows the following process:

1. The 'Execute Query' function present in Element™ Console when invoked makes use of parser to parse the input queries.
2. Once parser validates as per the business rules of Element™ DDL and DML operations, it returns the Console with an object which contains keys which are specific to the functions present in the Console itself.
3. The Console then processes the query based on the query function. If DDL, then Console's functions are invoked, and, in case of DML, System Chaincode is invoked.

ERROR HANDLING

The Parser avoids unnecessary ELEMENT™ function invocations by validating the input query on its own end. Data that does not abide by the business rules of ELEMENT™ results in an error. The Error contains an error message and error code relevant to the invalidated rule. This provides ease in debugging the query and system way of handling errors to the client as well.

Errors in Element-Parser:

| Error | Error Object | Possible Reason(s) |
|---|---|---|
| InvalidDatabaseId | {<br>"message":"Invalid Database Id",<br>"customCode":"INVALID_DATABASE_ID",<br>"statusCode":412<br>} | • DatabaseId not specified<br>• DatabaseId doesn't adhere with the validation regex (refer ELEMENT™ 1.0 Specification - ELEMENT SQL™ for more details) |

| | 311 | 312 |
|---|---|---|
| InvalidTableId | {<br>"message":"Invalid Table Id",<br>"customCode":"INVALID_TABLE_ID",<br>"statusCode":412<br>} | • TableId not specified<br>• TableId doesn't adhere with the validation regex (refer ELEMENT™ 1.0 Specification - ELEMENT SQL™ for more details) |
| InvalidColumnName | {<br>"message":"Invalid Column Name(s)",<br>"customCode":"INVALID_COLUMN_NAME",<br>"statusCode":412<br>} | • Column Name doesn't adhere with the validation regex (refer ELEMENT™ 1.0 Specification - ELEMENT SQL™ for more details) |
| InvalidQuery | {<br>"message":"Invalid Query",<br>"customCode":"INVALID_QUERY",<br>"statusCode":400<br>} | • The query does not follow the specifications and standards mentioned in ELEMENT™ 1.0 Specification - ELEMENT SQL™ document |
| PrimaryKeyMissing | {<br>"message":"Primary Key Missing",<br>"customCode":"PRIMARY_KEY_MISSING", | • Primary key column not specified in the create table query |

| | "statusCode":400 <br> } | |
|---|---|---|
| UnsupportedQuery | { <br> "message":"Unsupported Query", <br> "customCode":"UNSUPPORTED_QUERY", <br> "statusCode":422 <br> } | • In case the query is valid but Element™ Parser does not support the features |
| ElementParserError | { <br> "message":"Element Parser Error", <br> "customCode":"ELEMENT_PARSER_ERROR", <br> "statusCode":503 <br> } | • Emitted when the Parser encounters an internal error <br> • Unhandled Exceptions |

REFERENCES

[1] https://www.npmjs.com/package/pg-query-native

[2] https://github.com/lfittl/libpg_query

APPENDIX I

Introduction

The Element Chaincode is the fundamental component of ELEMENT™ for performing all database related operations on Fabric. The user inputs in form of queries are processed on the distributed ledger using the Element chaincode. The Element Chaincode has its dependencies on an identity provider and a world state database to achieve certain functionalities.

The Element Chaincode is deployed as a system chaincode and runs as a part of the peer process. Unlike a user chaincode, a system chaincode is not installed and instantiated using proposals from SDKs or CLI, rather it is registered and deployed by the peer at startup. This capability is not enabled by default, instead it requires the peer to be built separately.

System chaincodes can be linked to a peer statically or dynamically using Go plugins. However, a better approach is to load the system chaincode as a plugin to avoid the scenario of where rebuilding would be necessary whenever a change is made to it. The peer needs to be built only once to enable loading plugins.

Every operation on the chaincode is processed as a transaction, while some operations need to be processed as a set of transactions. The chaincode processes an operation as a single transaction and a mechanism of rollback is used to simulate transactions in case they are processed in batches.

Every operation on the chaincode follows a similar flow, while its implementation might differ. As a primary step, a general check is performed on the input, in case of any discrepancy the request is returned and its effect will not be exhibited on the ledger. Secondly, the request is only forwarded if the invoking entity has the appropriate access to the process that operation (handled by the identity provider).

Access for each invoking entity is checked using its certificates. At the time of registration, appropriate attributes pertaining to that database are added to its certificate. On each subsequent request, a check is performed. Only if the entity has access privileges to that operation, the concerned request is processed and the entity will be granted permission to perform that operation.

Broadly operations on the chaincode can be classified as Data Definition Language(DDL) and Data Manipulation Language(DML). The chaincode limits DDL operations access via another chaincode as DDL operations are not parsed at the chaincode. So, at the onset of every request, ELEMENT system uses the transaction proposal to check if the call is made directly to the chaincode. If the transaction is coming from another source, access to any chaincode operation(DDL) is prevented.

For DML operations, queries can be directly sent as input. Every query is then sent to the parser and the corresponding operation are called based on the response from the parser. Further detailed information about the implementation of each aspect of the chaincode is given in the sections below.

Prerequisite

The following prerequisites are mandatory for registering and deploying Element Chaincode:

- Fabric network should be running.
- Peers need to be built using build tag named "pluginsenabled".

Deployment

Unlike a user chaincode, a system chaincode is not installed and instantiated using proposals from SDKs or CLI. It is registered and deployed by the peer at start-up. This capability is not enabled by default and instead requires the peer, to be built using a build tag named *"pluginsenabled"*.

System chain codes can be linked to a peer in two ways:

1. Statically - For statically, To build your chaincode as part of the peer process, the approach would be to have the chaincode implement the `SelfDescribingSysCC` interface [1] and register an instance of it in the peer start-up file[2]. Following which peer needs to be built using this modified code.

2. Dynamically - It's better to load system chaincode as a plugin. This way there's no need to rebuild the peer each time a change is made to the chaincode. The peer needs to be built once to enable plugins.

a. Deployment Steps -
        i. Write a system chaincode in go
        ii. Compile this go plugin using the -buildmode=plugin build flag to produce a shared object (.so) library file.

go build -buildmode=plugin -o <output-file>.so <go-plugin>.go iii. Build your peer to enable loading GO plugins:

DOCKER_DYNAMIC_LINK=true GO_TAGS+=" pluginsenabled" make peer-docker

Note - Remember to build the go plugin on the same go version of the Fabric version's go version.

iv. Start the network using the formed docker image.
        v. Copy the plugin files and .so file in the docker peer.
        vi. Add the system chaincode and its information in the peer's configuration file(core.yaml).
        vii. Restart the peer.

REFERENCES 1. https://github.com/hyperledger/fabric/blob/release-1.3/core/scc/sysccapi.go#L78

2. https://github.com/hyperledger/fabric/blob/release-1.3/peer/node/start.go#L549

Methods

*Init()*

Init is called during chaincode registration. This method is used to load config and initialize global variables, which are used in all the other methods.

*New()*

This method must be present in every dynamically linked system chaincode, as this method returns an implementation of the Chaincode Interface. The chaincode Interface encapsulates all the methods and forwards them to be executed as part of the peer process.

*Invoke()*

This method is used to carry out transactions on the chaincode. This acts as a single point of contact between the APIs of the chaincode and the Fabric peer. The invoking entity calls invoke method to process any other methods of the chaincode. After checking if the invoking entity has appropriate access and the inputs are correctly formulated as a stringified JSON. The request is relayed to the corresponding method that the invoke is intended to call.

*CreateDatabase()*

This method is called at the onset of database creation. The request is processed by generating appropriate metadata for that specific database. This metadata is consumed by all the other methods of the chaincode.

*DropDatabaseMeta()*

This method is called to initiate the deletion of a database, which is processed as a batch operation for the user. This method marks the beginning of the process and returns a list of all the tables present in that database. Following which specific calls are made to delete metadata of the table and all its records.

*DropDatabaseCommit()*

This method acts as a finishing call for the deletion of a database after all the requests in the batch are processed successfully.

*RegisterUser()*

This method is used to add a new user to the database and this follows the addition of attributes to the certificate.

Only users with admin privileges are allowed to add other users, so after checking appropriate access of the invoking entity the user identity given in the request is added to the database metadata.

*DeleteUser()*

This method is used to delete a user from the database and this follows the removal of attributes from the certificate.

Only users with admin privileges are allowed to delete other users, so after checking appropriate access of the invoking entity. The user given in the request is deleted from the database metadata

*CreateTable()*

This method is used to create and add a new table to the existing database. First, a check is performed to verify the current database is not in an idle state. Following which, the ELEMENT system checks whether a table already exists in the database. Along with these verifications, if the input data is consistent then the table metadata is formed and added to the ledger. The table information is also added to the database metadata. The table metadata is used to verify all the operations performed on that table.

*DropTableMeta()*

This method is called to initiate the deletion of a table, which is processed as a batch operation for the user. This method marks the beginning of the process and sets the DDL flag to restrict other operations on that table.

*DropTableRecords()*

This method is used to delete records for that table. This runs the delete operation recursively on the specified table records. Delete is performed on a batch of records, while the size of the batch is configurable. This is done to prevent exceeding the time limit for a transaction.

*DropTableCommit()*

This method acts as a finishing call for the deletion of a table after all the requests in the batch are processed successfully. A call from the invoking entity is made to mark the completion of this process. All the intermediate transaction IDs are stored in the ledger so that user could be returned a single transaction ID. Following which, the metadata for that table is deleted and the table name could be reused to create a new table in future operations.

*AlterTableMeta()*

This method is called to initiate the modification of the structure of the table. It is processed as a batch operation. This method marks the beginning of the process and sets the DDL flag to restrict other operations on that table. Using the inputs given in the request Element system formulates an update template which will be used to update all the records of that table. That update template is returned in the response.

*AlterTableRecords()*

This method is used to modify records for that table. This modifies all the records that are present in the table. Alter is performed on a batch of records, while the size of the batch is configurable. This is done to prevent exceeding the time limit for a transaction.

*AlterTableCommit()*

This method acts as a finishing call for the modification of a table after all the requests in the batch are processed successfully. A call from the invoking entity is made to mark the completion of this process. All the intermediate transaction IDs are stored in the ledger so that the user could be returned a single transaction ID. Following which, a request could be made on that table again.

*InsertRecord()*

This method is used to add a record to the table. Every record added to the table must adhere to the rules set when creating the table. So, on each request firstly it is checked if the column values can be added based on the constraints in the table metadata. There are 2 variants of this method, one where the invoking entity might pass the columns and secondly where column names are omitted. The processing of both variants is similar and only the column names are picked from the table metadata in case column names are omitted. If the record passes all the checks and validation, then it is added to the ledger with the primary key value set as the record ID.

UpdateRecord()

This method is used to update values of the existing columns of a table. Every update made to a record must still adhere to the constraints set in the table metadata. So, on each request, the previous record data is picked from the ledger and the intended changes are made to the record. If the record passes all the checks and validation, then it is updated in the ledger with record ID unchanged.

Note - primary key value can't be updated while updating a record.

*DeleteRecord()*

This method is used to delete a previously existing record from the table. If the record is present and the table is not under any DDL process, the record is deleted from the ledger. Its effect will be seen once the transaction is committed.

CreateIndex()

This method is used in case the invoking entity wants to add indexes on existing columns. Firstly, the request is checked if indexing could be performed on the given columns. Following which indexes need to be added in the state database. This functionality is not inherently present in Fabric, so separate requests need to be made on the state database to add indexes for the given columns.

*DeleteIndex()*

This method is used in case the invoking entity wants to delete indexes on existing columns. Firstly, the request is checked if indexing could be performed on the given columns. Following which the indexes previously created are deleted from the state database.

*SelectQueryWithPagination()*

This method is used to execute the given query on the state database. The result is returned to the invoking entity based on the intended query level. This method only performs a read operation and thus has no effect on the ledger. If the invoking entity does not specify a limit, then a default limit is taken to prevent running the transaction out of time.

*BulkInsertRecord()*

This method is used to perform insert operations on batches. Insert operation is performed on all the records and if any one of them fails the batch is returned without affecting the ledger. All the records inserted should be added only if the column values satisfy the constraints set in the table metadata.

*BulkUpdateRecord()*

This method is used to perform update operations in batches. The update operation is performed on all the records in the batch obtained after executing the query on the state database. If anyone of them fails, the batch is returned without affecting the ledger. All the records updated should adhere to the constraints set in the table metadata.

*BulkDeleteRecord()*

This method is used to perform delete operations in batches. Recursively, delete operation is performed on all the records in the batch obtained after executing the query on the state database. If anyone of them fails there's no effect on the ledger.

*RollbackTransaction( )*

Some operations need to be processed as a set of transactions, which will appear as a single transaction to the invoking entity. If any one of them is not processed then all the previous transactions need to be reverted. So, in each method metadata for rollback is curated and this method is used to revert any previous transaction with the given transaction ID.

*DeleteTransactionMeta( )*

Some operations need to be processed as a set of transactions, which will appear as a single transaction to the invoking entity. If anyone of them is not processed, then all the previous transactions need to be reverted. So, in each method metadata for rollback is curated. If all the transactions have processed successfully, then this method is used to delete the metadata for the given transaction ID.

*ExecuteQuery( )*

This method is used to execute DML queries at the chaincode. The query in the request is sent to the parser, the output from the parser is used to process the corresponding method. After checking the access of the invoking entity for that method. The request is relayed to the appropriate method.

*ShowDatabases( )*

This method is used to list all the database that any invoking entity can access. All the databases are mentioned in the invoking entity's certificate, so we use the certificate of the invoking entity to fetch the name of all the databases and return them.

*ShowTables()*

This method is used to list all the tables present in a database. All the tables are mentioned in the database metadata, so we fetch the database metadata and return the list of all the tables.

*DescTable()*

This method is used to get all the constraints set when the table is created. The table metadata contains constraints for all the columns. So, when a request is made then the table metadata is returned after removing internal information.

What is claimed is:

1. A method of querying a distributed ledger platform that implements a distributed ledger including transaction data, comprising:
creating, using at least one processor of the distributed ledger platform, a database on the distributed ledger and recording information about the database on the distributed ledger;
receiving, using the at least one processor, a relational database management query from a smart contract;
converting, using the at least one processor, the received relational database management query into a distributed ledger transaction that may be processed by the database on the distributed ledger;
executing, using the at least one processor, the distributed ledger transaction on the distributed ledger to generate a transaction result;
returning, using the at least one processor, the transaction result to the smart contract; and
logging, using the at least one processor, the transaction result to the database on the distributed ledger in a form that may be processed by the database on the distributed ledger for inclusion on the distributed ledger.

2. A method as in claim 1, further comprising integrating the smart contract with the database on the distributed ledger whereby the smart contract executes data definition language (DDL) operations of the distributed ledger except for DDL database operations and schema changes.

3. A method as in claim 2, further comprising implementing database related operations of the database on the distributed ledger in chaincode, the chaincode defining at least one asset of the smart contract and at least one transaction instruction for modifying the at least one asset.

4. A method as in claim 3, wherein integrating the smart contract with the database on the distributed ledger comprises the smart contract calling the chaincode.

5. A method as in claim 3, further comprising the smart contract initiating data manipulation language (DML) read operations from the chaincode.

6. A method as in claim 1, wherein the relational database management query from the smart contract comprises a structured query language (SQL) query executed by the smart contract.

7. A method as in claim 6, further comprising parsing the SQL query into an SQL operation comprising one of an SQL data manipulation language (SQL DML) write operation, an SQL DML read operation, or an SQL data definition language (SQL DDL) operation, and creating a JavaScript Object Notation (JSON) representation of the SQL operation and any relational data included in the SQL operation.

8. A method as in claim 7, further comprising determining whether a distributed ledger transaction resulting from execution of the SQL operation has progressed toward acceptance into the distributed ledger to a platform-relevant extent.

9. A method as in claim 8, further comprising adding an operation broadcast status (OPSTAT) instruction at the end of a DML Write operation to fetch a more definitive status of a corresponding transaction.

10. A method as in claim 7, wherein executing the distributed ledger transaction on the distributed ledger comprises confirming that the smart contract has authority to perform the SQL operation.

11. A method as in claim 7, wherein executing the distributed ledger transaction on the distributed ledger comprises creating an SQL operation that may be processed and stored by the distributed ledger platform as a JSON representation of the SQL operation and its result.

12. A method as in claim 7, wherein the SQL operation is an SQL DML write operation, further comprising retrieving, using the at least one processor, data from the distributed ledger to execute the SQL DML write operation, executing, using the at least one processor, the SQL DML write operation including the retrieved data, preparing, using the at least one processor, JSON representations of any new or updated records in the transaction result, and committing, using the at least one processor, the SQL DML write operation and any updated records to the distributed ledger in a form that may be processed by the database on the distributed ledger for inclusion on the distributed ledger.

13. A method as in claim 12, further comprising monitoring, using the at least one processor, the distributed ledger for progress of the SQL DML write operation toward acceptance into the distributed ledger and informing, using the at least one processor, the smart contract whether the SQL DML write operation made such progress to a platform-relevant extent.

14. A method as in claim 7, wherein the SQL operation is an SQL DML read operation, further comprising retrieving, using the at least one processor, data from the distributed ledger to execute the SQL DML read operation, executing, using the at least one processor, the SQL DML read operation including the retrieved data, preparing, using the at least one processor, a JSON representation of the transaction result, and logging, using the at least one processor, the JSON representation of the transaction result to the distributed ledger in a form that may be processed by the database on the distributed ledger for inclusion on the distributed ledger.

15. A method as in claim 14, further comprising returning, using the at least one processor, the JSON representation of the transaction result to the smart contract.

16. A method as in claim 6, wherein the smart contract executes at least a subset of SQL queries of relational database management queries of the database on the distributed ledger.

17. A method as in claim 1, further comprising the smart contract performing at least one operation including executing data manipulation language (DML) queries, creating the database on the distributed ledger, updating access rights to the database on the distributed ledger, or executing data definition language (DDL) queries.

18. A method as in claim 17, wherein creating the database on the distributed ledger comprises the smart contract executing a configuration transaction that creates data segregation of the distributed ledger and defines which peer computers will maintain a copy of the database and executing a regular transaction that writes metadata about the database, further comprising creating, using the at least one processor, code defining transaction data on the distributed ledger and transaction instructions for modifying the transaction data.

19. A system comprising:
a smart contract;
a distributed ledger platform that implements a distributed ledger including transaction data;
a database on the distributed ledger; and
at least one processor that executes instructions to implement a relational data management and organization system that performs operations comprising:
recording information about the database on the distributed ledger;

receiving a relational database management query from the smart contract;
converting the received relational database management query into a distributed ledger transaction that may be processed by the database on the distributed ledger;
executing the distributed ledger transaction on the distributed ledger to generate a transaction result;
returning the transaction result to the smart contract; and
logging the transaction result to the database on the distributed ledger in a form that may be processed by the database on the distributed ledger for inclusion on the distributed ledger.

20. A system as in claim 19, wherein the smart contract executes data definition language (DDL) operations of the distributed ledger except for DDL database operations and schema changes.

21. A system as in claim 20, wherein database related operations of the database are implemented on the distributed ledger in chaincode, the chaincode defining at least one asset of the smart contract and at least one transaction instruction for modifying the at least one asset.

22. A system as in claim 21, wherein the smart contract calls the chaincode for execution.

23. A system as in claim 22, wherein the smart contract executes at least a subset of SQL queries of relational database management queries of the database on the distributed ledger.

24. A system as in claim 21, wherein the smart contract initiates data manipulation language (DML) read operations from the chaincode.

25. A system as in claim 19, wherein the relational database management query from the smart contract comprises a structured query language (SQL) query executed by the smart contract.

26. A system as in claim 25, the at least one processor further executing instructions to perform operations comprising parsing the SQL query into an SQL operation comprising one of an SQL data manipulation language (SQL DML) write operation, an SQL DML read operation, or an SQL data definition language (SQL DDL) operation, and creating a JavaScript Object Notation (JSON) representation of the SQL operation and any relational data included in the SQL operation.

27. A system as in claim 26, the at least one processor further executing instructions to perform operations comprising determining whether a distributed ledger transaction resulting from execution of the SQL operation has progressed toward acceptance into the distributed ledger to a platform-relevant extent.

28. A system as in claim 27, the at least one processor further executing instructions to perform operations comprising adding an operation broadcast status (OPSTAT) instruction at the end of a DML Write operation to fetch a more definitive status of a corresponding transaction.

29. A system as in claim 26, wherein executing the distributed ledger transaction on the database on the distributed ledger comprises executing instructions to confirm that the smart contract has authority to perform the SQL operation.

30. A system as in claim 26, wherein executing the distributed ledger transaction on the database on the distributed ledger comprises executing instructions to create an SQL operation that may be processed and stored by the distributed ledger platform as a JSON representation of the SQL operation and its result.

31. A system as in claim 26, wherein the SQL operation is an SQL DML write operation, the at least one processor further executing instructions to perform operations comprising retrieving data from the distributed ledger to execute the SQL DML write operation, executing the SQL DML write operation including the retrieved data, preparing JSON representations of any new or updated records in the transaction result, and committing the SQL DML write operation and any updated records to the distributed ledger in a form that may be processed by the database on the distributed ledger for inclusion on the distributed ledger.

32. A system as in claim 31, the at least one processor further executing instructions to perform operations comprising monitoring the distributed ledger for progress of the SQL DML write operation toward acceptance into the distributed ledger and informing the smart contract whether the SQL DML write operation made such progress to a platform-relevant extent.

33. A system as in claim 26, wherein the SQL operation is an SQL DML read operation, the at least one processor further executing instructions to perform operations comprising retrieving data from the distributed ledger to execute the SQL DML read operation, executing the SQL DML read operation including the retrieved data, preparing a JSON representation of the transaction result, and logging the JSON representation of the transaction result to the distributed ledger in a form that may be processed by the database on the distributed ledger for inclusion on the distributed ledger.

34. A system as in claim 33, the at least one processor further executing instructions to perform operations comprising returning the JSON representation of the transaction result to the smart contract.

35. A system as in claim 19, wherein the smart contract performs at least one operation including executing data manipulation language (DML) queries, creating the database on the distributed ledger, updating access rights to the database on the distributed ledger, or executing data definition language (DDL) queries.

36. A system as in claim 35, wherein the smart contract creates the database on the distributed ledger by executing a configuration transaction that creates data segregation of the distributed ledger and defines which peer computers will maintain a copy of the database and executing a regular transaction that writes metadata about the database, the at least one processor further executing instructions to perform operations comprising creating code defining transaction data on the distributed ledger and transaction instructions for modifying the transaction data.

37. At least one non-transitory computer-readable storage medium that stores instructions that, when executed by a processor, cause the processor to perform a method of querying, with a relational database management query, a distributed ledger platform that implements a distributed ledger including transaction data, by performing operations comprising:
creating a database on the distributed ledger;
recording information about the database on the distributed ledger;
receiving a relational database management query from a smart contract;
converting the received relational database management query into a distributed ledger transaction that may be processed by the database on the distributed ledger;
executing the distributed ledger transaction on the distributed ledger to generate a transaction result;
returning the transaction result to the smart contract; and logging the transaction result to the database on the distributed ledger in a form that may be processed by the database on the distributed ledger for inclusion on the distributed ledger.

\* \* \* \* \*